United States Patent [19]

La Rue et al.

[11] Patent Number: 5,592,389
[45] Date of Patent: Jan. 7, 1997

[54] NAVIGATION SYSTEM UTILIZING AUDIO CD PLAYER FOR DATA STORAGE

[75] Inventors: Charles La Rue, La Canada; Robert W. Diller, Pasadena, both of Calif.

[73] Assignee: ANS, LLP, Van Nuys, Calif.

[21] Appl. No.: 399,931

[22] Filed: Mar. 6, 1995

Related U.S. Application Data

[63] Continuation-in-part of Ser. No. 299,486, Sep. 1, 1994, abandoned, which is a continuation-in-part of Ser. No. 110,503, Aug. 20, 1993, which is a continuation of Ser. No. 675,632, Mar. 27, 1991, Pat. No. 5,274,560, which is a continuation-in-part of Ser. No. 621,577, Dec. 3, 1990, abandoned.

[51] Int. Cl.⁶ ........................................... G06F 17/30
[52] U.S. Cl. ................................ 364/449.5; 364/444.1; 340/988; 340/990; 340/995
[58] Field of Search ................................ 364/443, 444, 364/449, 454; 340/990, 995, 988; 395/2; 381/42, 41, 43, 51

[56] References Cited

U.S. PATENT DOCUMENTS

| | | | |
|---|---|---|---|
| Re. 32,012 | 10/1985 | Pirz et al. | 381/43 |
| 4,242,731 | 12/1980 | Mizote et al. | 364/436 |
| 4,277,644 | 7/1981 | Levinson et al. | 395/2.5 |
| 4,301,506 | 11/1981 | Turco | 364/436 |
| 4,489,435 | 12/1984 | Moshier | 381/43 |
| 4,502,123 | 2/1985 | Minami et al. | 364/499 |
| 4,570,227 | 2/1986 | Tachi et al. | 364/444 |
| 4,630,209 | 12/1986 | Saito et al. | 364/444 |
| 4,677,429 | 6/1987 | Glotzbach | 345/168 |
| 4,679,147 | 7/1987 | Tsujii et al. | 364/449 |
| 4,758,959 | 7/1988 | Thoone et al. | 364/454 |
| 4,761,815 | 8/1988 | Hitchcock | 395/2.62 |
| 4,796,189 | 1/1989 | Nakayama et al. | 340/990 |
| 4,797,924 | 1/1989 | Schnars et al. | 381/43 |
| 4,812,845 | 3/1989 | Yamada et al. | 340/995 |
| 4,827,520 | 5/1989 | Zeinstra | 381/43 |

(List continued on next page.)

FOREIGN PATENT DOCUMENTS

| | | |
|---|---|---|
| 372840 | 6/1990 | European Pat. Off. . |
| 719017 | 12/1988 | Germany . |
| 59-17108 | 1/1984 | Japan . |
| 61-075212 | 4/1986 | Japan . |
| 61-226777 | 10/1986 | Japan . |
| 62-108111 | 5/1987 | Japan . |
| 63-261108 | 10/1988 | Japan . |
| 63-259412 | 10/1988 | Japan . |
| 64-39597 | 3/1989 | Japan . |
| 1-173820 | 7/1989 | Japan . |
| 2-69616 | 3/1990 | Japan . |
| 2-151715 | 6/1990 | Japan . |
| 2-154111 | 6/1990 | Japan . |
| 6-502488 | 3/1994 | Japan . |
| WO9209866 | 6/1992 | WIPO . |
| WO9416437 | 7/1994 | WIPO . |

OTHER PUBLICATIONS

"Computer Software Information Management"; Lesk; Scientific American, vol. 251, No. 3, Sep. 1984.

SAE Technical paper Series, vol. 870139, Warrendale, PA., 1987, M. L. G. Thoone et al.,; "The Car Information and Navigation System Carin and the Use of Compact Disc Interface".

IEEE Transactions on Instrumentation and Measurement, vol. 37, No. 4, Dec. 1988, New York, US, pp. 586–590; S. S. Awad; "Voice Technology in the Instrumentation of the Automobile".

*Primary Examiner*—Kevin J. Teska
*Assistant Examiner*—Tan Nguyen
*Attorney, Agent, or Firm*—Loeb & Loeb LLP

[57] ABSTRACT

An audio navigation system incorporating an audio CD player for playing an audio format CD constituting a data storage medium for the navigation system. The CD may store a database containing map data and navigation information, software including an algorithm for selecting a desired route between a designated starting point and destination, and speech data for generating audible spoken statements through a sound system. The audio CD player may be part of a sound system and may also play audio CDs carrying musical selections.

12 Claims, 11 Drawing Sheets

U.S. PATENT DOCUMENTS

| | | | |
|---|---|---|---|
| 4,829,578 | 5/1989 | Roberts | 381/46 |
| 4,866,778 | 9/1989 | Baker | 381/43 |
| 4,882,696 | 11/1989 | Nimura et al. | 364/449 |
| 4,907,159 | 3/1990 | Mauge et al. | 364/436 |
| 4,926,336 | 5/1990 | Yamada | 364/444 |
| 4,954,958 | 9/1990 | Savage et al. | 364/444 |
| 4,972,319 | 11/1990 | Delorme | 364/419 |
| 4,984,168 | 1/1991 | Neukrichner et al. | 364/449 |
| 4,985,924 | 1/1991 | Matsuura | 395/2.63 |
| 4,992,947 | 2/1991 | Nimura et al. | 364/444 |
| 5,041,983 | 8/1991 | Nakahara et al. | 364/449 |
| 5,089,826 | 2/1992 | Yano et al. | 342/457 |
| 5,115,399 | 5/1992 | Nimura et al. | 364/449 |
| 5,125,022 | 6/1992 | Hunt et al. | 379/88 |
| 5,126,941 | 6/1992 | Gurmu et al. | 364/424.02 |
| 5,132,684 | 6/1992 | Pecker et al. | 340/905 |
| 5,157,614 | 10/1992 | Kashwazaki et al. | 364/443 |
| 5,170,164 | 12/1992 | Lewis | 340/988 |
| 5,170,353 | 12/1992 | Verstraete | 364/444 |
| 5,172,321 | 12/1992 | Ghaem et al. | 364/444 |
| 5,177,685 | 1/1993 | Davis et al. | 364/443 |
| 5,274,560 | 12/1993 | LaRue | 364/444 |
| 5,303,299 | 4/1994 | Hunt et al. | 379/88 |
| 5,353,023 | 10/1994 | Mitsugi | 340/989 |
| 5,406,492 | 4/1995 | Suzuki | 340/449 |

NAVIGATION SYSTEM UTILIZING AUDIO CD PLAYER FOR DATA STORAGE

RELATED APPLICATIONS

This application is a continuation-in-part of application Ser. No. 08/299,486, filed on Sep. 1, 1994, now abandoned, which is a continuation-in-part of application Ser. No. 08/110,503, filed Aug. 20, 1993, which is itself a continuation of application Ser. No. 07/675,632, filed Mar. 27, 1991 and now U.S. Pat. No. 5,274,560 which issued on Dec. 28, 1993, which is a continuation-in-part of application Ser. No. 07/621,577, filed Dec. 3, 1990 and now abandoned.

NOTICE REGARDING COPYRIGHTED MATERIAL

A portion of the disclosure of this patent document contains materials which is subject to copyright protection. The copyright owner has no objection to the facsimile reproduction by anyone of the patent document or the patent disclosure as it appears in the Patent and Trademark office patent file or records, but otherwise reserves all copyright rights whatsoever.

BACKGROUND OF THE INVENTION

1. Field of Invention

This invention relates in general to navigation systems, and more particularly to a navigation system incorporating artificial intelligence that is useful for cars and trucks requiring no sensors for spatially locating the vehicle and which uses an audio, rather than visual, interface with the driver.

2. Description of the Related Art

Many existing navigation systems utilize internal sensors or navigation satellites to locate the subject vehicle with respect to a digital map and then, once located, create a visual presentation of the map, the location of the vehicle and the destination point on a CRT mounted in the dashboard or elsewhere in the vehicle. Some systems also calculate a preferred route which is highlighted on the displayed map. A great deal of effort and technology is used in these systems in order to locate the vehicle as accurately as possible in order to perform the navigation function.

U.S. Pat. Nos. 4,630,209; 4,829,578; 4,502,123; 4,242,731; 4,679,147; 4,796,189; 4,677,429; 4,882,696; 4,749,924; 4,758,959 and 4,827,520 pertain to car navigation systems or to voice actuated control of a vehicle and are representative of these existing navigation systems.

For example, U.S. Pat. No. 4,758,959 issued to Thoone et al., is indicative of both the ability and shortcomings of the existing systems. In U.S. Pat. No. 4,758,959, speedometers and accelerometers are utilized to estimate the vehicle's position and corrections are made to try to keep the vehicle positioned on the map. The map and the vehicle are displayed on a CRT. The operator inputs his source and destination points via a keyboard.

The problems associated with this kind of system are as follows:

1. The accelerometer and velocity sensors are subject to drift and can go out of calibration. Even if the sensors were perfect or if very accurate satellite positioning were possible, the maps available are not accurate, having been digitized from maps which are essentially hand drawn. Thus, it is difficult to determine what street or section of street the vehicle is actually on.

2. The presentation of a map on a CRT in a moving vehicle is a dangerous distraction, especially in heavy traffic found around cities.

3. The use of a keyboard for input from the driver is another distraction and could be dangerous to use while the vehicle is in motion.

4. The use of on-board sensors requires the use of specialized procedures with specially trained personnel for proper installation. Typically, this kind of installation is best done at the factory where the vehicle is built. Therefore, these devices miss the broad after-market of existing cars.

SUMMARY OF THE INVENTION

Accordingly, the following are some of the primary objects and advantages of the present invention:

1. To provide a navigation system which uses artificial intelligence algorithms to find the best route from source to destination, without requiring any sensors to locate the car;

2. To provide a navigation system which contains an audio, rather than a visual, interface with the driver and is thereby non-distracting;

3. To provide a means for the driver of the vehicle to negate or deny any turn instruction given by the computer and to demand an alternative route. This feature overcomes the need for extremely accurate maps in which every one-way street and every possible turn restriction (including time of day turn restrictions) have been incorporated;

4. To provide a navigation system having few mechanical parts in order to increase reliability and decrease the cost of production;

5. To provide a navigation system that can be built around a very inexpensive, portable compact disk music player which will keep the music functions while adding the navigation functions;

6. To provide a navigation system which does not have to be installed in the car. It can be portable or in the form of an AM/FM Compact Disc Radio and can be sold to anyone who already has a car;

7. To provide a navigation system with traffic avoidance capability, when digitized traffic information becomes available. An FM receiver can be tuned to pick up the latest traffic information and adjust street and highway speeds accordingly. The artificial intelligence routing algorithms in the device will automatically route the driver around congested areas;

8. To provide a navigation system which may optionally utilize a drive shaft rotation sensor as a convenience to alert the driver that his next turn is coming up. It can also aid in escaping a highway traffic jam which has been detected up ahead by the traffic update receiver (see 7 above);

In summary, the present invention is directed to a navigation system for a vehicle including data storage means for storing a database containing map data and navigation information, means for storing software for controlling the system and effecting route selection in cooperation with the database, and a navigator processor connected for operating the navigation system under control of the software, wherein the data storage means comprise: an audio CD player having a read head and means for positioning the read head in response to positioning signals from the processor; and a CD storing the database in an audio format, the CD being playable by the player.

The novel features of construction and operation of the invention will be more clearly apparent during the course of the following description, reference being had to the accompanying drawings wherein has been illustrated a preferred form of the device of the invention and wherein like characters of reference designate like parts throughout the drawings.

LIST OF REFERENCE NUMERALS APPEARING IN FIG. 4

Micro Processor Components

Figure 1:
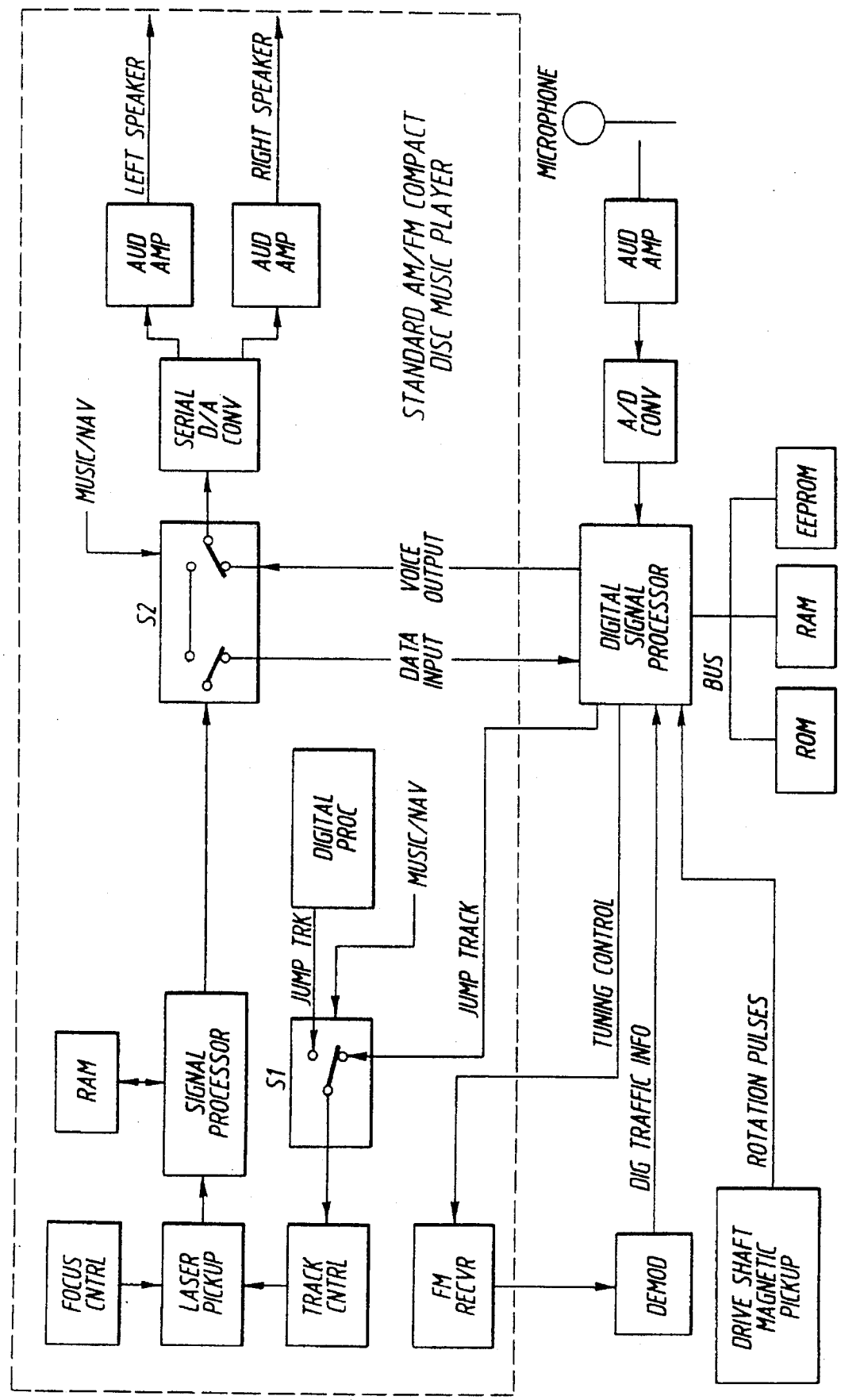
FIG. 1 is a navigator embodiment which contains a single processor, a compact disk with an FM receiver, and a drive shaft rotation sensor. The Digital Signal Processor is the more expensive 32 bit style processor which has a wide enough address space to perform the Navigation functions in addition to the Speech Processing and Disk Control functions. This embodiment can perform traffic avoidance functions.
Figure 2:
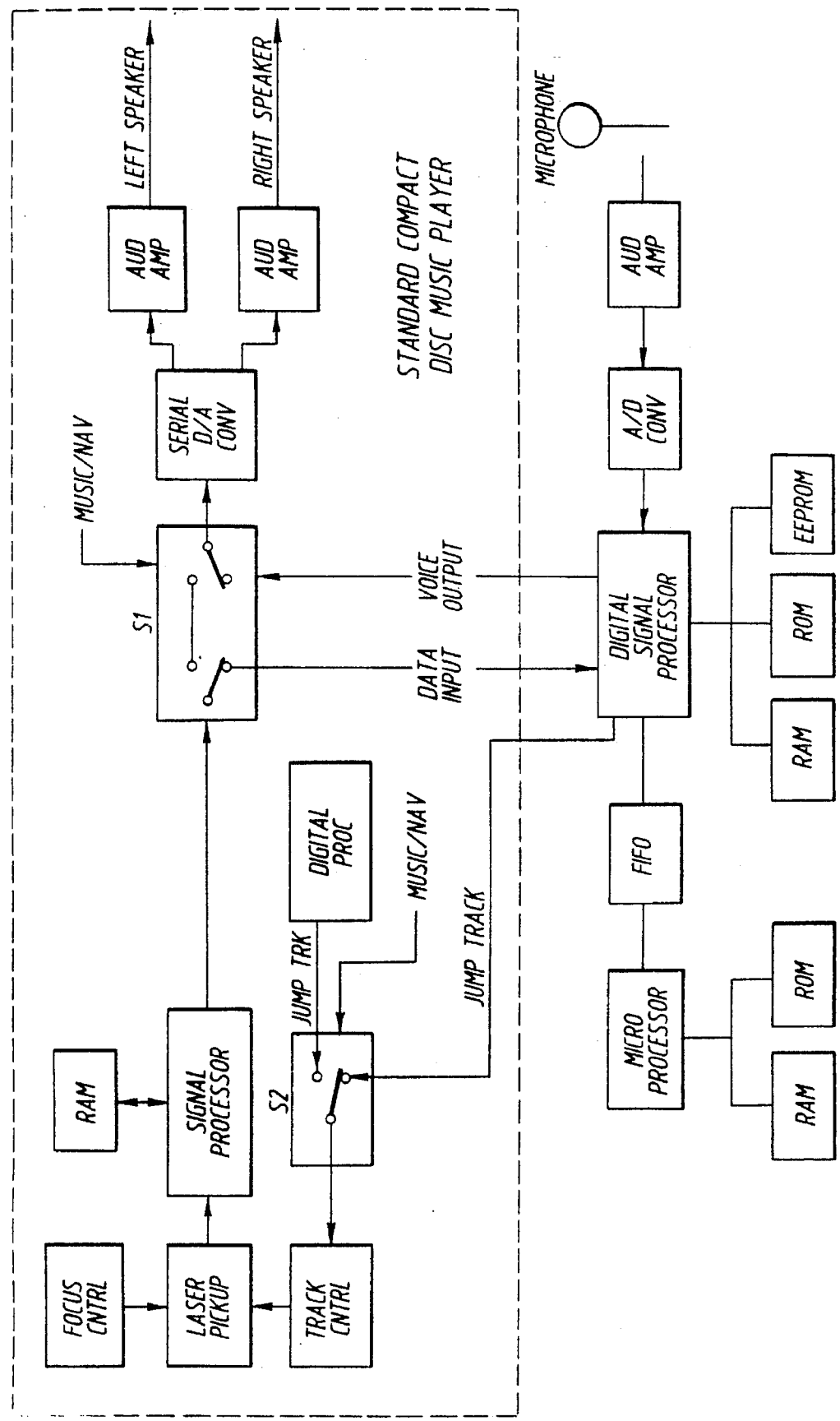
FIG. 2 is a navigator embodiment which contains two processors. The Digital Signal Processor is the less expensive 16 bit style which only has enough addressing capability to perform the speech processing and disc control functions. The Navigation functions, which require a larger address space, are done in a separate 32 bit Micro Processor. Communication between the two processors is by means of a FIFO. The compact disk player does not contain an FM radio and therefor this embodiment cannot perform the traffic update functions.
Figure 3:
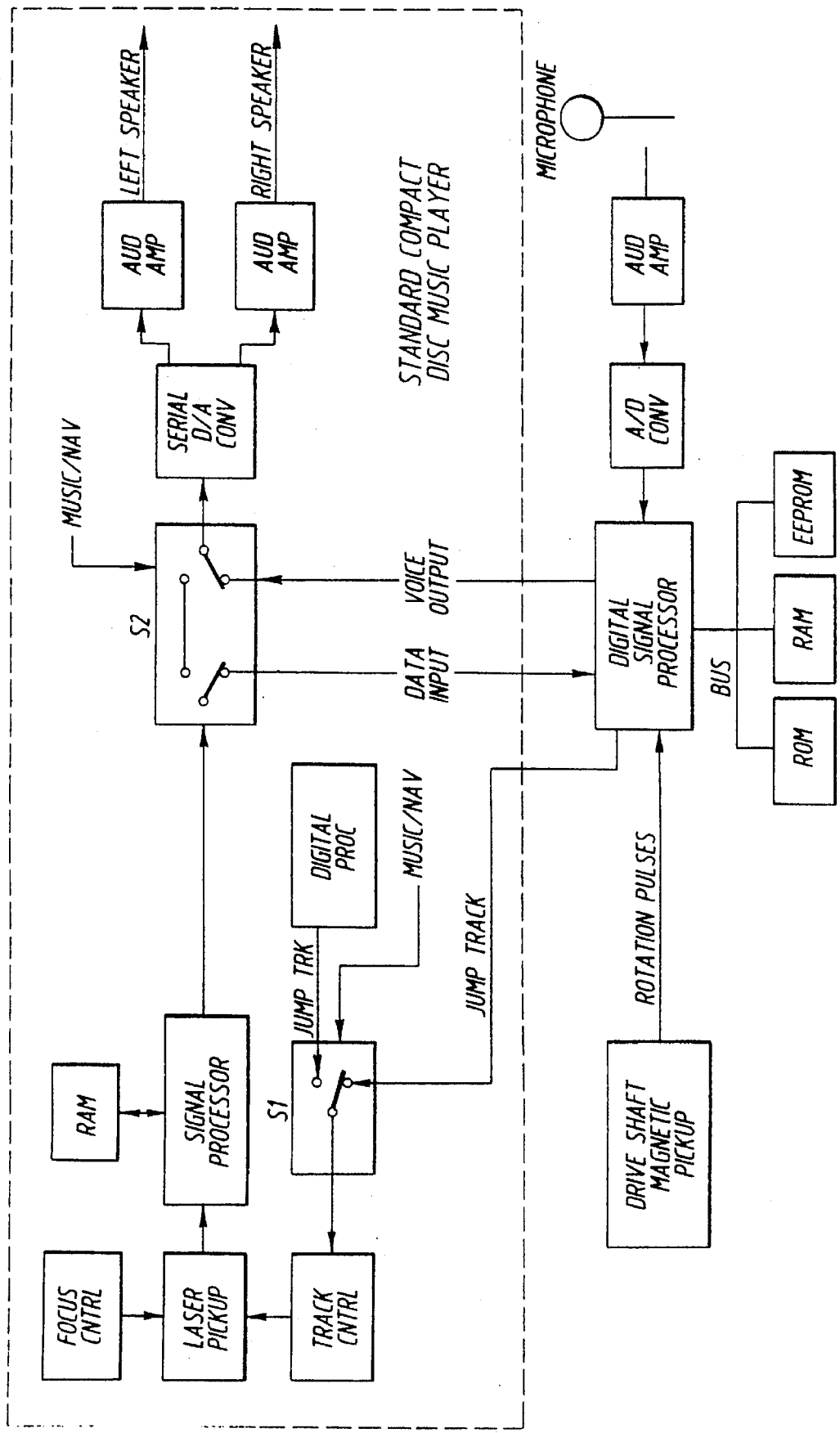
FIG. 3 is a navigator embodiment which contains a single processor and a drive shaft rotation sensor. It contains the more expensive 32 bit Digital Signal processor. The compact disk player does not contain an FM radio and therefor this embodiment cannot perform the traffic update functions.

1 Noise cancelling microphone
2 Audio amplifier for amplifying the signal from the microphone
3 Analog To Digital Converter for digitizing audio signal
4 Digital Signal Processor for disk and speech input/output
5 EEPROM for storing speech templates
6 ROM for storing the bootstrap routine
7 RAM for storing program, speech and map data
8 FIFO used for data transfers between the two microprocessors
9 Navigation Processor
10 ROM for storing the bootstrap routine
11 RAM for storing program and map data
12 Sub-carrier demodulator for retrieving digital traffic information
13 Optional drive shaft rotation sensor

Compact Disk Player Components

14 FM receiver
15 Tracking control servo
16 Three beam LAZER pickup
17 Focus control servo
18 Signal processor for error correction
19 Random access memory for data buffering
20 Digital processor for music functions
21 Serial digital to analog converter for voice and music output
22 Left speaker audio amplifier
23 Right speaker audio amplifier
S1 Music/Navigation selection switch
S2 Music/Navigation selection switch

BRIEF DESCRIPTION OF THE APPENDICES

Appendix A

Appendix A contains a program listing for controlling the microprocessor of the illustrated embodiment. Appendix A contains ten modules, A1–A10.

Module A1 contains a routing algorithm for computing the path from the starting address to the destination address.

Module A2 contains an input/output routine which enables the microprocessor to control the digital signal processor like a slave.

Module A3 is the executive routine which is used to call the other routines of the program.

Module A4 is an address matching algorithm which finds the node in the map data base which corresponds to an address.

Module A5 contains a spelling checker routine.

Module A6 contains a routine to create sentences for the enunciation of the computed path.

Module A7 contains a speech training routine.

Module A8 contains a data file of the voice templates for the digital signal processor.

Module A9 contains the helper file.

Module A10 contains a test program for the branch and bound/A* algorithm.

Figure 4:
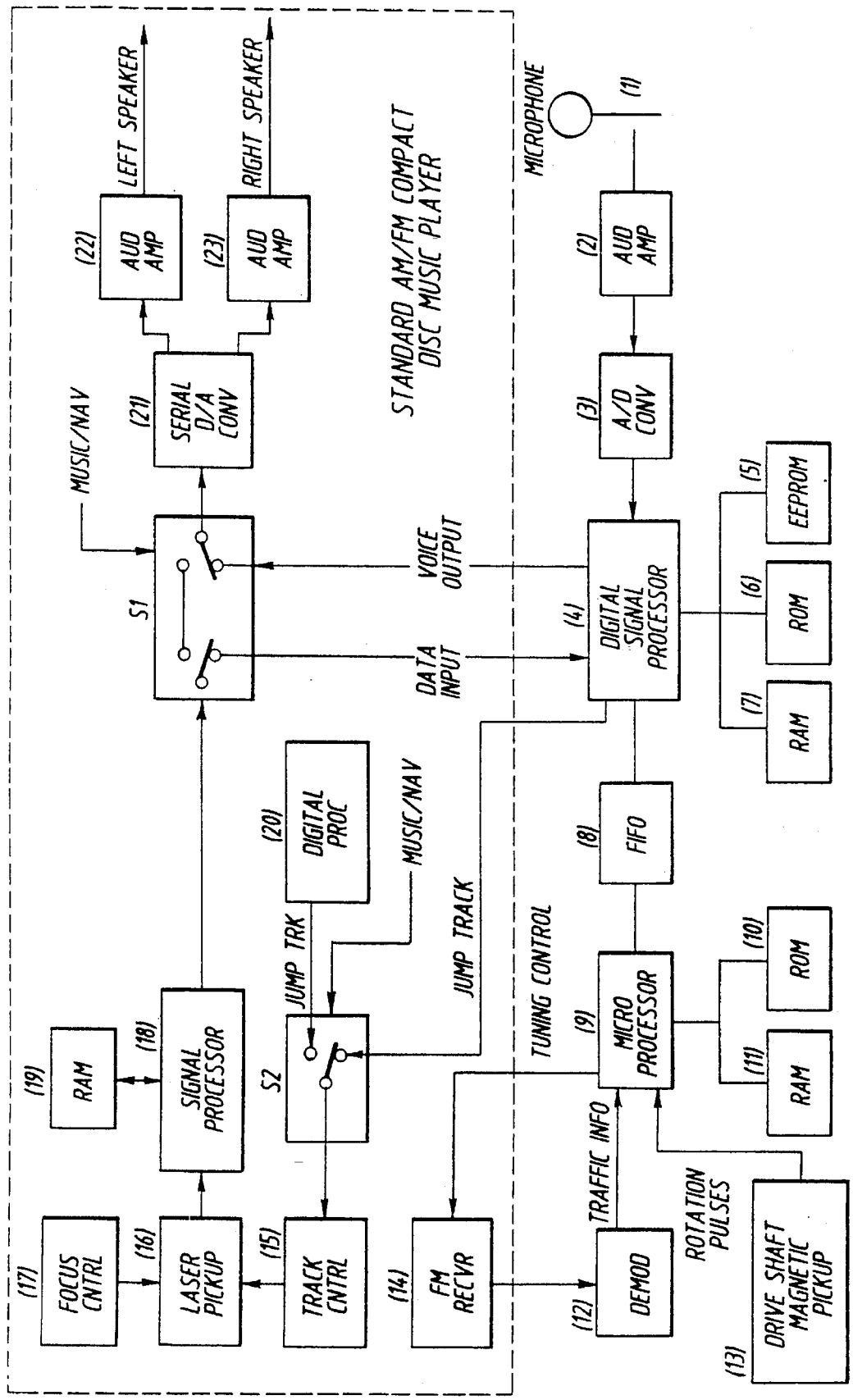
FIG. 4 is a navigator embodiment which contains two processors, a compact disk with an FM receiver, and a drive shaft rotation sensor.
Figure 5:
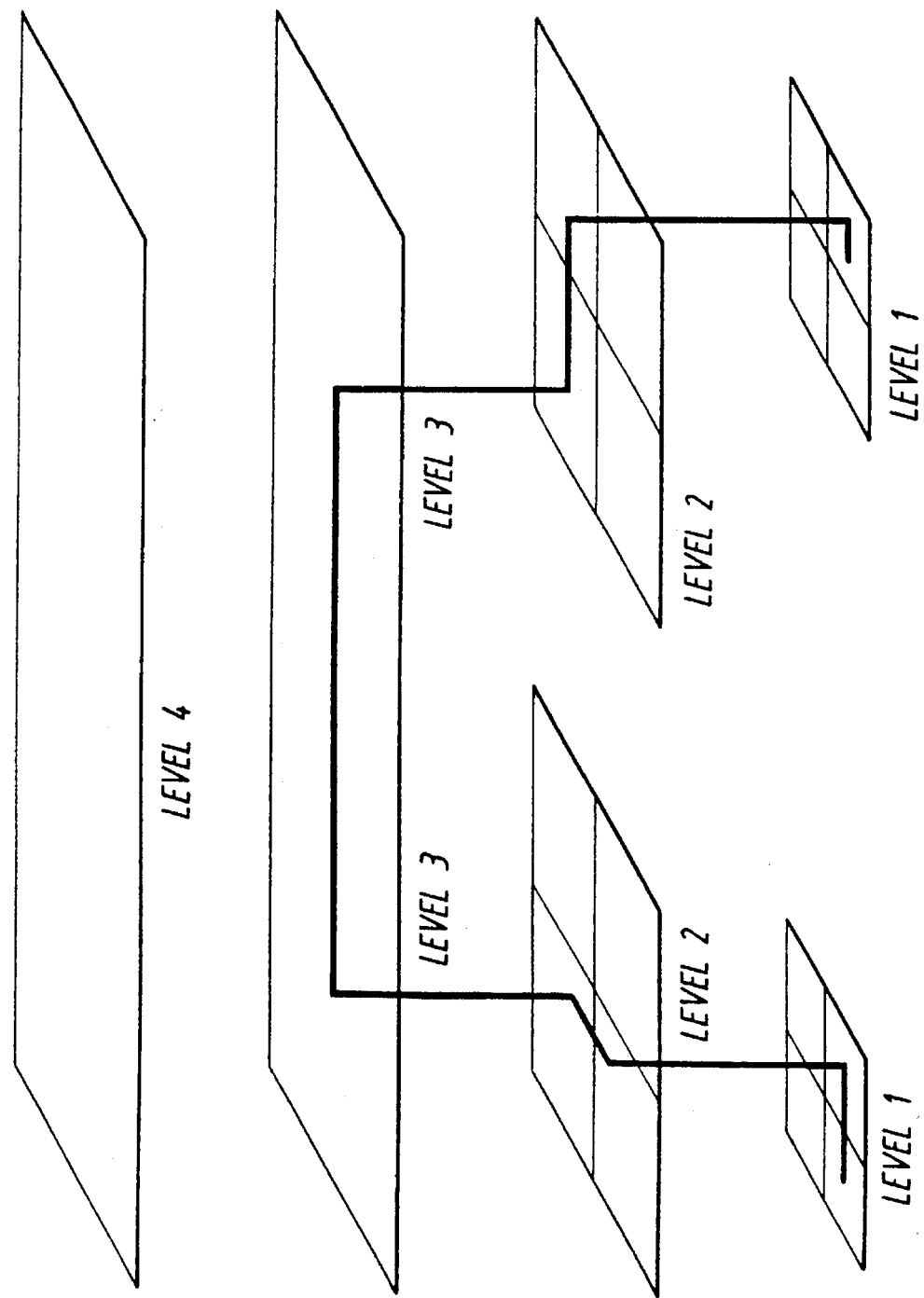
FIG. 5 shows how routing occurs utilizing a multi-level map data base.

DETAILED DESCRIPTION OF THE DRAWINGS
(Refer To FIG. 4)

A directional Microphone (1) picks up the driver's voice.

An Audio Amplifier (2) amplifies the signal from the microphone and rolls off the frequencies above 4000 Hz.

A 13 bit (or better) Analog To Digital Converter (3) samples and quantizes the output of the audio amplifier at about 8000 Hz.

A high speed Digital Signal Processor (4) analyzes the digitized, sampled output and extracts important speech features. In the illustrated embodiment, the DSP (4) is a model 2111 integrated circuit manufactured by Analog Devices.

EEPROM (5) or some equivalent nonvolatile memory is used for storing speech feature "templates" created by the Digital Signal Processor (4).

ROM (6) holds a minimal bootstrap program utilized by the Digital Signal Processor at startup or restart.

RAM (7) is used for temporary storage of optical disk data input by the Digital Signal Processor (4) from the optical disk (not shown).

FIFO (8) is used for data transfers between the Digital Signal Processor (4) and the Navigation Processor (9). The FIFO (8) may be implemented using memories on board the DSP (4).

The Navigation Processor (9) of the illustrated embodiment is a 68010 microprocessor manufactured by Motorola. Appendix A included within the present specification contains a program listing which includes modules A1–A10 for operating the microprocessor 9. Module A3 contains the executive portion of the program for calling the other routines. Module A9 contains the helper file (C language).

ROM (10) holds a minimal bootstrap program utilized by the Navigation Processor (9) at startup or restart.

RAM (12) holds digital map data used by the Navigation Processor (9).

Drive Shaft Rotation Sensor (13) is a magnet fastened to the drive shaft in the vicinity of a pickup coil, which provides a pulse each time the shaft rotates past the coil. Using this optional sensor, the computer can tell when the next turn is coming up and can therefor alert the driver with a pleasant sounding chime.

FM Receiver (14) is tuned to a traffic update channel by the Navigation Processor. The output of the receiver is demodulated by DEMOD (12) and passed to the Navigation Processor (9).

Track Control Servo (15) is used to maintain the LASER Pickup (16) over the center of an optical disc track or to slew inward or outward when a track jump needs to be performed. Track jump signals come from the Digital Processor (20) or from the Digital Signal Processor (4) depending on the setting of Switch S2.

Digital Processor (20) controls music playing when the unit is in the music mode.

Signal Processor (18) and its associated RAM (19) are used to de-interleave and to detect and correct errors in the music or data read from the optical disk. The corrected signal is routed to the Serial D/A Converter (21) or to the Digital Signal Processor (4) depending on the setting of Switch S1.

Serial D/A Converter (21) converts digitized music or voice records to analog waveforms for left and right channels. Sound is output via the left and right Audio Amplifiers (22 and 23).

Switches S1 and S2 select the system mode—music or navigation. When these switches are in the down (navigate) position, the Digital Signal Processor (4) receives optical disk data from the Signal Processor (18) and sends track jump commands to the Track Control Servo (15).

OPERATION OF THE INVENTION ILLUSTRATED EMBODIMENT (Refer To FIG. 4)

Speech Training

One type of speech recognition algorithm which may be used by this navigator is a small vocabulary, speaker dependent recognizer. This type of recognizer requires a training phase in which the user says the words in the vocabulary several times in order to form templates against which future utterances can be matched. Training removes many problems associated with people who have unusual accents or voice qualities.

Figure 6:
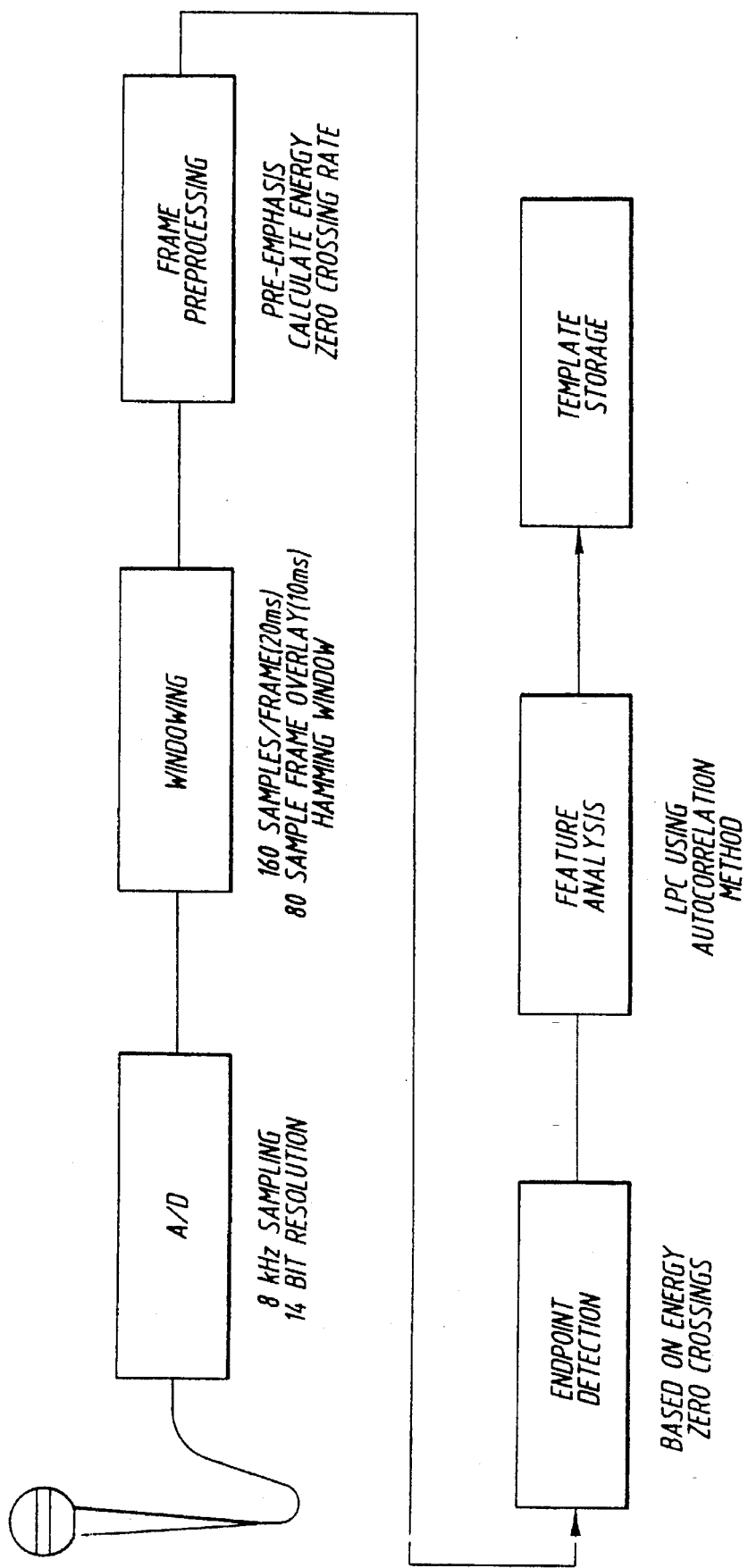
FIG. 6 is a flow diagram of the speech training process.

This training task is accomplished by the Digital Signal Processor (4) under the direction and control of the Navigation Processor (9) using primarily module A7 of the program of Appendix A. Refer to FIG. 6 for the training functional flow.

NOTE: Unless specifically stated otherwise, the word "computer" will be used from hereon to refer to both of these devices working together to perform particular functions.

To accomplish the training, a dialogue between the computer and the operator is begun in which the computer asks the operator to say the letters of the alphabet A–Z, the numerals 0–9, and various control words needed by the computer, such as "Yes", "No", "No Turn", etc. The user responds by speaking the requested words into the directional Microphone (1).

An Audio Amplifier (2) conditions the signal, amplifying it and rolling off the high frequencies above 4000 Hz.

An Analog To Digital Converter (3) samples and quantizes the word being spoken at 8000 Hz and passes the quantized samples to the Digital Signal Processor (4).

The Digital Signal Processor (4), breaks the word into overlapping 20 msec frames and analyzes each frame for important features in a process known as "feature extraction". Features commonly extracted by commercial recognizers are total frequency band energy, Linear Predictive Coding (LPC) coefficients and cepstral coefficients which can be derived from LPC coefficients. The features are stored in EEPROM (5) as templates as module A8. Other non-volatile memories may be used such as FLASH memories, and battery backed up CMOS memories.

Test performed with the "NEC SAR-10 Voice Plus" speech demonstration card show that accurate recognition for this application requires two or three training passes. Additionally, since the audio navigator may be used regularly by more than one person, the EEPROM (5) must be large enough to hold two or three sets of templates for each person who will be using the device on a regular basis.

A second, more practicable, speech recognition method is to use a speaker independent recognizer. These recognizers are widely used in car phones to permit anyone to dial the phone by voice. One commercially available program for recognizing spoken utterances is marketed by Lernout and Hauspie Speech Products U.S.A., Inc., of Woburn, Mass., under the product name CSR-1000 Algorithm. The training process for this algorithm is done "at the factory" by recording the speech patterns of hundreds of people and then deriving Hidden Markov Phoneme Speech Models to be used for pattern matching by the algorithm.

Speech Recognition

Speech input is required when the driver starts his trip and during the trip. When the driver starts his trip, he will verbally enter the address of his source and destination; during the trip, he will ask for the next instruction when he has completed the previous instruction.

Figure 7:
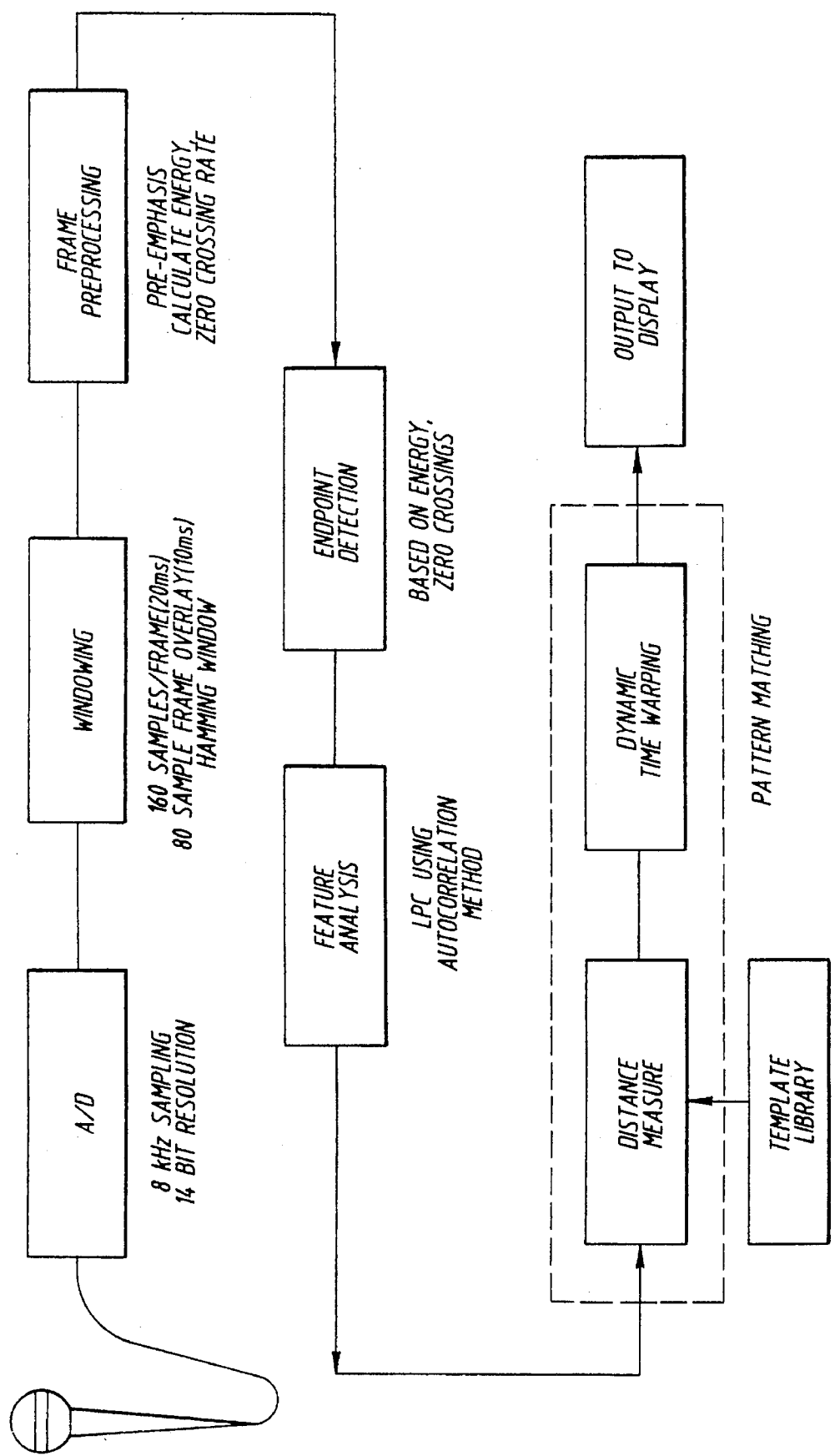
FIG. 7 is a flow diagram of the speech recognition process.

For a speaker dependent recognizer, in order to recognize the word being spoken, the Digital Signal Processor (4) under the control of the Navigation Processor (9) using primarily module A2, extracts the features, just as was done during the training phase. But this time, the features of the spoken word are matched with the templates stored in the EEPROM (5) memory and the best match is taken to be the word spoken. Refer to FIG. 7 for a functional flow diagram of this process.

The matching process used is called "Dynamic Time Warping" in which the features in the unknown word are time aligned and compared with each of the templates. The template with the smallest distance from the unknown word is the winner. An ASCII code for the recognized word is passed to the Navigation Processor (9) by means of the bi-directional FIFO (34). For the CSR-1000 speaker independent recognizer mentioned above, a Viterbi decoding algorithm is used instead of the dynamic time warping method.

Spelling Checker

In the English language (and in Spanish also) certain letters rhyme and can be easily confused by speech recognizers. Therefore, in this system, speech recognition is enhanced by use of spelling checker software (module A5), to remove ambiguities associated with letters which rhyme in the English alphabet, such as "B" with "P", "I" with "Y", "J" with "K". The spelling checker solves this by treating rhyming letters as nearly equivalent and using a scoring technique to pull the correct street name out of a number of possible spellings. Thus, the spelling checker makes speech input possible using imperfect speech recognizers. Without it, there would be too many errors and speech input would become impractical.

The spelling checker is required only for the English alphabet. The numeric digits from 0 to 9 do not rhyme with each other and therefore speech recognition of numbers is relatively easy to accomplish. A spelling checker is not possible and is not required for recognizing numeric digits.

To illustrate the power of the spelling checker, let us assume that the driver wants to spell the street name BARBARA STREET. Due to mis-recognition, the computer hears DKRVJRK STREET. When scoring is applied, however, the rhyming letters D, V, B and A, J, K give BARBARA STREET the highest score and so BARBARA STREET is chosen as the most likely street name. The correctness of this process has been verified many times in trial runs using prototype software and hardware.

Creating Speech Output Records

Digitized voice records are stored on the optical disc preferably in a highly compressed form using a Mu Law compression technique to achieve a compression of 64 Kbits/sec. It is anticipated that an enhanced LPC encoding technique may be used to achieve a compression of 13 Kbits/s while keeping the voice quality high.

The voice records are created at a work station, where an actor or actress speaks the street names and the guidance words, such as "TURN LEFT ON", in his or her natural voice. The words are digitized, compressed and saved in a data base which is eventually placed on the optical disk.

By compressing the speech, the time to retrieve the word from the disk becomes smaller and the amount of RAM memory required for buffering is smaller, thus saving the cost of additional RAM memory.

This method is superior to voice synthesis and gives a natural, non-robotic sound. Since the optical disk contains sufficient space for digitized voice records, it is a cost effective way of implementing voice output.

Disk Input functions

The map data base and the compressed digitized voice records are stored on the optical disk (not shown). Additionally, to allow software updates, the software for both the Digital Signal Processor (4) and the Navigation Processor (9) are also stored on the disk. Both processors have minimal bootstrap programs stored in their respective on-chip or external ROMs (6 and 10)—just enough to allow the software stored on the optical disk to be loaded into the RAMs (7 and 12).

In order to read any particular sector on the disk, a signal is first sent to the Track Control Servo (15) via Switch S2 to open the tracking servo loop. Next, a slewing signal is sent to command the LASER Pickup (16) to move inward or outward. As the head moves past tracks on the disc, the servo loop generates a saw tooth shaped error function with a frequency which corresponds exactly to the rate at which track jumping is occurring. By counting saw tooth waves, the Digital Signal Processor (4) knows approximately on which track the read head is located.

When the read head is positioned near or past the required track, the Digital Signal Processor (4) closes the servo loop, allowing the LASER Pickup (16) to acquire data and pass it on to the Signal Processor (18) for de-interleaving and error correction. The error corrected output from the Signal Processor is a serial pulse train of 16 bit words. This output is routed to the Digital Signal Processor (4) via Switch S1 to be converted from serial pulses to 16 bit words.

If the data being read is map data, it is stored in FIFO (8) for use by the Navigation Processor (9). If the data being read are digitized voice records, the Digital Signal Processor (4) may store them in its own RAM (7) to be decompressed and output as described earlier or in RAM 17.

When Switches S1 and S2 are UP, the system is in the music mode and neither processor is active.

Speech Output functions

When the computer needs to speak to the operator, the Navigation Processor (9) using primarily modules A2 and A6, places into the FIFO (9) a list of pointers (optical disk sector numbers) to the compressed, digitized words to be spoken.

The Digital Signal Processor (4) retrieves the list from the FIFO (9), seeks to the correct sector number and reads the compressed records from the disc into RAM (7). Then it decompresses the records and clocks the speech output data to the compact disk player's Serial Analog To Digital Convertor (21) via Switch S1.

The output from the DAC is amplified by the left and right Audio Amplifiers (60 and 62) and sent to a pair of speakers or headphones.

Traffic Avoidance functions

In the very near future, when private, as well as State and Federal, agencies begin to broadcast digitized traffic information over reserved FM sidebands, this invention will be able to utilize updated highway speed information in calculating optimum routes. This gives the driver another use for the device, that of traffic avoidance.

To achieve traffic avoidance, the Navigation Processor (9) sends a signal to tune the FM Receiver (14) to the traffic avoidance frequency. The FM receiver's output is demodulated by the DEMOD (12) and the digitized highway speed information is input by the Navigation Processor (9). If, during a trip, the computer finds that one of the highways to be used on the trip has become congested, the following actions can be performed:

1. The broadcast facility will broadcast information regarding "incidents" along the major highways which are causing traffic delays. The incident information will consist of speed codes and the identity of the sections of the highway which are affected by such incidents.

2. The navigator will modify the portion of the data base containing speeds of those sections of the highway affected by traffic and then will calculate the best route from source to destination.

3. The navigator will then examine the route. At each point along the calculated route where a traffic slowdown has occurred, the navigator will save the route up to a point just prior to the slowdown and then recalculate the route from that point forward. The recalculation may take the driver off the highway for a time. The combined route after all such recalculations is the optimum route.

Map data base description

The map data base is stored on the optical disk. The data base contains the following elements:

Names list—a file of street names and pointers to corresponding digitized voice records. It is used for voice output of street names.

Street index—a file of street name numbers, grid numbers, and address ranges. It is used to find the grids surrounding the operator's source and destination addresses.

Level 1 grids—a file of street segments contained in the level 1 map grids. Level 1 grids are the most detailed and contain segments and linkages for (a) local streets, (b) major streets, (c) on–off ramps, (d) highway interchanges and (e) highways. Level 1 grids are about 1×1 mile in size. Four level one grids surrounding the source and destination points are read into RAM (12) prior to the route finding process.

Level 2 grids—a file of street segments contained in the level 2 map grids. Level 2 grids are less detailed and contains segments and linkages for (a) major streets, (b) on–off ramps, (c) highway interchanges and (d) highways; local streets are omitted. Level 2 grids are about 6×6 miles in size. Four level 2 grids surrounding the source and destination points are read into RAM (12) prior to the route finding process.

Level 3 grid—a file of street segments contained in the level 3 map grid. The level 3 grid has still less detail and contains segments and linkages for (a) on–off ramps, (b) highway interchanges and (c) highways. There is only one level 3 grid and it encompasses one or more counties.

Level 4 grid—a file of street segments contained in the level 4 map grid. The level 4 grid is the least detailed and contains segments and linkages for (a) highway interchanges and (b) highways. There is only one level 4 grid and it covers the a very large area, for example, Northern California. Level 4 is only used for routing from city to city over the highway system.

For data bases which cover a relatively small area, such as a single city, a single level grid may be used.

Voice data base description

The voice data base is a file of compressed voice records. The record lengths are variable and contain digitized street names and guidance phrases, such as "BEAR LEFT ONTO . . . ", or "TURN RIGHT ON . . . ". They are formed by an actress speaking the words into a microphone at a work station which compresses the records and plays them back for editing.

Routing Algorithm

The routing algorithm utilized in this system is based on the A* path finding algorithm described by Peter Hart et al., "A Formal Basis for the Heuristic Determination of Minimum Cost Paths", IEEE Transactions System Science and Cybernetics, Vol. SS-4, No. 2, July, 1968. This path finding algorithm, also called a "Dynamic Programming" algorithm, has the advantage over other types of search algorithms in that it locates the best path without having to search all possible paths.

An example of such an A* algorithm is given in module A1. Various routing algorithm including the A* are discussed in the book "Artificial Intelligence" by Pattrick Henry Winston, pages 89–120. In tailoring the A* algorithm for this navigator, a modification was performed. That is, travel time was optimized rather than travel distance. This was done by incorporating street speed codes into the data base.

It is appreciated that the search can be conducted from arc center to arc center, rather than from node to node (nodes are points where two or more arcs intersect). It is believed that it takes less memory to store a network of arcs, and that it is easier to incorporate turn restrictions into the data base.

The implementation of the A* algorithm of module A1 differs from the usual implementation with regard to the data base layout. In order to understand the difference, some terms must first be defined.

A digitized road map data base, called a GRAPH, consists of a list of straight line segments called ARCS, which represent the streets. Curved streets are broken into a series of straight line arcs in order to approximate the curve.

The point at which two or more arcs intersect is called a NODE. A common example is the intersection of two streets in which four arcs meet at a central node.

Figure 8:
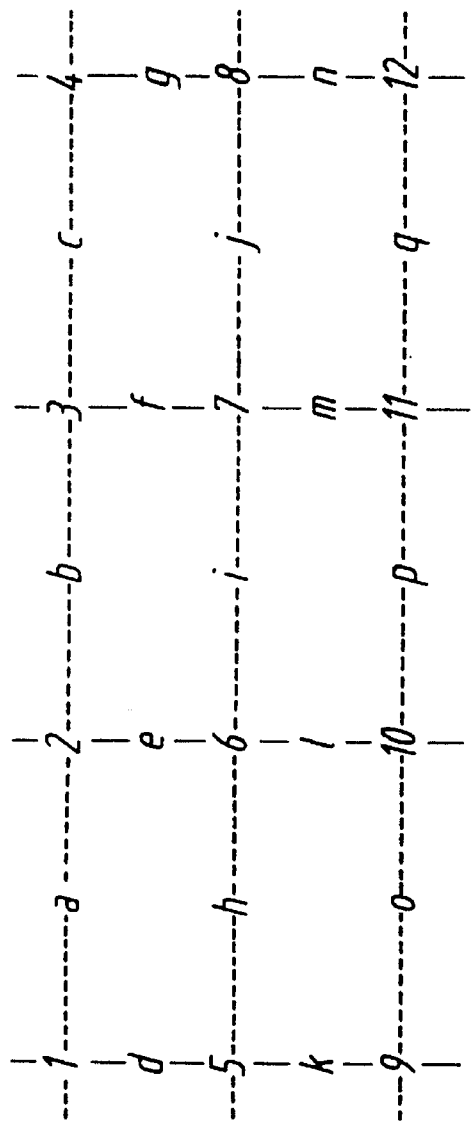
FIG. 8 is a graph of nodes and arcs of a map data base.

FIG. 8 shows an example of a graph containing 12 nodes and 17 arcs. In the usual implementation, all the NODE information is placed in a NODE list and all the ARC information is placed in an ARC list.

As a minimum, each node in the NODE list contains the node's x, y coordinates, points to each adjacent node, and pointers to the intervening arcs. Each arc in the ARC list contains the arc name (or a pointer to the name) and the COST (i.e., time or distance) of traveling along the arc.

Using the graph above, the list elements for node 6 and arc i would look like this:

NODE List element for node 6:

X coordinate
Y coordinate
Pointer to node 5
Pointer to node 2
Pointer to node 7
Pointer to node 10
Pointer to arc h
Pointer to arc e
Pointer to arc i
Pointer to arc 1

ARC List element for arc i:

Pointer to name of arc i
Travel time along arc i

Once the data base is placed into the above format, the A* algorithm uses the pointers to compute that Node-To-Node Path which minimizes the cost of getting from a starting node to an ending node. In the above example, the A* algorithm might compute that least cost or shortest path from node 6 to node 3 would be path 6-7-3 in which the cost is sum of the distances of arcs i and f.

The drawback to the usual node/arc representation comes when turn restrictions are in effect. For example, the left turn from arc i onto arc f may be illegal. The data base as given thus may not contain sufficient information to prevent the A* algorithm from choosing a path that violates this turn restriction.

Therefore, a different layout of the data base has been chosen which accommodates itself more easily to turn restrictions as well as to one way street restrictions. In the illustrated embodiment, the NODE list is eliminated. Instead, all the arcs are placed in a single list containing both the arc definitions and pointers to adjacent arcs.

If a turn from one arc onto another is illegal, then the pointer to that adjacent arc is simply removed from the list or not included in the first place.

Figure 9:
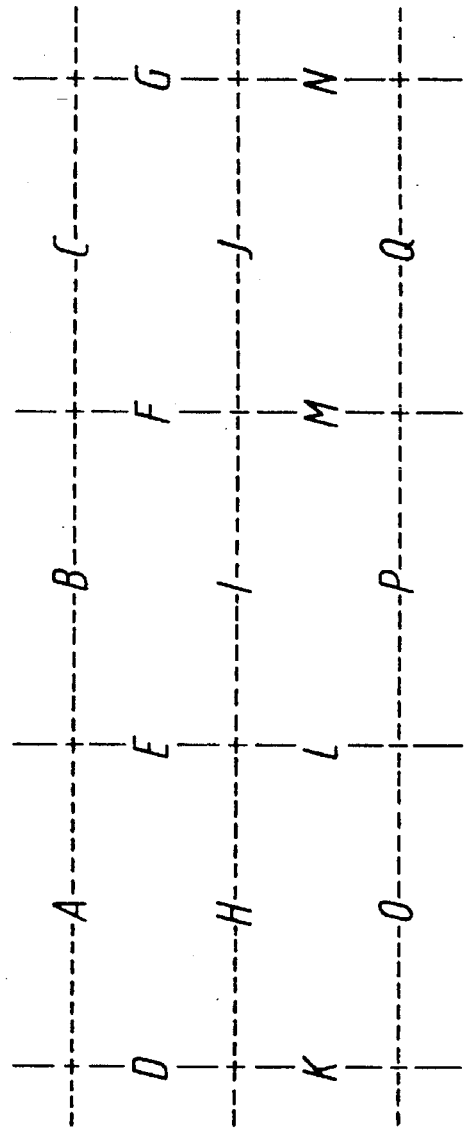
FIG. 9 is a graph of arcs of a map data base.

As an example, a similar case, containing 17 arcs is shown in FIG. 9. However, in this example, only the arcs are shown.

Using the graph of FIG. 9, the list element for arc I would look like this:

ARC List element for arc I:

Pointer to name of arc I
Travel time along arc I
X coordinate of center of arc I
Y coordinate of center of arc I
Pointer to arc H
Pointer to arc E
Pointer to arc L
Pointer to arc L
Pointer to arc J
Pointer to arc F (delete to prevent turn)
Pointer to arc M Note, to prevent a turn from arc I to arc F, the pointer to arc F is simply deleted.

Once the data base is placed into the above format, the A* algorithm uses the pointers to compute that ARC-TO-ARC Path which minimizes the cost of getting from a starting arc to an ending arc. In the above example, since the turn from arc I to F has been deleted, the A* algorithm might compute that least cost or shortest path from arc I to arc F would be path I-J-G-C-F which is a long, but legal path.

Note that the ARC data base layout uses 6 pointers instead of 8, thereby effecting a memory saving as well.

Also, if the optimization feature of this A* algorithm is too restricted resulting in failure to compute a solution, the less optimized branch and bound search may be used as set forth in module A10.

Alternate Routes function

To aid the driver in obtaining alternate routes when a road blockage or some turn restriction occurs, the capability is given the driver to negate the last instruction given by the computer in order to demand an alternate route. When the driver discovers that a turn can't be made, he says to the computer via the Microphone (1) "NO TURN" or "ONE WAY" or "LOST" as the case may be.

If the driver says "NO TURN", the computer breaks the arc linkage which connects the street he is on with the street he says he can't turn onto and re-calculates the route to the destination from his current position.

If the driver says "ONE-WAY", the computer will mark the entire connected street in memory as one-way and re-calculates the route.

If the driver says "LOST", the computer will ask him for his current location and will calculate the best route to his destination.

Address Matching function

To begin the navigation function, the computer as set forth in module A4 requests the driver to enter his starting and ending address, either as a street address or as the intersections of two streets. If an ambiguity occurs, the driver may be asked to enter the city name as well.

The street index in the map data base is used to locate the grids surrounding the address or street intersection specified by the user. These are the grids to be read into the RAM (12) for routing.

DIALOGUE WITH DRIVER

This section deals with the interface between the driver and the computer to accomplish navigation. The following are examples of the dialogue—capital letters in quotes are used for the computer's responses, lower case letters in quotes for the driver's responses:

Dialogue When Training The Voice

COMPUTER: "SAY THE LETTERS OF THE ALPHABET, A TO Z"
driver: "a, b, c . . . "
COMPUTER: "SAY THE LETTERS A TO Z AGAIN"
driver: "a, b, c . . . "
COMPUTER: "SAY THE LETTERS A TO Z ONE LAST TIME"
driver: "a, b, c . . . "
COMPUTER: "SAY THE NUMBERS, ZERO TO NINE
driver: "0, 1, 2, 3 . . . "
COMPUTER: "SAY THE NUMBERS ZERO TO NINE AGAIN"
driver: "0, 1, 2 , 3 . . . "
COMPUTER: "SAY THE NUMBERS ZERO TO NINE ONE LAST TIME"
driver: "0, 1, 2, 3 . . . "
COMPUTER: "SAY THE WORD BLANK"
driver: "blank"
COMPUTER: "SAY THE WORD YES"
driver: "yes"
COMPUTER: "SAY THE WORD NO"
driver: "no"
COMPUTER: "SAY THE WORD NEXT"
driver: "next"
COMPUTER: "SAY THE WORD PREVIOUS"
driver: "previous"
COMPUTER: "SAY THE WORD REPEAT"
driver: "repeat"
COMPUTER: "SAY THE WORDS NO-TURN"
driver: "no-turn"
COMPUTER: "SAY THE WORDS ONE-WAY"
driver: "one way"
COMPUTER: "SAY THE WORD LOST"
driver: "lost"
COMPUTER: "SAY THE WORDS CROSS STREET"
driver: "cross street"

Dialogue for Entering Source and Destination

COMPUTER: "YOUR NAVIGATOR IS READY"
driver: "navigator"
COMPUTER: "PLEASE SPELL THE STREET NAME OF YOUR STARTING POINT"
driver: "m-a-i-n enter"
COMPUTER: "PLEASE SAY THE STREET NUMBER"
driver: "cross street"
COMPUTER: "PLEASE SPELL THE NAME OF THE NEAREST CROSS STREET"
driver: "f-i-r-s-t enter"
COMPUTER: "LOCATING THE ADDRESS" (short delay while computer locates the starting address)
COMPUTER: "PLEASE SPELL THE STREET NAME OF YOUR ENDING POINT"
driver: "o-a-k enter"
COMPUTER: "PLEASE SAY THE STREET NUMBER"
driver: "4-3-4-2 enter"
COMPUTER: "LOCATING THE ADDRESS" (short delay)

COMPUTER: "PLEASE SPELL THE CITY NAME OF YOUR ENDING POINT"
driver: "s-h-e-r-m-a-n space o-a-k-s"

Dialogue for Getting the Next or Previous Instruction

COMPUTER: "YOUR TRIP FROM MAIN STREET TO OAK AVE WILL TAKE 34 MINUTES. YOUR TRIP DISTANCE WILL BE 12.4 MILES SAY NEXT, REPEAT OR PREVIOUS FOR INSTRUCTIONS
driver: "next"
COMPUTER: "PROCEED SOUTH ON MAIN STREET 5 BLOCKS" "STREET NUMBERS WILL BE DECREASING" "BEAR RIGHT ON DIXIE STREET"
driver: "next"
COMPUTER: "PROCEED WEST ON DIXIE STREET 2.4 MILES" "MAKE A HARD LEFT ONTO GROVE AVE"
driver: "repeat"
COMPUTER: "PROCEED WEST ON DIXIE STREET 2.4 MILES" "MAKE A HARD LEFT ONTO GROVE AVE"
driver: "next"
COMPUTER: "PROCEED EAST ON OAK AVENUE 7 BLOCKS" "YOU WILL BE AT YOUR DESTINATION"
COMPUTER: "DO YOU WANT TO LOG YOUR TRIP AS A BUSINESS TRIP?"
driver: "yes"

Dialogue When Driver Can't Make Suggested Turn

COMPUTER: "PROCEED SOUTH EAST ON HAMILTON AVE 1.6 MILES"
COMPUTER: "MAKE A HARD LEFT ONTO JEFFERSON AVE"
driver: "no turn"
COMPUTER: "COMPUTING ALTERNATE ROUTE"
COMPUTER: "PROCEED SOUTH EAST ON HAMILTON AVE A BLOCK OR LESS"
COMPUTER: "TURN LEFT ON OXNARD STREET"
driver: "one way"
COMPUTER: "COMPUTING ALTERNATE ROUTE"
COMPUTER: "PROCEED SOUTH EAST ON HAMILTON AVE 2 BLOCKS"
COMPUTER: "TURN LEFT ON SOUTH STREET"
driver: "lost"
COMPUTER: "PLEASE SPELL THE STREET NAME OF YOUR CURRENT LOCATION"
driver: "2-n-d enter"
COMPUTER: "PLEASE SAY THE STREET NUMBER"
driver: "1-3-4 enter"

Navigation System Using Audio CD Player

In accordance with the present invention, at least the database containing map data and routing, or navigation, information, but preferably also the software, or programming, for controlling the navigator, are stored on a CD in audio CD format, so that an ordinary audio CD player can be used to play the navigator CD and transfer data and programming from the CD to the navigator data processing components.

Thus, according to the present invention, an audio CD player is operated to perform second function as the data and program storage component for the navigation system. Compared to other navigation systems which require a separate CD ROM drive for the data storage medium, the use of an audio CD player for this purpose enables the amount of hardware which must be installed in a vehicle for navigation purposes to be minimized. The practical advantages of such dual use of an audio CD player are enhanced by the fact that music reproduction devices of this type are becoming increasingly common in vehicles. It has been found that a number of presently available audio CD player brands can be easily adapted for use in a navigation system according to the invention.

The use of an audio format CD player for this purpose has been proposed in the literature. Such a proposal appears, for example, in Thoone et al, *Application of the Compact Disc in Car Information and Navigation Systems*, SAE Technical Paper Series, Pub. 840156, pages 105–111 (1984). This article does not purport to describe an actual, operating system and does not discuss the manner in which the CD player would be controlled during navigator operation.

Despite the possibilities discussed in the above-cited SAE paper, workers involved with the design of navigators appear to be of the opinion that audio disc error rates are simply too high for navigator use and have turned away from the use of audio format CDs as a navigator system storage medium. Even companies that manufacture both audio CD players and navigators have not proposed such a use for their audio CD players.

Audio CD players do a good job of correcting errors, even errors due to minor scratches on the CD surface. But to make sure that the navigator can function even with a badly scratched disc, all information is stored twice on the disc and a checksum is stored with each sector. When a checksum error is detected for a given sector, the other sector containing the same information is read from the disc. In general, the second copy is diametrically opposite the damaged copy so that a scratch in one copy is unlikely to affect the other copy and therefore the probability of encountering an error in both sectors is very small.

While this technique reduces the data storage capacity by one-half, it is still possible to store on a single CD all of the data and software required for navigation over a large area while experiencing an error rate that will impact on only one route in 200 for the poorest quality CDs and only one route in 200,000 if a slightly better quality CD is employed.

The CD may additionally contain digitized speech information and/or synthesized speech data that may be converted to analog form and reproduced via the CD player audio power amplifier and speakers.

The present invention is based on the realization that an audio CD player can easily be modified to be operated as a navigator system component and that, at least with the type of navigator disclosed herein, the error rates typical of ordinary audio CDs can be made low enough not to interfere with satisfactory navigator operation.

To use an audio CD player in a navigation system, it is only necessary that (1) the navigator be provided with the CD player's digital audio output signal, (2) the navigator be provided with a means to control the CD player's laser head position, and (3) the navigator be provided with a means to output navigator speech instead of music.

Figure 10:
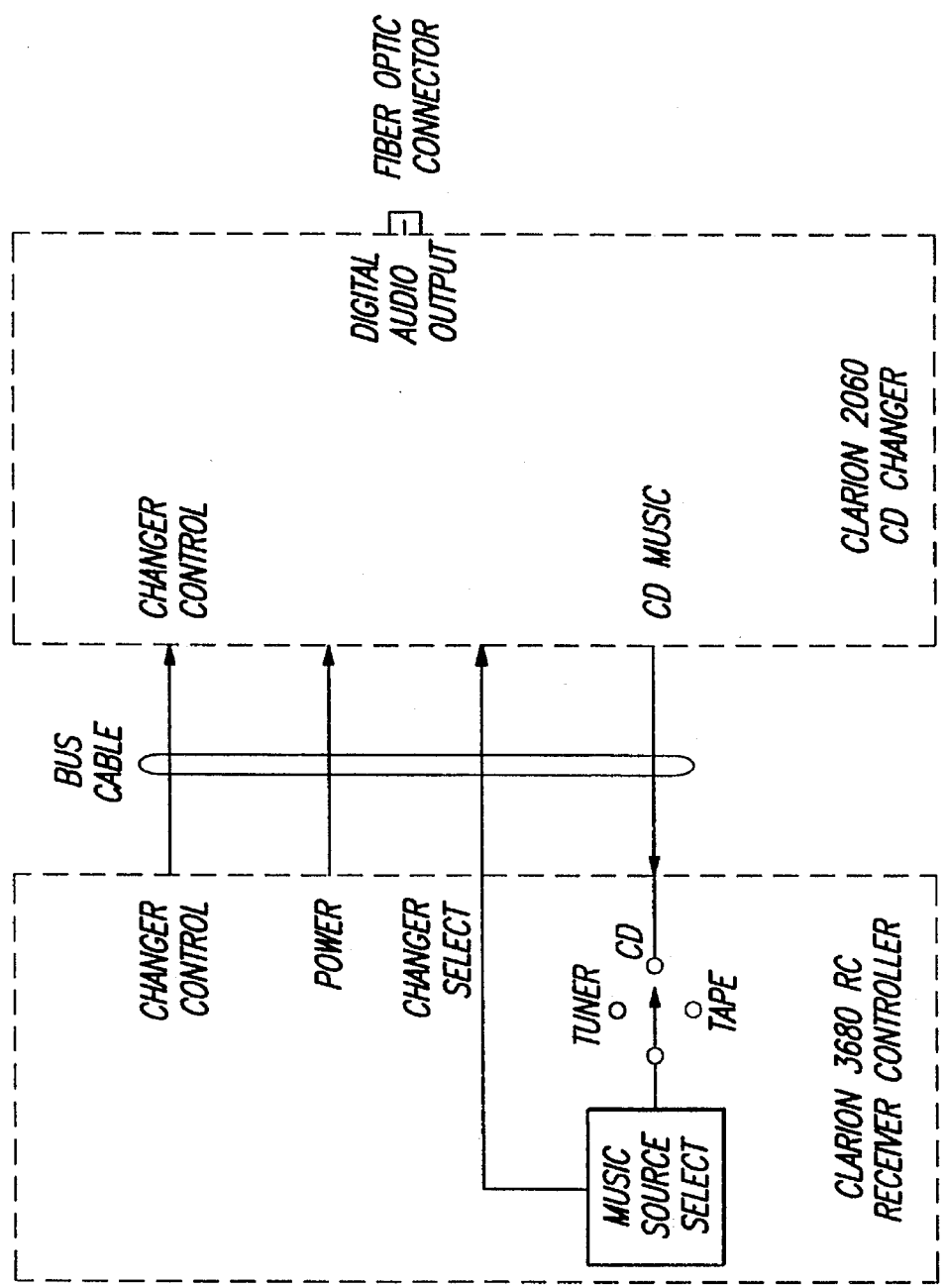
FIG. 10 is a block diagram of a known receiver controller and CD changer which may be utilized in embodiments of the present invention.

There are players on the market which can fulfill each of the above requirements with few or no modifications. One such system is shown in FIG. 10 and is exemplified by a Clarion 2060 compact disc changer under the control of a Clarion 3680RC controller. The two units are connected by means of a cable that constitutes a serial bus for conducting changer control signals, a changer select signal, audio signals and power. Using the controller, the user can select the music source to be a built-in tape player, a radio tuner or any one of the compact discs stored in the changer. Whenever the user selects the tuner or tape player or powers down the control unit, the changer select signal is set low. Otherwise, when the user selects the CD changer as a music source, the changer select signal is set high.

The exemplary changer also sends its digital audio signal out to a fiber optic connector.

This system accommodates itself for use with an audio navigator without any alteration in either the controller or the CD changer unit.

Figure 11:
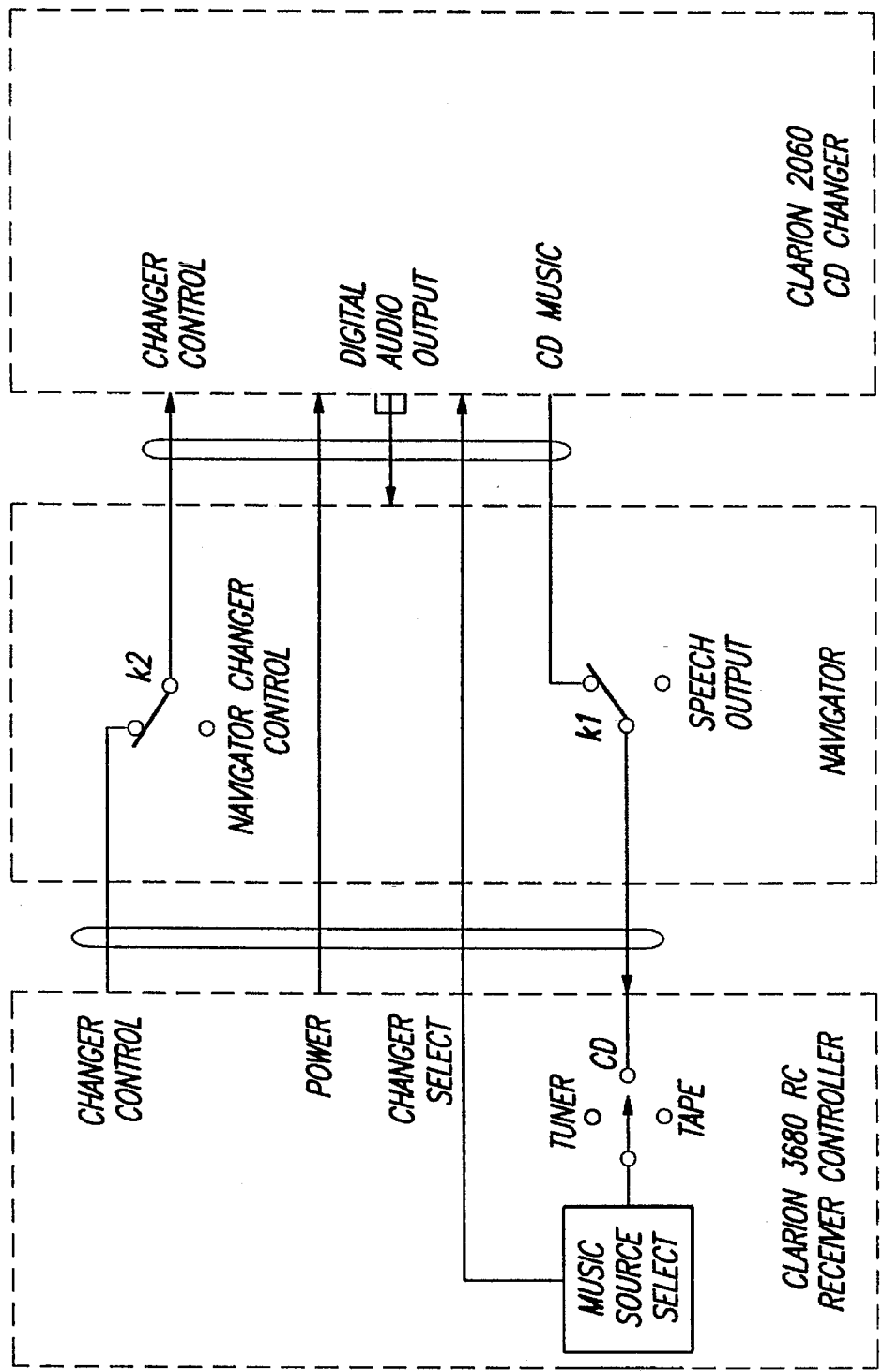
FIG. 11 is a block diagram of a navigator system according to the invention utilizing the components shown in FIG. 10.

As shown in FIG. 11, the invention may be implemented by simply inserting the navigator between the two units. The navigator is connected to receive power, changer control signals and the changer select signal from the controller and receives the digital audio output signal and the compact disc's audio output (music output) from the changer.

The navigator contains two relays. The first relay, K1, is connected in series in the serial bus line normally serving to conduct music signals and is used to select either speech or music for output to the controller while the second relay, K2, is connected in series in the serial bus line normally serving to conduct changer control signals and is used to select either the navigator or the controller as the source of data and clock signals which control the changer. The relay terminals marked "speech output" and "nav. changer control" are connected to appropriate outputs in the navigator.

In use, the navigator performs the following functions:

1. The navigator continually monitors the changer select line. If the select line signal is low, indicating that the user has switched off power or is listening to the tuner or tape player, the navigator "pauses" and will do neither speech input nor speech output. If the line is high, then it allows speech input and output to occur.

2. The navigator continuously "listens" to the digital audio output signal. When it detects a sequential series of valid sectors, identified by data patterns unique to a navigator disc, it knows that the user has switched to a navigation disc and therefore it closes relay K1 which changes the audio source from the CD player to the navigator's speech output circuits. If the navigator loses the sequential series of valid sectors, it knows that the user has switched back to a music disc and therefore opens relay K1, reconnecting the left and right channel audio music signal to the control unit so that the user will once again hear compact disc music.

3. If a navigation disc is mounted for play and if the navigator needs to read data from the disc, it takes over the control of the changer by closing relay K2 so that the changer obtains its data and clock signals from the navigator instead of the controller. In this state, the navigator can cause the changer to switch discs and/or to position the laser head to specific places on the disc so that specific files required for navigation can be read in from the optical disc.

4. To wake up the navigator, the user says a word such as "navigator". The navigator reads a data file from the optical disc which contains digitized speech which says, "DO YOU WANT TO NAVIGATE?" This file is converted into an analog speech signal by the navigator's Digital Signal Processor and sent to the control unit through relay K1. The user hears the phrase "DO YOU WANT TO NAVIGATE?" coming from his loudspeakers. He can reply, "Yes," by speaking into the navigator's microphone, in which case, the navigator continues to load files into memory which it needs for the navigation process. If he says, "No," the navigator opens relay K1 to give up changer control and then goes dormant.

5. After the navigator has computed a route and stored it in memory, it no longer needs to read the optical disc. The user can then switch to a music disc if he wishes. He can then toggle between listening to compact disc music and obtaining driving instructions by saying words such as "music" or "navigator" respectively. If the navigator hears the word "music," it opens relay K1 so that compact disc music can be heard.

There are other systems which require only minor modifications to become navigator compatible. One such system is the JVC KD-MK70 changer and the DS-TR75 control receiver which was modified as follows:

1. The digital audio signal was brought out through a coax cable to the navigator.

2. A new command was programmed into the changer which allowed the navigator to position the laser head to any absolute playing time on the disc to an accuracy of $1/75$ second.

Other controller/navigator/changer configurations can be accommodated. In some systems, it could be advantageous for the navigator to remain a "slave" on the bus and to ask the control unit to issue laser head positioning commands to the changer. This would require reprogramming of the control unit as well as the changer but could allow the control unit to display the actions it is taking on the front panel display in order to give some visual feedback to the user. This has been done with an Alpine unit (TDA-7537 or TDA-7539 head unit and a CHA-S605 changer) which is successfully undergoing field tests.

It is also possible to accommodate a compact disc player installed in a dashboard to a navigator. These units can receive only a single CD which can be used for either navigation or music, but not both. These units are not as versatile because the user must manually eject a navigator disc to play music or eject the music disc to navigate. However, the price is several hundred dollars lower, and so these are viable products. To accommodate an audio navigator, it is only necessary to supply the navigator with (1) the digital audio output (2) a means of controlling the laser head position and (3) a means of replacing music with speech output. A Kenwood unit (KDC-8003) has been modified in this way and is successfully undergoing field trials.

Another unit which has been tested is a modified Eclipse ECD-412 unit.

Figure 12:
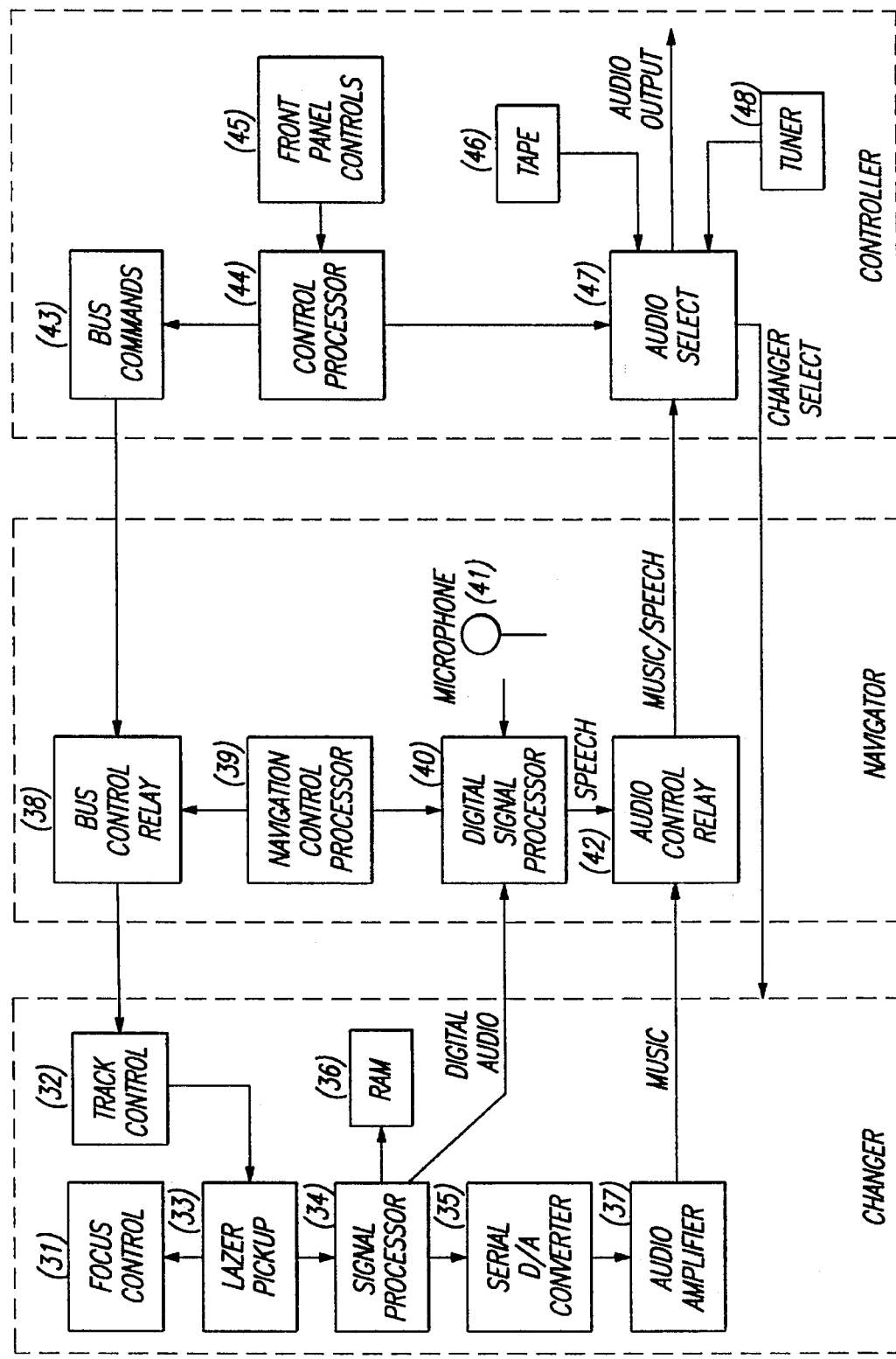
FIG. 12 is a block diagram providing a more detailed illustration of an embodiment of the invention, utilizing a conventional CD changer and receiver controller.

FIG. 12 shows the details of a navigation system utilizing a CD audio changer, a navigator and a compact disc controller. In the changer (usually stored in the trunk of the car), vertical focus control of the laser pickup 33 is performed by the focus servo system 31 while horizontal control of the laser head is performed by the track control processor 32. The signal processor 34 is responsible for demodulating the signal from the laser head and correcting it for errors. The RAM 36 is used by the signal processor to de-interleave the signal as part of the error correction scheme. Music is generated by means of a serial Digital To Analog converter 35 and output amplifier 37. One of the signals available from the Signal Processor 34 is the digital audio output. This signal is usually formatted according to the CP-340 standard for digital audio output.

In the navigator, the navigation control processor 39 inputs the digital audio signal by means of a CP-340 receiver (not shown) and checks the signal for sequential sectors having valid checksums. If found, the navigation control processor closes the audio control relay 42 so as to replace music coming from the changer with speech stored on the compact disc in compressed form and regenerated by the digital signal processor 40. The navigation control processor also closes bus control relay 38 so as to replace bus commands which normally come from the CD controller with its own bus control commands. Thus, the navigation control processor has the ability to command the changer to any specific place on the compact disc so as to read specific data files stored on the disc. The microphone input allows the digital signal processor 42 to recognize commands given by the user for control of the navigation processor. Once the navigation processor calculates a route and stores the route and associated speech data for "explicating" the route, the navigation processor no longer needs the compact disc. This allows the user, via the microphone 41, to switch between music and navigation speech output by means of voice control. The navigator currently uses the trained word "MUSIC" to detect the fact that the user wants to listen to a music compact disc while navigating at the same time. The navigator monitors the changer select line to see if the user has powered down the controller or has switched to the tuner or tape player. If he has done so, the navigator suppresses all speech recognition and speech output because the user cannot hear speech output and therefore should not speak to the navigator.

In the CD controller, which may be mounted in the car's dashboard, the user can push buttons on the front panel 45 in order to control the music and navigation functions. The button actuations are detected by microprocessor 44. The user can select, via the audio select 47, the music source to come from the built in tape unit 46 or the built in AM/FM tuner 48 or the CD player. If the compact disc is chosen as the music source, the user can then push other buttons to command the player via bus commands 43 to select the navigation disc or to select one of the music discs stored in the changer. He can also use buttons to skip to specific songs on the compact disc. These bus commands are intercepted by the navigation control processor 39 and the bus control relay 38 which may interpose its own commands for head positioning.

The invention described above is, of course, susceptible to many variations, modifications and changes, all of which are within the skill of the art. In should be understood that all such variations, modifications and changes are within the spirit and scope of the invention and of the appended claims. Similarly, it will be understood that Applicant intends to cover and claim all changes, modifications and variations of the example of the preferred embodiment of the invention herein disclosed for the purpose of illustration which do not constitute departures from the spirit and scope of the present invention.

APPENDIX A

APPENDIX A

MODULE A1

MODULE A1

```
/*------------------*/
/*      ASTAR.C     */
/*------------------*/

/*----------------------------------------------*/
/* This is my implementation of a fast A* algorithm */
/* Copyright (C) 9/1/88 - Los Angeles county       */
/* By Charles La Rue                               */
/* Confidential algorithm                          */
/*----------------------------------------------*/ include <define.h>
include <struct.h>
/*#include <prototyp.h>*/
#include <stdlib.h>
#include <malloc.h>

/*memory allocation pointers*/
extern struct POS *Pos;
extern struct AN *AdjNodes;
extern struct AA *AdjArcs;
extern struct ARC *Arcs;
extern struct QUE *Que;
extern struct PATH *Path;
extern struct LOST Lost[];
extern short RestrictNum;

/* Module data */
short First;            /*first partial path in queue*/
```

-25-

```
short ExpNod;           /*next node to be expanded*/
short GoalFlag;         /*set true if goal found*/
short StartNode;        /*starting node*/
short EndNode;          /*ending node*/

/*----------------------------*/
/*----------------------------*/
/*Astar fast routing algorithm*/
/*----------------------------*/
/*----------------------------*/
short Astar (short Nodes[])
start /*get map data from optical disk*/
    DownloadMapData();

/*if recovering from lost, break pointers*/
    if (Lost[RestrictNum].Code != 0) then
        BreakPtr (AdjNodes, AdjArcs, Arcs);
    endif /*calculate the best path*/
    printf ("computing best path\n");
    GoalFlag = DoAstar(Nodes, AdjNodes, AdjArcs, Pos, Arcs,
              Path, Que);

/*free up some memory*/
    free (Que);
    free (Arcs);
    free (AdjArcs);
    free (AdjNodes);

/*exit with goal flag*/
    return (GoalFlag);
stop
```

-26-
```
/*------------------------*/
/*------------------------*/
/* calculate the best path */
/*------------------------*/
/*------------------------*/
short DoAstar (short Nodes[], struct AN AdjNodes[],
               struct AA AdjArcs[], struct POS Pos[],
               struct ARC Arcs[], struct PATH Path[],
               struct QUE Que[])

start

/*Extract start and end nodes*/
    StartNode = Nodes[0];
    EndNode = Nodes[1];

/* Form a queue of partial paths */
    FormQueue (Path, Que, Pos);

/* Until the queue is empty or goal has been
    reached...*/
    GoalFlag = 0;
    while (GoalFlag == 0) then /*Remove the first path from the queue*/
        RemoveFirst(Que);

/*If queue not empty and goal not found...*/
        if (GoalFlag == 0) then

/*Form new partial paths by expanding the first
            path in the list*/
            Extend(AdjNodes, AdjArcs, Pos, Arcs, Path,
            Que);
        endif
    endwhile
```

```
                            -27-
    /*exit*/
    `return(GoalFlag);
stop

/*---------------------------------------------------------*/
/*---------------------------------------------------------*/
/* Get the map data needed by ASTAR from the optical disk*/
/*---------------------------------------------------------*/
/*---------------------------------------------------------*/
void DownloadMapData ()
start /*local variables*/
    long SeekDist;
    unsigned short Nwords;

/*allocate buffers*/
    Pos = (struct POS *)calloc(NUM_POS_RCD, sizeof(struct
           POS));
    Path = (struct PATH *)calloc(NUM_AN_RCD,
            sizeof(struct PATH));
    Arcs = (struct ARC *)calloc(NUM_ARC_RCD, sizeof(struct
           ARC));
    AdjArcs = (struct AA *)calloc(NUM_AA_RCD, sizeof(struct
              AA));
    AdjNodes = (struct AN *)calloc(NUM_AN_RCD,
               sizeof(struct AN));
    Que = (struct QUE *)calloc (NUM_AN_RCD, sizeof(struct
          QUE));

/*Read in the 47 pos sectors from XYZ001.DAT*/
    Beep();
    SeekDist = POS_SEC * 160L;
    Nwords = sizeof(struct POS) * NUM_POS_RCD / 2;
    while (Oread (SeekDist, (short *) Pos, Nwords) !=
    PosSum);
```

-28-

```
/*Read in the 47 pos sectors from XYZ001.DAT*/
SeekDist = PosSec * 160L;
Nwords = sizeof(struct POS) * NUM_POS_RCD / 2;
Oread (SeekDist, (short *) Pos, Nwords);

/*Read in the 369 adjnode sectors from NODNET.DAT*/
SeekDist = ADJ_NODES_SEC * 160L;
Nwords = sizeof(struct AN) * NUM_AN_RCD / 2;
Oread (SeekDist, (short *) AdjNodes, Nwords);

/*Read in the 369 adjarc sectors from ARCNET.DAT*/
SeekDist =ADJ_ARCS_SEC * 160L;
Nwords = sizeof(struct AA) * NUM_AA_RCD / 2;
Oread (SeekDist, (short *) AdjArcs, Nwords);

/*Read in the 186 arc sectors from NEWARC.DAT*/
Beep();
SeekDist = ARCS_SEC * 160L;
Nwords = sizeof(struct ARC) * NUM_ARC_RCD / 2;
Oread (SeekDist, (short *) Arcs, Nwords);
stop /*--------------------------------------------*/
/*--------------------------------------------*/
/*   Form a queue of partial paths.           */
/*--------------------------------------------*/
/*--------------------------------------------*/
void FormQueue(struct PATH Path[], struct QUE Que[],
               struct POS Pos[])

start

/*Local variables*/
```

-29-

```
    short Ind;              /*general purpose index*/
    unsigned short T;       /*travel time exp node to end
                              node*/

/*Initialize linked list and path network*/
    for (Ind=0; Ind<NUM_AN_RCD; Ind++) then
        Path[Ind].Bac = -1;
        Path[Ind].Cum = 0;
        Que[Ind].Bac = -1;
        Que[Ind].Fwd = -1;
    endfor /*Insert the starting node in the path list*/
    T = AsCrowFlys (StartNode, EndNode, Pos);

Path[StartNode].Bac = 0;
    Path[StartNode].Cum = 0;

/*Place the starting node in the queue*/
    First = StartNode;
    Que[First].Fwd = -1;
    Que[First].Bac = -1;
    Que[First].Tim = T;
    Que[First].Arc = -1;
stop /*---------------------------------------*/
/*---------------------------------------*/
/* Remove the first path from the queue */
/*---------------------------------------*/
/*---------------------------------------*/
void RemoveFirst(struct QUE Que[])

start

/*exit if reached goal node*/
```

-30-

```
    ExpNod = First;
    if (ExpNod == EndNode) then
        GoalFlag = 1;
        return;
    endif;

/*Remove slot from linked list*/
    if (First == -1) then
        GoalFlag = -1;
    ELSE
        Unlink(First, Que);
    endif
    return;
stop /*---------------------------------*/
/*---------------------------------*/
/* Form new paths from the removed */
/* path by expanding the last node */
/* in the path.                    */
/*---------------------------------*/
/*---------------------------------*/
void Extend(struct AN AdjNodes[], struct AA AdjArcs[],
            struct POS Pos[], struct ARC Arcs[],
            struct PATH Path[], struct QUE Que[])

start

/*local variables*/
        short AdjNod;           /*node adjacent to expanded
                                  node*/
        short AdjArc;           /*arc between exp node and adj
                                  node*/
        short ArcTim;           /*travel time along arc*/
        short ArcNam;           /*arc street name pointer*/
        short PatNam;           /*arc name - exp node to prev
```

-31-

```
                              node*/
unsigned short CumTim;   /*cumulative time along path*/
unsigned short TotTim;   /*cum time plus underes to
                              goal*/
unsigned short T;        /*travel time exp node to end
                              node*/
short Dir;               /*direction flag, 0=from,
                              1=to*/
short ExpArc;            /*arc from prev node to exp
                              node*/
short AdjArcDir;         /*adjacent arc plus direction
                              flag*/
short ArcDis;            /*distance along arc*/
short Ind;               /*loop index*/

/*Extract arc and direction bit along path to the
expanding node*/
ExpArc = Que[ExpNod].Arc;
Dir = ExpArc & 1;
ExpArc = ExpArc >> 1;

/*Extract path street name*/
PatNam = Path[ExpNod].Nam;

/*For each adjacent node in the network...*/
for (Ind=0;Ind<=7;Ind++) then

/*Extract an adjacent node*/
    AdjNod = AdjNodes[ExpNod].Nod[Ind];

/*If adjacent node exists in this slot...*/
    if (AdjNod > 0) then

/*Extract adjacent arc*/
        AdjArcDir = (AdjArcs[ExpNod].Arc[Ind]);
        AdjArc = (AdjArcDir >> 1);
```

-32-

```
/*Extract the travel time along this arc*/
ArcTim = (Arcs[AdjArc].Tim);

/*Extract the distance along this arc*/
ArcDis = Arcs[AdjArc].Wt >> 4;

/*Extract the adjacent arc street name*/
ArcNam = Arcs[AdjArc].Nam;

/*Add arc time to accumulated time - add 12 sec
if name change*/
if (PatNam == ArcNam) then
    CumTim = Path[ExpNod].Cum + ArcTim;
ELSE
    CumTim = Path[ExpNod].Cum + ArcTim + 100;
endif /*If node has not been visited...*/
if (Path[AdjNod].Bac == -1) then /*Calculate the underestimated time from
    node to goal*/
    T = AsCrowFlys (AdjNod, EndNode, Pos);

/*Add underestimate to accumulated path
    time*/
    TotTim = CumTim + T;

/*Store cumulative time*/
    Path[AdjNod].Cum = CumTim;

/*Store arc distance*/
    Path[AdjNod].Dis = ArcDis;

/*Store the arc name*/
    Path[AdjNod].Nam = ArcNam;
```

-33-

```
/*Back link adjacent node to expanding
node*/
Path[AdjNod].Bac = ExpNod;

/*Place new partial path in linked list and
sort the list*/
SortPath (AdjNod, AdjArcDir, TotTim, Que);

/*Else if node has been visited..*/
    ELSE

/*If new cumulative time to node is smaller
        than before...*/
        if (CumTim < Path[AdjNod].Cum) then /*Alter cumulative time to node*/
            Path[AdjNod].Cum = CumTim;

/*Alter distance along arc*/
            Path[AdjNod].Dis = ArcDis;

/*Alter the arc name*/
            Path[AdjNod].Nam = ArcNam;

/*Alter back link to expanding node*/
            Path[AdjNod].Bac = ExpNod;

/*If partial path is still in the
            queue...*/
            if (Que[AdjNod].Fwd != -1 ||
            Que[AdjNod].Bac != -1) then /*Extract total time from queue*/
                TotTim = Que[AdjNod].Tim;

/*Unlink partial path from queue*/
                Unlink(AdjNod, Que);
```

-34-

```
                        /*Place new partial path in linked
                        list and sort the list*/
                        SortPath(AdjNod,AdjArcDir,TotTim,
                        Que);
                    endif
                endif
            endif
        endif
    endfor
    return;
stop /*-----------------------------------------------------------*/
/*-----------------------------------------------------------*/
/*This procedure allocates a free slot, places the          */
/*adjacent node into the slot and then searches the list    */
/*for the correct point to insert the slot.                 */
/*Inputs:                                                    */
/*   Node = node to be linked into queue                    */
/*   ArcWithDir = arc and direction flag                    */
/*   Time = path time + under estimate of time to goal      */
/*          node                                             */
/*-----------------------------------------------------------*/
/*-----------------------------------------------------------*/
/*-----------------------------------------------------------*/ void SortPath (short Node, short ArcWithDir,
               unsigned short Time, struct QUE Que[])

start

/*local variables*/
    short Nxt;              /*next partial path in linked
                            list*/
    short Back;             /*back pointer*/
```

-35-

```
/*Place total time and arc along path in the slot*/
Que[Node].Tim = Time;
Que[Node].Arc = ArcWithDir;

/*If queue is currently empty...*/
if (First == -1) then
    First = Node;                    /*Put first entry in
                                       queue*/
    Que[Node].Fwd = -1;
    Que[Node].Bac = -1;

/*If queue has some elements in it...*/
ELSE

/*Search linked list for time greater than TotTim*/
    Nxt = First;
    do
        if (Time > Que[Nxt].Tim) then
            if (Que[Nxt].Fwd >= 0) then
                Nxt = Que[Nxt].Fwd;      /*Keep
                                           searching*/
            ELSE
                Que[Nxt].Fwd = Node;     /*Add to
                                           bottom*/
                Que[Node].Bac = Nxt;
                Que[Node].Fwd = -1;
                break;
            endif
        ELSE
            Back = Que[Nxt].Bac;
            if (Back >= 0) then
                Que[Node].Bac = Back;    /*Insert*/
                Que[Back].Fwd = Node;
                Que[Node].Fwd = Nxt;
                Que[Nxt].Bac = Node;
                break;
```

-36-
```
            ELSE
                Que[Node].Fwd = Nxt;     /*Add to top*/
                Que[Nxt].Bac = Node;
                Que[Node].Bac = -1;
                First = Node;
                break;
            endif
        endif
    while (1 == 1);
    return;
  endif
stop
```

```
/*--------------------------------------------------------*/
/*--------------------------------------------------------*/
/* This procedure unlinks a slot from the link list       */
/* Inputs:                                                */
/*    Node =  node to be unlinked from list               */
/*--------------------------------------------------------*/
/*--------------------------------------------------------*/
void Unlink(short Node, struct QUE Que[])

/*local data*/
    start
    short Fwrd;            /*linked list foward pointer*/
    short Back;            /*linked list back pointer*/

/*extract link list pointers*/
    Back = Que[Node].Bac;
    Fwrd = Que[Node].Fwd;

/*if first node is to be deleted, get the new first
    node*/
    if (Node == First) then
        First = Fwrd;
```

-37-

```
    endif

/*if not at end of list, point back around deleted
    node*/
    if (Fwrd >= 0) then
        Que[Fwrd].Bac = Back;
    endif /*if not at beginning of list, point fowared around
    deleted node*/
    if (Back >= 0) then
        Que[Back].Fwd = Fwrd;
    endif
    return;
stop /*---------------------------------------------------*/
/*---------------------------------------------------*/
/* Calculate time to goal as the crow flys           */
/* Inputs:                                           */
/*    SNode = start node                             */
/*    ENode = end node                               */
/*---------------------------------------------------*/
/*---------------------------------------------------*/
unsigned short AsCrowFlys (short SNode, short ENode,
            struct POS Pos[])

start

/*Local data*/
    long Vel;                  /*velocity in feet per sec*/
    short Dx, Dy;              /*dist exp node to end node*/
    long Dx2, Dy2;             /*squared delta distances*/
    unsigned short T;          /*travel time exp node to end
                                 node*/
    long R;                    /*slant range*/
    long Tlong;                /*long travel time*/
```

-38-

```
    /*Set velocity to a pessimistic 20mph*/
    Vel = 29;    /*20mph*/

/*Calculate time to goal*/
    Dx = Pos[SNode].X - Pos[ENode].X;
    Dy = Pos[SNode].Y - Pos[ENode].Y;
    Dx2 = Dx;
    Dx2 = Dx2*Dx2;
    Dy2 = Dy;
    Dy2 = Dy2*Dy2;
    R = root2(Dx2 + Dy2);
    Tlong = R*80/Vel;
    T = (short) Tlong;
    return(T);
end /*------------------------------------------------------------*/
/*------------------------------------------------------------*/
/*This function returns the square root using Newton's        */
/*approximation                                               */
/*------------------------------------------------------------*/
/*------------------------------------------------------------*/
long root2 (long X)

begin

/*Local variables*/
    long Delta;                 /*square root error*/
    long Root;                  /*square root*/
    long RootPred;              /*next    prediction    of
                                square root*/

/*Calculate the seed based on size of X*/
    if (X > 100000000)
        Root = X/10000;
    else if (X > 50000000)
```

```
        Root = X/7000;
else if (X > 10000000)
    Root = X/30000;
else if (X > 5000000)
    Root = X/2200;
else if (X >= 1000000)
    Root = X/1000;
else if (X >= 100000)
    Root = X/300;
else if (X >= 10000)
    Root = X/100;
else if (X >= 1000)
    Root = X/30;
else
    Root = X/10;

/*for small values*/
if (Root == 0) then
    Root = 10;
endif

/*Init error*/
Delta = 10;
while (Delta > 1 || Delta < -1) then
    RootPred = (Root + X/Root)/2;
    Delta = RootPred - Root;
    Root = RootPred;
endwhile
return(Root);
end /*---------------------------------------------------*/
/*---------------------------------------------------*/
/* This function breaks pointers so that a turn     */
/* cannot be made and/or a street cannot be traversed*/
/*---------------------------------------------------*/
/*---------------------------------------------------*/
```

```
                              -40-
void BreakPtr (struct AN AdjNodes[], struct AA AdjArcs[],
               struct ARC Arcs[])
start /*local variables*/
    short i, n, Pivot, Prev, To, AdjArc, AdjNod, ArcNam;
    short Breaking;
    short OneWayName;

/*for each turn restriction...*/
    for (i=0; i<=RestrictNum; i++) then

/*find arc to previous node*/
        Pivot = Lost[i].Pivot;
        Prev = Lost[i].Prev;
        for (n=0;n<=7;n++) then
            AdjNod = AdjNodes[Pivot].Nod[n];
            if (AdjNod == Prev) then /*slow down path from pivot to prev by 3
                minute (time in 1/8 sec)*/
                AdjArc = AdjArcs[Pivot].Arc[n] >> 1;
                Arcs[AdjArc].Tim  =   Arcs[AdjArc].Tim  +
                8*180;
                break;
            endif
        endfor /*break path from pivot node to next node*/
        for (n=0;n<=7;n++) then
            AdjNod = AdjNodes[Pivot].Nod[n];
            if (AdjNod == Lost[i].To && AdjNod != -1) then
                AdjNodes[Pivot].Nod[n] = -1;

/*save arc name from pivot to next in case
                it's one way*/
                AdjArc = AdjArcs[Pivot].Arc[n] >> 1;
```

-41-

```
            OneWayName = Arcs[AdjArc].Nam;
            break;
        endif
    endfor /*if one way street...*/
    if (Lost[i].Code == 2) then /*Extract next node*/
        To = Lost[i].To;

/*break pointers until street name changes...*/
        Breaking = 1;
        while (Breaking == 1) then /*move to next node in path*/
            Prev = Pivot;
            Pivot = To;
            Breaking = 0;

/*search adjacent arcs*/
            for (n=0;n<=7;n++) then
                To = AdjNodes[Pivot].Nod[n];
                if (To != -1) then
                    AdjArc = AdjArcs[Pivot].Arc[n] >>
                    1;
                    ArcNam = Arcs[AdjArc].Nam;

/*if name matches one way name,
                    break foward ptr*/
                    if (ArcNam == OneWayName && To !=
                    Prev) then
                        AdjNodes[Pivot].Nod[n] = -1;
                        Breaking = 1;
                        break;
                    endif
                endif
```

```
            -42-
            endfor
          endwhile
        endif
     endfor
stop
```

-43-

MODULE A2

MODULE A2

```
/*-------------------*/
/*     DSPIO.C       */
/*-------------------*/

/*------------------------------------------------
copyright (C) by C. La Rue, 1991 all rights reserved
--------------------------------------------------*/
#include <define.h>
include <struct.h>
#include <prototyp.h>
#include <stdlib.h>

/*globals*/
extern short *VocBuf;        /*allocated   voice    buffer
                               pointers*/

/*DSP status and communication addresses*/
short *HostToDspDataPort;   /*DSP communication register*/
short *DspToHostDataPort;   /*DSP communication register*/
short *DspToHostDataPort;   /*DSP status register*/
short *HostToDspStatusPort; /*DSP status register*/

/*other module data*/
struct KEY KeyWords[64];    /*key word pointer array*/
short BeepBuf[640];         /*sine wave for a beep*/ extern short Templates[];               /*template array*/
extern unsigned short DSPport[];        /*communication
                                          port registers*/

/*sine wave for a beep*/
short Sinewave[8] = {0, 2896, 4096, 2896, 0, -2896, -4096,
            -2896};
```

-44-

```c
short BeepBuf[1600];

/*other module data*/
struct KEY KeyWords[64];    /*key word pointer array*/
short BeepBuf[640];         /*sine wave for a beep*/

/*---------------------------------------------------------------*/
/*---------------------------------------------------------------*/
/* Download the KeyWords array from the optical disk           */
/*---------------------------------------------------------------*/
/*---------------------------------------------------------------*/
void DownloadKeyPointers(void)
start /*local variables*/
    long SeekDist;
    unsigned short Nwords;

/*initialize pointers to host and dsp interface ports*/
    HostToDspDataPort = (short *) HOST_TO_DSP_DATA_PORT;
    DspToHosDataPort = (short *) DSP_TO_HOST_DATA_PORT;
    HostToDspStatusPort = (short *)  HOST_TO_DSP_STATUS_PORT;
    DspToHostDataPort = (short *) DSP_TO_HOST_DATA_PORT;

/*call optical disk handler to read in KeyWords array*/
    SeekDist = KEY_WORDS_SEC * 160L;
    Nwords = 3 * 80;
    Oread (SeekDist, (short *)KeyWords, Nwords);
stop
```

-45-

```
/*------------------------------------------------------------*/
/*------------------------------------------------------------*/
/* Get a keyword utterance from the disk and speak it.        */
/* Should not be used when VocBuf is already allocated        */
/*------------------------------------------------------------*/
/*------------------------------------------------------------*/
void SpeakKeyWordPrompt (short Num)
start /*local variables*/
    unsigned short Nwords;

/*allocate a voice buffer*/
    VocBuf = (short *)calloc(30000, sizeof(short));

/*read in the voice record and immediately output it*/
    Nwords = DiskToKey (Num, VocBuf);
    SpeakPacked (VocBuf, Nwords / 160);

/*free the allocated buffer*/
    free(VocBuf);
stop

/*------------------------------------------------------------*/
/*------------------------------------------------------------*/
/* Read the Gname from the disk, then use the file            */
/* pointers to read the voice record from the disk.           */
/* Return the number of words.  Used at startup to ask if     */
/* the street name is correct.                                */
/*------------------------------------------------------------*/
/*------------------------------------------------------------*/
unsigned short DiskToGnameToStreet (short Nam, short Buf[])

start

/*local variables*/
```

-46-
```
    unsigned short Nwords;
   ·long SeekDist;
    struct GNAME Gname[1];

/*read in the gname record*/
    SeekDist = GnamesSec * 160L + (Nam - 1) * 17L;
    Oread (SeekDist, (short *) &Gname, 17);

/*extract starting sector and number of sectors*/
    SeekDist = Gname.Sector * 160L;
    Nwords = Gname.Nsec * 160;

/*read into the voice buffer*/
    Oread (SeekDist, Buf, Nwords);

/*calculate the new offset*/
    return (Nwords);
stop

/*------------------------------------------------------------*/
/*------------------------------------------------------------*/
/* Use the start sector and number of sectors to read the*/
/* street voice data into a buffer.  Return the number of*/
/* words.  Used to make sentences.                       */
/*------------------------------------------------------------*/
/*------------------------------------------------------------*/
unsigned short DiskToStreet (long Sector, short Nsec, short Buf[])

start

/*local variables*/
    unsigned short Nwords;
    long SeekDist;

/*extract starting sector and number of sectors*/
```

-47-

```
    SeekDist = Sector * 160L;
    Nwords = Nsec * 160;

/*read into the voice buffer*/
    Oread (SeekDist, Buf, Nwords);

/*return the offset for next time*/
    return (Nwords);

stop

/*----------------------------------------------------------*/
/*----------------------------------------------------------*/
/* Get a Gname record.  Used in tell path and recog.        */
/*----------------------------------------------------------*/
/*----------------------------------------------------------*/
void GetGname (short Num, short Buf[])

start

/*local variables*/
    long SeekDist;

/*read to the required Gname*/
    SeekDist = GnamesSec * 160L + (Num-1) * 17L;
    Oread(SeekDist, Buf, 17);

stop
```

```
/*---------------------------------------------------------*/
/*---------------------------------------------------------*/
/* Service routine for reading the optical disk           */
/* Inputs:                                                */
/*      SeekDist = offset in words from front of file     */
/*      Buf[] = address of input buffer                   */
/*      Nwords = number of words to read                  */
/*---------------------------------------------------------*/
/*---------------------------------------------------------*/
void Oread(long SeekDist, short Buf[], unsigned short Nwords)

start

/*local variables*/
    short i, j, k, Msw, Lsw, Discard, Nsec;

/*break seek distance into 2 words*/
    Msw = (short) SeekDist >> 16;
    Lsw = (short) SeekDist & 0xFFFF;

/*send read command to the DSP*/
    HostToDsp(4);

/*send starting sector to DSP*/
    HostToDsp(Msw);
    HostToDsp(Lsw);

/*send number of sectors to DSP*/
    Nsec = Nwords / 160;
    if ((Nwords % 160)  != 0) then
        Nsec++;
    endif
    HostToDsp(Nsec);

/*for each sector...*/
    i = -1;
```

-49-

```
for (j=i; j<=Nsec; j++) then

/*read and discard the frame blocking word*/
    Discard = DspToHost();

/*for each word...*/
    for (k=i; k<=160; k++) then

/*get word from DSP - save or discard it*/
        if (i < Nwords) then
            i++;
            Buf[i] = DspToHost();
        ELSE
            Discard = DspToHost();
        endif
    endfor
endfor
stop /*---------------------------------------------------------*/
/*---------------------------------------------------------*/
/* Host input routine                                      */
/*---------------------------------------------------------*/
/*---------------------------------------------------------*/
short DspToHost (void)
start /*wait for DSP to signal that it has data*/
    while (*DspToHostStatusPort == 0) then
    endwhile /*return the value at the host input port*/
    return (*DspToHostDataPort);
stop
```

-50-

```
/*------------------------------------------------------------*/
/*------------------------------------------------------------*/
/* Host output routine                                        */
/*------------------------------------------------------------*/
/*------------------------------------------------------------*/
void short HostToDsp(short Sample)
start /*wait for DSP to signal that it is ready to accept
    data*/
    while (*DspToHostStatusPort == 0) then
    endwhile /*output the value to the host port*/
    *HostToDspDataPort = Sample;
stop /*------------------------------------------------------------*/
/*------------------------------------------------------------*/
/* Command 1 - Command feature extraction and echo the        */
/* voice                                                      */
/*------------------------------------------------------------*/
/*------------------------------------------------------------*/
void FeaturesAndEcho(void)

start

/*local variables*/
    short n, i, Separator, Nsec, firstFrame, LastFrame;
    short *EchoBuf;

/*allocate an echo buffer*/
    EchoBuf = (short *)calloc(8000, sizeof(short));

/*send feature extraction command to DSP*/
```

-51-

```
HostToDsp(1);

/*for each raw speech frame...*/
while (1) then

/*exit loop if separator is end of file*/
    Separator = DspToHost();
    if (Separator == C_END_OF_FILE) then
        FirstFrame = DspToHost();
        LastFrame = DspToHost();

/*fill unused sectors at beginning of word with
        0xFF for silence*/
        if (FirstFrame > 0) then
            for (i=0; i<=FirstFrame * 160 -1; i++) then
                EchoBuf[i] = 0xFF;
            endfor
        endif
        break;

/*save frame number if separator is frame ID*/
    elseif (Separator == C_FRAME_NUMBER) then
        i = Separator * 160;

/*bring across 160 words if separator is data ID*/
    elseif (Separator == C_ECHO) then /*bring across 160 words from the DSP*/
        for (n=1; n<=160; n++) then
            i++;
            EchoBuf[i] = DspToHost();
        endfor
    endif
endwhile /*output the speech*/
Nsec = LastFrame;
```

-52-
```
    SpeakUnpacked (EchoBuf, Nsec);

/*free the memory and exit*/
    free (EchoBuf);
stop

/*-----------------------------------------------------------*/
/*-----------------------------------------------------------*/
/* Command 1 - Command feature extraction and discard the*/
/* echo                                                    */
/*-----------------------------------------------------------*/
/*-----------------------------------------------------------*/
void Features(void)

start

/*local variables*/
    short n, i, Discard, Separator, FirstFrame, LastFrame;
    short *EchoBuf;

/*send feature extraction command to DSP*/
    HostToDsp(1);

/*for each raw speech frame...*/
    i = -1;
    while (1) then

/*exit loop if separator is end of file*/
        Separator = DspToHost();
        if (Separator == C_END_OF_FILE) then
            FirstFrame = DspToHost();
            LastFrame = DspToHost();
            break;
        endif /*discard 160 words from the DSP*/
```

-53-

```
        for (n=1; n<=160; n++) then
            i++;
            Discard = DspToHost();
        endfor
    endwhile
stop
```

```
/*------------------------------------------------------------*/
/*------------------------------------------------------------*/
/* wait for user to speak                                     */
/*------------------------------------------------------------*/
/*------------------------------------------------------------*/
short Listen (short Cluster)

start
    /*local variables*/
    short Threshold, Template;

/*wait for user to say something which exceeds the
    threshold*/
    while (1) then
        Features();
        Threshold = 200;
        Template = Match (Cluster, Threshold);
        if (Template > 0) break;
    endwhile /*output a beep to acknowledge receipt of input*/
    Beep();

/*return the spoken letter or command*/
    return(Template);
stop
```

-54-

```
/*------------------------------------------------------*/
/*------------------------------------------------------*/
/*  Get a string of characters from user                */
/*------------------------------------------------------*/
/*------------------------------------------------------*/
void VoiceToString (short Cluster, char Ascii[]);

start

/*local variables*/
    short i, Alpha;

/*accumulate characters until user says ENTER*/
    i = -1;
    while (1) then

/*get next utterance*/
        Alpha = Listen (Cluster);

/*if user says "ENTER", pack null character and
        exit*/
        if (Alpha == ENTER_ANS) then
            i++;
            Ascii[i] = '\0';
            break;

/*if he says "BACKSPACE", pack a null and decrement
        the counter*/
        elseif (Alpha == BACKSPACE_ANS) then
            Ascii[i] = '0\';
            if (i >= 0) then
                i--;
            endif /*if he says "A-Z" pack ascii alpha character*/
        elseif (Alpha <= 25) then
            i++;
```

-55-

```
            Ascii[i] = Alpha + 65;

/*if he says "0-9" pack ascii numeric character*/
        elseif (Alpha <= 35) then
            i++;
            Ascii[i] = Alpha + 22;
        endif
    endwhile
stop /*----------------------------------------------------------*/
/*----------------------------------------------------------*/
/* Command 5 - output packed, compressed speech to DSP - */
/* each /* sector contains 160 packed words.            */
/*----------------------------------------------------------*/
/*----------------------------------------------------------*/
void SpeakPacked (short Buf[], short Nsec)

start

/*local variables*/
    short i, Lsb, Msb;
    unsigned short Sample;
    long w, NumPacked;

/*calculate the number of packed words to send*/
    NumPacked = Nsec * 160L;

/*for each packed word...*/
    i = -1;
    for (w=1; w<=NumPacked; w++) then

/*every 80 packed words, send a new command
        header*/
        i++;
        if ((i % 80) == 0) then
```

-56-

```
        HostToDsp(5);
    endif

/*extract the packed word*/
    Sample = Buf[i];

/*break into two bytes*/
    Msb = (Sample >> 8) & 0xFF;
    Lsb = Sample & 0xFF;

/*output to DSP*/
    HostToDsp(Msb);
    HostToDsp(Lsb);
    endfor;
stop

/*----------------------------------------------------------*/
/*----------------------------------------------------------*/
/* Command 5 - output unpacked, compressed speech to DSP    */
/* - Each sector contains 160 packed words.                 */
/*----------------------------------------------------------*/
/*----------------------------------------------------------*/
void SpeakUnpacked (short Buf[], short Nsec)

start

/*local variables*/
    short i, Sample;
    long w, NumPacked;

/*calculate the number of unpacked words to send*/
    NumUnpacked = Nsec * 160L;

/*for each unpacked word...*/
    i = -1;
    for (w=1; w<=NumUnpacked; w++) then
```

-57-

```
        /*every 160 unpacked words, send a new command
        header*/
        i++;
        if ((i % 160) == 0) then
            HostToDsp(5);
        endif /*extract the packed word*/
        Sample = Buf[i];

/*output to DSP*/
        HostToDsp(Sample);
    endfor;
stop

/*------------------------------------------------------------*/
/*------------------------------------------------------------*/
/* Command 6 - Download speech recognition constants          */
/*------------------------------------------------------------*/
/*------------------------------------------------------------*/
void ConstantsToDsp(void)

start

/*send command word*/
    HostToDsp(6);

/*send harmonic limits for 12 frequency bands*/
    HostToDsp(0);
    HostToDsp(0);

HostToDsp(1);
    HostToDsp(1);

HostToDsp(2);
```

-58-

```
HostToDsp(2);

HostToDsp(3);
HostToDsp(4);

HostToDsp(4);
HostToDsp(5);

HostToDsp(6);
HostToDsp(9);

HostToDsp(9);
HostToDsp(11);

HostToDsp(11);
HostToDsp(14);

HostToDsp(14);
HostToDsp(18);

HostToDsp(18);
HostToDsp(23);

HostToDsp(23);
HostToDsp(29);

/*send number of harmonics to extract*/
HostToDsp(30);

/*send noise threshold dp word*/
HostToDsp(60);

/*send sibilant threshold dp word*/
HostToDsp(100);

/*send vowel threshold word*/
HostToDsp(1000);
```

-59-

```
    /*send initial gain word*/
    HostToDsp(64);
stop

/*------------------------------------------------------------*/
/*------------------------------------------------------------*/
/* Move a sine wave into the voice buffer then output it */
/*------------------------------------------------------------*/
/*------------------------------------------------------------*/
void Beep()
start /*local variables*/
    short i;
    short *BeepSound;
    short Nsec;

/*allocate a 1000 word output buffer*/
    for (i=0; i<=497; i++) then
        *(BeepSound + i) = BeepBuf[i];
    endfor /*speek the beep*/
    Nsec = 4;
    SpeakUnpacked (BeepSound, Nsec);

/*free up the memory*/
    free (BeepSound);
stop
```

```
/*------------------------------------------------------------*/
/*------------------------------------------------------------*/
/* Create a beep sinewave                                     */
/*------------------------------------------------------------*/
/*------------------------------------------------------------*/
void MakeSinewave (void)
start /*local data*/
    short i;

/*generate compressed sine wave*/
    for (i=0; i<=639; i+=8) then

BeepBuf[i]+0] = 0xFF;    /*0*/
        BeepBuf[i]+1] = 0xB8;    /*2896*/
        BeepBuf[i]+2] = 0xAF;    /*4096*/
        BeepBuf[i]+3] = 0xB8;    /*2896*/
        BeepBuf[i]+4] = 0xFF;    /*0*/
        BeepBuf[i]+5] = 0x38;    /*-2896*/
        BeepBuf[i]+6] = 0x2F;    /*-4096*/
        BeepBuf[i]+7] = 0x38;    /*-2896*/
    endfor
stop
```

-61-

MODULE A3

MODULE A3

```
/*----------------------------------------*/
/*              Module EXEC                */
/*----------------------------------------*/

/*--------------------------------------------------
copyright (C) by C. La Rue, February 1991 all rights
r      e      s     e     r    v     e      d
----------------------------------------------------*/ include <define.h>
include <struct.h>
#include <prototyp.h>
/*include <stdlib.h>*/
#include <malloc.h>

/*allocated buffer pointers*/
struct POS *Pos;
struct PATH *Path;
struct AN *AdjNodes;
struct AA *AdjArcs;
struct ARC *Arcs;
struct QUE *Que;
struct HASH *Hash;
struct HASH2 *Hash2;
short *ColBuf;
short *VocBuf;

/*lost record*/
struct LOST Lost[20];
short RestrictNum;

/*winners list*/
struct WIN Swinners[20];    /*starting address winners*/
```

-62-

```c
struct WIN Dwinners[20];    /*ending address winners*/
short SrcWin;
short DesWin;

/*----------------------*/
/*----------------------*/
/* navigator executive */
/*----------------------*/
/*----------------------*/
void main()

start

/*Local variables*/
    short AscNam[22];       /*ascii name input by user*/
    char StreetStr[10];     /*ascii street number input by
                              user*/
    short SrcWin, DesWin;   /*source and dest winners*/
    short DeltaAddr;        /*addrress difference*/
    short Found;            /*source and dest found flag*/
    short Nodes[2];         /*source and destination nodes*/
    short GoalFlag;         /*if negative, goal was not
                              found*/
    short Cnadidates[20];   /*list of street number
                              candidates*/
    unsigned short StreetNum /*street number*/
    short Ans;              /*users answer*/

/*do a beep*/
    MakeSinewave();
    Beep();

/*do forever*/
    while (1) then

/*reset the restriction number*/
        RestrictNum = 0;
```

-63-

```c
/*Download pointers to the 80 keyword prompts*/
DownloadKeyPointers();

/*Download files for the spelling checker*/
DownloadSpellPointers();

/*place DSP in idle loop*/
HostToDsp(0);

/*send the constants to the DSP*/
ConstantsToDsp();

/* Say "NAVIGATOR IS READY" */
SpeakKeyWordPrompt (NAVIGATOR_IS_READY);

/*Wait for user to say Namigator*/
Ans = Listen(4);

/*call the training function to see if wants to train*/
Train();

/*say "PLEASE SPELL STREET NAME OF CURRENT LOCATION"*/
SpeakKeyWordPrompt(PLEASE_SPELL_CURRENT_LOCATION);

/*get the street name string from the user*/
VoiceToString (1, AscNam);

/*say "PLEASE SAY THE STREET NUMBER"*/
SpeakKeyWordPrompt (PLEASE_SAY_THE_STREET_NUMBER);

/*getnumber string from the user*/
VoiceToString (2, StretStr);
StreetNum = atoi (StreetStr);
```

-64-
```
/*say LOCATING THE ADDRESS*/
SpeakKeyWordPrompt (LOCATING_THE_ADDRESS);

/*call spelling checker to make a list of
candicates*/
GetCandidates (AscNam, Candidates);

/*find the starting nodes and the arc name*/
found = FindNode(Candidates, StreetNum, Swinners);

/*if cant find starting node and arc...*/
if (found == -1) then

/*say YOUR CURRENT LOCATION CANT BE FOUND*/
    SpeakKeyWordPrompt (YOUR_CURRENT_CANT_BE_
    FOUND);
    break;
endif /*query if more than one winner*/
SrcWin = 0;
if (Swinners[1].Node1 >= 0) then
    SrcWin = AskDup(Swinners,
    YOUR_CURRENT_CANT_BE_FOUND);
    if (SrcWin == -1) then
        break;
    endif
endif /*say "PLEASE SPELL STREET NAME OF YOUR
DESTINATION"*/
SpeakKeyWordPrompt (PLEASE_SPELL_DESTINATION);

/*get the street name string from the user*/
VoiceToString (1, AscNam);

/*say "PLEASE SAY THE STREET NUMBER"*/
```

-65-

```
SpeakKeyWordPrompt (PLEASE_SAY_THE_STREET_NUMBER);

/*getnumber string from the user*/
VoiceToString (2, StretStr);
StreetNum = atoi (StreetStr);

/*say LOCATING THE ADDRESS*/
SpeakKeyWordPrompt (LOCATING_THE_ADDRESS);

/*call spelling checker to make a list of
candicates*/
GetCandidates (AscNam, Candidates);

/*find the ending nodes and the arc name*/
found = FindNode(Candidates, StreetNum, Dwinners);

/*if cant find starting node and arc...*/
if (found == -1) then

/*say YOUR DESTINATION CANT BE FOUND*/
    SpeakKeyWordPrompt (YOUR_DESTINATION_CANT_BE_
    FOUND);
    break;
endif /*query if more than one winner*/
DesWin = 0;
if (Dwinners[1].Node1 >= 0) then
    DesWin = AskDup(Dwinners,
    YOUR_DESTINATION_CANT_BE_FOUND);
    if (DesWin == -1) then
        break;
    endif
endif /*extract source and destiantion nodes for astar*/
Nodes[0] = Swinners[SrcWin].Node1;
```

-66-

```
Nodes[1] = Dwinners[DesWin].Node1;

/*Find the best path*/
GoalFlag = Astar(Nodes);

/*Announce success or failure*/
if (GoalFlag == -1 ) then
    SpeakKeyWordPrompt (A_ROUTE_CANNOT_BE_FOUND);
    break;
endif /*calculate the delta address*/
DeltaAddr = CalcDeltaAddr(Nodes, Path);

/*initialize the lost code*/
Lost[RestrictNum].Code = 0;

/*speak path*/
TellPath (Nodes, DeltaAddr);

/*if driver cant make turn or street is one
way...*/
if (Lost[RestrictNum].Code > 0) then /*do until path accepted by user*/
    while (Lost[RestrictNum].Code != 0) then /*say COMPUTING ALTERNATE ROUTE*/
        SpeakKeyWordPrompt (COMPUTING_ALTERNATE_
        ROUTE);

/*compute new route*/
        Nodes[0] = Lost[RestrictNum].Pivot;
        GoalFlag = Astar(Nodes);

/*Announce success or failure*/
        if (GoalFlag == -1 ) then
```

-67-

```
                    SpeakKeyWordPrompt (A_ROUTE_CANNOT_BE_
                    FOUND);
                    Lost[RestrictNum].Code = 0;
                    break;
                endif /*Display path*/
                DeltaAddr = 0;
                TellPath (Nodes, DeltaAddr);
            endwhile
        endif
    endwhile
stop /*--------------------------------------------------------------*/
/*--------------------------------------------------------------*/
/* This routine calculates the change in the address so         */
/* the ncreasing message can be spoken                          */
/*--------------------------------------------------------------*/
/*--------------------------------------------------------------*/
short CalcDeltaAddr(short Nodes[], struct PATH Path[])
start /*local data*/
    short Nod1, Nod2, I, DeltaAddr;

/*Extract both nodes of destination arc*/
    Nod1 = Dwinners[DesWin].Node1;
    Nod2 = Dwinners[DesWin].Node2;

/*if node 1 doesn't point back to node 2...*/
    if (Path[Nod1].Bac != Nod2) then /*terminate the trip with node2*/
        Path[Nod2].Nam = Dwinners[DesWin].Nam;
        Path[Nod2].Cum = Path[Nod1].Cum;
```

-68-

```
        Path[Nod2].Bac = Nod1;
        Nodes[1] = Nod2;
    endif

/*trace the path back to the starting node*/
    Nod1 = Swinners[SrcWin].Node1;
    Nod2 = Swinners[SrcWin].Node2;
    I = Nodes[1];
    while (Path[I].Bac != Nod1) then
        I = Path[I}.Bac;
    endwhile /*if second node in path is not node2 of source
    arc...*/
    if (I != Nod2) then /*begin the trip with node2*/
        Path[Nod1].Bac = Nod2;
        Path[Nod1].Nam = Swinners[SrcWin].Nam;
        Path[Nod1].Cum = 0;
        Nodes[0] = Nod2;
        DeltaAddr = Swinners[SrcWin].Addr1 -
        Swinners[SrcWin].Addr2;
    ELSE
        DeltaAddr = Swinners[SrcWin].Addr2 -
        Swinners[SrcWin].Addr1;
    endif
    return (DeltaAddr);
stop /*----------------------------------------------------*/
/*----------------------------------------------------*/
/* This function asks the user if a street is correct*/
/*----------------------------------------------------*/
/*----------------------------------------------------*/
short AskDup (struct WIN Winners[], short PromptNum)
```

-69-

```
start

/*local variables*/
    unsigned short Nwords, Offset;
    short i, Nam;

/*for each of winner..*/
    i = 0;
    while (Winners[i].Node1 >= 0) then

/*allocate a voice buffer*/
        Vocbuf = (short_far *)calloc(16000, sizeof(short));

/*pack IS to the buffer*/
        Nwords = DiskToKey (IS, VocBuf);
        Offset = Nwords;

/*pack gname to the buffer*/
        Nam = Winners[i].Nam;
        Nwords = DiskToGnameToStreet (Nam,
                &VocBuf[Offset]);
        Offset = Offset + Nwords;

/*pack THE CORRECT STREET to the buffer*/
        Nwords = DiskToKey (THE_CORRECT_STREET,
                &VocBuf[Offset]);
        Offset = Offset + Nwords;

/*say the sentence*/
        SpeakPacked (VocBuf, Offset / 160);

/*get his answer yes or no*/
        if (Listen (3) == YES_ANS) then
            break;
        endif
        i++;
    endwhile
```

-70-

```
/*release the voice buffer*/
free (VocBuf);

/*if user said yes to anything...*/
if (Winners[i].Node1 >= 0) then
     return(i);
ELSE /*say your LOCATION CAN'T BE FOUND*/
     SpeakKeyWordPrompt (PromptNum);

/*return a failure*/
     return(-1);
  endif
stop
```

-71-

MODULE A4

MODULE A4

```
/*------------------------------------------------------------*/
/*------------------------------------------------------------*/
/*                    MODULE FINDNODE                         */
/* This module is responsible for obtaining the start and     */
/* end nodes from the user's input of a street name and       */
/* number. The steps are as follows:                          */
/*   1.  A list of possible street name indicies is passed    */
/*       to this function in an array called Candidates.      */
/*       A binary street number is also passes.               */
/*   2.  Starting with the first name in the Candidates       */
/*       list, the Gname voice pointer is checked. If not     */
/*       in Palos Verdes it will have a minus one for the     */
/*       pointer.  In that case move to the next name         */
/*       number and see if it has the same root and a         */
/*       positive pointer. When you hit a new root with       */
/*       none of them having a positive pointer, then go      */
/*       on to the next in the list.                          */
/*   3.  The NEWARK.DAT buffer is searched for a match        */
/*       with the name and number. This obtains an index      */
/*       into the NEWARK DAT buffer. This is the arc          */
/*       containing our desired address.                      */
/*   4.  The adjacent arcs list, ADJARC, is searched for a    */
/*       node which points to one end of this arc. There      */
/*       is another node pointing to the opposite end.        */
/*       Return this one also                                 */
/* Inputs:                                                    */
/*       Candidates = list of possible candidates names       */
/*       StreetNum = street number                            */
/* Outputs:                                                   */
/*       Winners[] = list of winning nodes with correct       */
/*                   num                                      */
/*------------------------------------------------------------*/
/*------------------------------------------------------------*/
```

-72-

```c
#include <define.h>
include <struct.h>
#include <prototyp.h>
/*#include <stdlib.h>*/
#include <malloc>.h
#include <string.h>

/*global data*/
extern struct AA *AdjArcs;
extern struct ARC *Arcs;

/*----------------------*/
/*----------------------*/
/* Find matching nodes */
/*----------------------*/
/*----------------------*/
short   FindNode  (short  Candidates[],  unsigned  short
StreetNum, struct WIN Winners[])

start

/* Local variables */
    struct GNAME Gname[1];
    char SavRoot[21];
    short w, Nam, Iwin, ArcNum, found;

/*allocate memory*/
    AdjArcs = (struct AA _far *)calloc(NUM_AA_RCD,
            sizeof(struct AA));
    printf  ("val=%Fp  size=%u  \n",  (struct  AA  _far
    *)AdjArcs, _msize(AdjArcs));
    Arcs = (struct ARC _far *)calloc(NUM_ARC_RCD,
            sizeof(struct ARC));
    printf ("val=%Fp size=%u \n", (struct ARC _far *)Arcs,
    _msize(Arcs));
    /*download Arcs and AdjArcs tables from disk*/
```

-73-

```
DownLoadArcs();

/*init list*/
for (w=0; w<=2; w++) then
    Winners[w].Node1 = -1;
endfor
w = 0;

/*search Candidates list until one or more name and
number found*/
found = -1;
for (Iwin=0; Iwin<=2; Iwin++) then /*get the next name in the Candidates list*/
    Nam = Candidates[Iwin];

/*get the Gname record*/
    GetGname (Nam, (short *) &Gname);
    Gname.Root[20] = '\0';

/*save root*/
    strcpy (SavRoot, Gname.Root);
    printf ("checking %s \n", SavRoot);

/*go for successive entries in Gnames until the
    root changes*/
    while(strcmp(Gname.Root, SavRoot) == 0) then /*if name is in Palos Verdes...*/
        if (Gname.Sector >= 0) then /*if street number match, add to list*/
            ArcNum = SrchArcDef(Nam, StreetNum, Arcs);
            if (ArcNum >= 0) then
                Winners[w].Nam = Nam;
                found = 0;
```

-74-

```
                /*find the two nodes which point to
                this arc*/
                SrchAdjArc(ArcNum, Winners, w, AdjArcs,
                Arcs);

/*bump for next possibility*/
                w++;
            endif
        endif /*try the next successive Gname to see if it
        has the same root*/
        Nam++;
        GetGname (Nam, (short *) &Gname);
        Gname.Root[20] = '\0';
        printf ("checking %s \n", Gname.Root);
    endwhile
  endfor /*free allocated memory*/
  free(Arcs);
  free(AdjArcs);

/*return the found flag*/
  return (found);
stop

/*---------------------------------------------------------*/
/*---------------------------------------------------------*/
/* This function searches the arc definition file for a   */
/* match with a name and street number index and returns  */
/* the position where a match was found.  If name found,  */
/* but not number, returns 0.  If neither, -1             */
/*---------------------------------------------------------*/
/*---------------------------------------------------------*/
short SrchArcDef (short Nam, unsigned short StreetNum,
```

```
                                -75-
struct ARC Arcs[])

start

/*local variables*/
    short i, found;

/*begin*/
    i = 0;
    found = -1;

/*searh the entire table, maybee...*/
    while (i < NUM_ARC_RCD) then
        IF (Arcs[i].nam == Nam) then
            if   (Arcs[i].Addr1 == (StreetNum+10)   &&
            (StreetNum-10) <= Arcs[i].Addr2) then
                found = i;
                break;
            endif
        endif
        i++;
    endwhile
    return(found);
stop /*---------------------------------------------------------*/
/*---------------------------------------------------------*/
/* This function searches the adj arcs file for a pair of*/
/* nodes which point to a specific arc.  both node       */
/* positions are returned.                               */
/*---------------------------------------------------------*/
/*---------------------------------------------------------*/
short SrchAdjArc(short ArcNum, struct WIN Winners[], short
w, struct AA AdjArcs[], struct ARC Arcs[])

start
```

```
/*local variables*/
short i, j, k, dir;

/*search the adjacent arc file*/
i = 0;
k = 0;
while (i < NUM_AA_RCD) then

/*search eight slots*/
    for (j=0; j<=7; j++) then

/*if match found...*/
        if ((AdjArcs[i].Arc[j] >> 1) == ArcNum) then

/*extract the direction flag*/
            dir = AdjArcs[i].Arc[j] & 1;

/*if from node found..*/
            if (dir == 0) then

/*return from node and address*/
                Winners[w].Addr1 = Arcs[ArcNum].Addr1;
                Winners[w].Node1 = i;
                if (k++ == 2) then
                    break;
                endif /*if to node found...*/
            ELSE /*return the to node and address*/
                Winners[w].Addr2 = Arcs[ArcNum].Addr2;
                Winners[w].Node2 = 1;
                if (k++ == 2) then
                    break;
                endif
```

-77-
```
            endif
        endif
    endfor

/*break if both nodes and found, otherwise
    continue*/
    if (k == 2)
        break;
    else
        i++;
endwhile /*if successful return 0, otherwise, return -1*/
if (i < NUM_AA_RCD) then
    return(0);
ELSE
    return(-1);
endif
stop /*---------------------------------------------------*/
/*---------------------------------------------------*/
/*This routine downloads arc data for findnode      */
/*---------------------------------------------------*/
/*---------------------------------------------------*/
void DownLoadArcs ()

start

/*local variables*/
    long SeekDist;
    unsigned short Nwords;

/*Read in the 3683 adjarc records from ARCNET.DAT*/
    SeekDist = ADJ_ARCS_SEC * 160L;
    Nwords = NUM_AA_RCD / 2 * sizeof(struct AA);
    Oread (SeekDist, (short *) AdjArcs, Nwords);
```

-78-

```
/*Read in the 4930 arc records from NEWARC.DAT*/
SeekDist = ARCS_SEC * 160L;
Nwords = NUM_ARC_RCD / 2 * sizeof(struct ARC);
Oread (SeekDist, (short *) Arcs, Nwords);
```
stop

-79-

MODULE A5

MODULE A5

```
/*--------------*/
/*  SPELLING.C  */
/*--------------*/

/*-----------------------------------------------------------
copyright (C) by C. La Rue, February 1991 all rights reserved
-----------------------------------------------------------*/ include <define.h>
include <struct.h>
#include <prototyp.h>
/*#include <stdlib.h>*/
#include <malloc.h>
#include <string.h>

/*global data*/
extern HostPresent;

/*memory allocation pointers*/
extern struct HASH *Hash;
extern struct HASH2 *Hash2;
extern short *ColBuf;

/*winners scores array*/
short Scores[20];

/*col/symbol directory table*/
short Directory [21] [38] [2];

/*seek array - pointers are in bytes*/
long SeekPtr[20];
```

-80-

```c
/*col length array - col lengths are in bytes*/
long ColLth[20];

/*rhyme table*/
short Rhyme[38][11]= {
    4, 0, 9,10,36, 0, 0, 0, 0, 0, 0,    /*a*/
   10, 1, 2, 3, 4, 6,15,19,21,25,31,    /*b*/
   10, 2, 1, 3, 4, 6,15,19,21,25,31,    /*c*/
   10, 3, 1, 2, 4, 6,15,19,21,25,31,    /*d*/
   10, 4, 1, 2, 3, 6,15,19,21,25,31,    /*e*/
    2, 5,18, 0, 0, 0, 0, 0, 0, 0, 0,    /*f*/
   10, 6, 1, 2, 3, 4,15,19,21,25,31,    /*g*/
    1, 7, 0, 0, 0, 0, 0, 0, 0, 0, 0,    /*h*/
    3, 8,17,24, 0, 0, 0, 0, 0, 0, 0,    /*i*/
    3, 9, 0,10, 0, 0, 0, 0, 0, 0, 0,    /*j*/
    3,10, 0, 9, 0, 0, 0, 0, 0, 0, 0,    /*k*/
    1,11, 0, 0, 0, 0, 0, 0, 0, 0, 0,    /*l*/
    2,12,13, 0, 0, 0, 0, 0, 0, 0, 0,    /*m*/
    2,13,12, 0, 0, 0, 0, 0, 0, 0, 0,    /*n*/
    1,14, 0, 0, 0, 0, 0, 0, 0, 0, 0,    /*o*/
   10,15, 1, 2, 3, 4, 6,19,21,25,31,    /*p*/
    2,16,20, 0, 0, 0, 0, 0, 0, 0, 0,    /*q*/
    1,17, 0, 0, 0, 0, 0, 0, 0, 0, 0,    /*r*/
    3,18, 5,23, 0, 0, 0, 0, 0, 0, 0,    /*s*/
   10,19, 1, 2, 3, 4, 6,15,21,25,31,    /*t*/
    2,20,16, 0, 0, 0, 0, 0, 0, 0, 0,    /*u*/
   10,21, 1, 2, 3, 4, 6,15,19,25,31,    /*v*/
    1,22, 0, 0, 0, 0, 0, 0, 0, 0, 0,    /*w*/
    3,23, 5,18, 0, 0, 0, 0, 0, 0, 0,    /*x*/
    2,24, 8,17, 0, 0, 0, 0, 0, 0, 0,    /*y*/
   10,25, 1, 2, 3, 4, 6,15,19,21,31,    /*z*/
    1,26, 0, 0, 0, 0, 0, 0, 0, 0, 0,    /*blank*/
    1,27, 0, 0, 0, 0, 0, 0, 0, 0, 0,    /*period*/
    1,28, 0, 0, 0, 0, 0, 0, 0, 0, 0,    /*0*/
    1,29, 0, 0, 0, 0, 0, 0, 0, 0, 0,    /*1*/
    3,30,16,20, 0, 0, 0, 0, 0, 0, 0,    /*2*/
   10,31, 1, 2, 3, 4, 6,15,19,21,25,    /*3*/
```

```
   1,32, 0, 0, 0, 0, 0, 0, 0, 0, 0,    /*4*/
   3,33, 8,24, 0, 0, 0, 0, 0, 0, 0,    /*5*/
   1,34, 0, 0, 0, 0, 0, 0, 0, 0, 0,    /*6*/
   1,35, 0, 0, 0, 0, 0, 0, 0, 0, 0,    /*7*/
   4,36, 9,10, 0, 0, 0, 0, 0, 0, 0,    /*8*/
   1,37, 0, 0, 0, 0, 0, 0, 0, 0, 0  };/*9*/

/*------------------------------*/
/*------------------------------*/
/*Get a list of winners         */
/*------------------------------*/
/*------------------------------*/
void GetCandidates (char InpRoot[], short Candidates[])
start /*allocate buffers*/
    Hash = (struct HASH _far *)calloc(MAXHASH,
           sizeof(struct HASH));
    Hash2 = (struct HASH2 _far *)calloc(MAXHASH,
            sizeof(struct HASH2));
    ColBuf = (short _far *)calloc(2000, sizeof(short));

/*download spelling dictionary files*/
    DownloadSpellPointers();

/*accumulate scores in the hash table*/
    AccumulateScores (Hash, Hash2, ColBuf, InpRoot);

/*pull out 20 top scores and sort them*/
    PullOutWinners (Hash, Candidates);

/*release buffers memory*/
    free (ColBuf);
    free (Hash2);
    free (Hash);
stop
```

-82-

```
/*-----------------------------------------------------------*/
/*-----------------------------------------------------------*/
/*Down load the spelling checker files from the optical     */
/*disk                                                       */
/*-----------------------------------------------------------*/
/*-----------------------------------------------------------*/
void DownloadSpellPointers(void)
start /*Local variables*/
    long SeekDist;
    short Nwords;

/*Read in the spelling checker col directory*/
    SeekDist = DIRECTORY_SEC * 160L;
    Nwords = 20*38*2;
    Oread (SeekDist, (short *) &Directory, Nwords);

/*Read in the spelling checker seek file*/
    SeekDist = SEEK_PTR_SEC * 160L;
    Nwords = 40;
    Oread (SeekDist, (short *) &SeekPtr, Nwords);

/*Read in the spelling checker length file*/
    SeekDist = COL_LTH_SEC * 160L;
    Nwords = 40;
    Oread (SeekDist, (short *) ColLth, Nwords);
stop /*--------------------------------------*/
/*--------------------------------------*/
/*Accumulate scores in the hash table */
/*--------------------------------------*/
/*--------------------------------------*/
void AccumulateScores (struct HASH Hash[], struct HASH2
Hash2[], short ColBuf[], char InpRoot[])
```

-83- start

```
        /*local variables*/
        short Col;              /*index into col length table*/
        char NextLetter;        /*next let of the name string*/
        short NameNum;          /*name num index into tables*/
        short InpLet;           /*index into spoken name
                                string*/
        short RootLth;          /*length of input string,
                                including period*/
        short Shift;            /*slide left or right,
                                comparing*/
        short FirstLet;         /*first letter in input
                                sequence*/
        short LastLet;          /*last letter in input
                                sequence*/
        short Weight;           /*base wt - 5=let, num,
                                10=period*/
        short Sym;              /*numeric val of inp letter
                                (1-38)*/
        short RhymeNum;         /*second index into rhyme
                                table*/
        short Rsym;             /*first index into rhyme
                                table*/
        short First, Last;      /*first and last pointers col
                                directory*/
        short RstreetNum;       /*index into col buffer*/
        short ScoreWeight;      /*weight plus quality*/
        short Best;             /*best score so far*/
        short Count;            /*cumulative score*/
        short DeltaPos;         /*measure of good sequence*/
        short Flags;            /*save quality*/
        short Place;            /*place holder*/
        short Quality;          /*incremented for exact match,
                                exact col, exact seq*/
        short LastRhyme;        /*number of ryming symbols*/
        unsigned short ColSize  /*length of the column*/
```

-84-

```
/*Set shift count based on number letters entered*/
RootLth = strlen(InpRoot);
if (RootLth<=7) then
    Shift = 0;
elseif (RootLth <= 10) then
    Shift = 1;
ELSE
    Shift = 2;
endif /*Initialize best score to zero*/
Best = -1;

/*For each column...*/
for (Col=0; Col<RootLth+1; Col++) then

/*Read in the columns file*/
  SeekDist = COL_BUFFER_SEC * 160L;
  ColSize = (short) (ColLth[Col-1] / 2L);
  Oread (SeekDist, ColBuf, ColSize);

/*Calc the first and last letters in an input
  sequence*/
  FirstLet = Col - Shift;
  LastLet = Col + Shift;
  if (FirstLet < 0) then
    FirstLet = 0;
  endif
  if (LastLet >= RootLth) then
    LastLet = RootLth - 1;
  endif /*For a one, two, three, four or five letter
  sequence...*/
  for (InpLet=FirstLet;InpLet<=LastLet;InpLet++) then
```

-85-

```
/*Extract a letter from the name he typed in*/
NextLetter = InpRoot[InpLet];

/*Set base weight to 10 for normal letters and
numbers*/
Weight = 5;

/*Get numeric value of symbol*/
Sym = NextLetter;

/*If symbol is A-Z, set value from 0-25*/
if (65 <= NextLetter && NextLetter <= 90)
   Sym = Sym - 65;

/*If symbol is a space, set value to 26*/
else if (NextLetter == 32)
   Sym = 26;

/*If symbol is 0-9 set value from 28-37*/
else if (48 <= NextLetter && NextLetter <= 57)
   Sym = Sym - 20;

/*If symbol is the period, set value to 27 and base
   weight to 15*/
else if (NextLetter == 46) then
   Sym = 27;
   Weight = 10;
endif /*For each rhyming letter...*/
LastRhyme = Rhyme[Sym][0];
for    (RhymeNum=1;RhymeNum<=LastRhyme;RhymeNum++)
then
   Rsym = Rhyme[Sym][RhymeNum];

/*Pick out first and last pointers from col
   directory*/
```

-86-

```
First = Directory[Col] [Rsym] [0];
Last = Directory[Col] [Rsym] [1];

/*If valid pointer...*/
if (First != -1 && Last != -1) then

/*For each street name with this symbol...*/
    for (RstreetNum=First;RstreetNum<=Last;
    RstreetNum++) then /*Use name number as pointer into various
        tables*/
        NameNum = ColBuf[ColOffset + RstreetNum]-1;

/*remove this test later...*/
        if (NameNum < MAXHASH) then

/*If this name is within 50 points of
            best...*/
            Count = Hash[NameNum].Score;
            if (Count > (Best - 50)) then /* ------------------*/
                /* New Col Processing*/
                /* ------------------*/
                /*Extract flags and place holder/
                Flags = Hash2[NameNum].Flags;
                Place = Hash2[NameNum].Place;

/*If new column for this street.....*/
                if (Hash2[NameNum].ColNum != Col) then /*Update column number*/
                    Hash2[NameNum].ColNum = Col;

/*Move place holder to current, clear
                    flags*/
```

-87-

```
  Hash[NameNum].LetNum = Place;
  Place = 0;
  Flags = 0;
endif

/* --------------*/
/* Update score*/
/* -------------*/
/*Init quality flag to 1*/
Quality = 1;

/*Add 1 to quality if exact column*/
if (InpLet == Col)
   Quality++;

/*Add 1 to quality if exact match*/
if (RhymeNum==1)
   Quality++;

/*Add 1 to quality if good sequence*/
DeltaPos = InpLet - Hash[NameNum].LetNum;
if (DeltaPos==1)
   Quality++;

/*Mark place if best quality so far*/
if (Quality > Flags) then
   Place = InpLet;
   Flags = Quality;
endif /*Calculate weight and update score*/
ScoreWeight = Weight * Quality;
Count = Count + ScoreWeight;
Hash[NameNum].Score = Count;

/*Save place and flags in hashtable*/
Hash2[NameNum].Flags = Flags;
```

-88-

```
                    Hash2[NameNum].Place = Place;

/*Save best so far */
                    if (Count > Best) then
                        Best = Count;
                    endif
                  endif
                endif
              endfor
            endif
          endfor
        endfor
      endfor
stop /*----------------------------------------*/
/*----------                ---------------*/
/*Pull the winners out of the hash table */
/*----------------------------------------*/
/*----------------------------------------*/
void   PullOutWinners   (struct   HASH   Hash[],   short
Candidates[])
start /*local variables*/
    short i, j;            /*general purpose indicies*/
    short NameNum;         /*index   into   hash   scoring
                            table*/
    short Temp;            /*temp variable*/

/*Clear winners table*/
    for (i=0;i<=19;i++) then
        Candidates[i] = 0;
        Scores[i] = 0;
    endfor
```

-89-
```
/*For each entry in vote hashtable...*/
for (NameNum=0; NameNum<MAXHASH; NameNum++) then /*If score is above threshold...*/
    if (Hash[NameNum].Score > Scores[18]) then
        Scores[19] = Hash[NameNum].Score;
        Candidates[19] = NameNum + 1;
        j = 19;
        while (j > 0) then
        if (Scores[j] > Scores[j - 1]) then
            Temp = Scores[j];
            Scores[j] = Scores[j - 1];
            Scores[j - 1] = Temp;
            Temp = Candidates[j];
            Candidates[j] = Candidates[j - 1];
            Candidates[j - 1] = Temp;

/*Remove duplicate name from winners list*/
            if (Winners[j] == Winners[j - 1]) then
                Scores[j] = 0;
            endif
        endif
        j = j - 1;
        endwhile
    endif
endfor
stop
```

MODULE A6

MODULE A6

```
/*----------------------*/
/*      TELLPATH.C      */
/*----------------------*/
```

```
/*------------------------------------------------------------
copyright (C) by C. La Rue, September 1, 1988 all rights
reserved.
------------------------------------------------------------*/
```

```
/* This module performs the following functions:
   1. Reverses the Nod sequence to make a foward trip
   2. Makes a list of street names traversed
   3. If the name has a different root, creates a turn onto
      the new street
   4. Squeezes streets together having the same name
   5. Accumulates the total distance        */ include <define.h>
include <struct.h>
#include <stdlib.h>
#include <prototyp.h>
/*#include <stdlib.h>*/
#include <malloc.h>
#include <math.h>
#include <string.h>

/*global data*/
extern struct LOST Lost[];
extern short RestrictNum;
extern struct POS *Pos;
extern struct PATH *Path;
extern short *VocBuf;
```

-91-

```
/*module data*/
short StartNod;
short EndNod;
struct GNAME GnameArray[50];
short ArcName[50];
short BlkCnt[50];
float LegDir[50];
float DelAngle[50];
float CumDis[50];
short Last;
short N;
char SavRoot[20];
short SavPrev[50], SavPivot[50], SavTo[50];
float TripTime, TripDist;

/*----------------------------*/
/*----------------------------*/
/* Tell user the best path    */
/*----------------------------*/
/*----------------------------*/
void TellPath (short Nods[], short DeltaAddr)begin
start /*allocate voice memory*/
    VocBuf = (short *)calloc(30000, sizeof(short));

/*speak the best path*/
    DoTellPath (Nods, DeltaAddr, Path, Pos);

/*release the path, pos and voice memory*/
    free (VocBuf);
    free (Path);
    free (Pos);
stop
```

-92-

```
/*--------------------*/
/*--------------------*/
/* Speak the best path */
/*--------------------*/
/*--------------------*/
void DoTellPath (short Nods[], short DeltaAddr, struct PATH
Path[], struct POS Pos[])

start

/*Preset start node*/
    StartNod = Nods[0];
    EndNod = Nods[1];

/*If recovering from turn restrictions, make new start
    node*/
    if (Lost[RestrictNum].Code != 0) then
        MakeNewStartNode (Pos, Path);
    endif /*calculate the trip time in minutes*/
    TripTime = Path[EndNod].Cum/8.0/60.0;

/*Make a list of Nods in reverse*/
    ReverseNodes(Path);

/*Condense the path and make array of important
    variables*/
    CondensePath(Path, Pos);

/*if not recovering from turn problem...*/
    if (Lost[RestrictNum].Code == 0) then /*speak summary of trip - time and distance*/
        SpeakSummary(VocBuf);

/*speak first leg of the trip*/
```

-93-

```
        SpeakFirstLeg(VocBuf, DeltaAddr);

/*otherwise, speak first alternate leg of the trip*/
    ELSE
        SpeakAltFirstLeg(VocBuf);
    endif /*speak remaining legs of the trip*/
    SpeakRemainingLegs (VocBuf);

stop

/*--------------------------------------------------*/
/*--------------------------------------------------*/
/* If recovering from a turn restriction, make new start */
/* node                                              */
/*--------------------------------------------------*/
/*--------------------------------------------------*/
void MakeNewStartNode (struct POS Pos[], struct PATH Path[])
start /*copy position information to slot zero*/
    Pos[0].X = Pos[Lost[RestrictNum].Prev].X;
    Pos[0].Y = Pos[Lost[RestrictNum].Prev].Y;

/*have the start node point back to slot 0*/
    Path[StartNod].Bac = 0;

/*set the path name to name, different from the real
    name*/
    Path[StartNod].Nam = 27100;

/*start new path list at slot zero*/
    StartNod = 0;
stop
```

-94-

```
/*---------------------------------*/
/*---------------------------------*/
/*Make a list of Nods in reverse*/
/*---------------------------------*/
/*---------------------------------*/
void ReverseNodes(struct PATH Path[])
start /*local data*/
    short Child, Parent, GrandParent;

/*init child, parent and grandparent*/
    Child = EndNod;
    Parent = Path[Child].Bac;
    GrandParent = Path[Parent].Bac;
    Path[Child].Bac = -1;

while (1) then

/*Reverse direction by switching child and parent*/
        Path[Parent].Bac = Child;

/*Move to next*/
        Child = Parent;
        Parent = GrandParent;
        GrandParent = Path[Parent].Bac;
        if (Parent == StartNod) then
            Path[Parent].Bac = Child;
            break;
        endif
    endwhile
stop
```

-95-

```
/*-----------------------------------------------------*/
/*-----------------------------------------------------*/
/*Condense the path and make an array of important    */
/* variables                                           */
/*-----------------------------------------------------*/
/*-----------------------------------------------------*/
void CondensePath(struct PATH Path[], struct POS Pos[])
start /*local variables*/
    short PrevEnd, BegOfSeg, EndOfSeg;

/*Point to first leg*/
    N = 0;

/*extract beginning and end of first segment (arc)*/
    BegOfSeg = StartNod;
    EndOfSeg = Path[StartNod].Bac;

/*Get name of 1st leg of trip - at the end of the 1st
    seg)*/
    ArcName[0] = Path[EndOfSeg].Nam;

/*Initialize first leg distance*/
    CumDis[0] = GetDis(BegOfSeg, EndOfSeg, Pos);

/*Initialize trip distance*/
    TripDist = CumDis[0];

/*Save the first leg's direction angle*/
    LegDir[0] = GetAngle(BegOfSeg, EndOfSeg, Pos);

/*Get gname record of first segment*/
    GetGname (ArcName[0], (short *) &Gname);
    Gname[0].Root[20] = '\0';

/*Do for all legs on the path...*/
```

-96-

```
while (1) then

/*Move to beginning of next segment*/
    PrevEnd = BegOfSeg;
    BegOfSeg = EndOfSeg;
    EndOfSeg = Path[EndOfSeg].Bac;

/*Break out of loop if end node reached*/
    if (EndOfSeg == -1) then
        Last = N;
        break;
    endif /*Save the turn angle from prev segment to this
    segment*/
    DelAngle[N] = GetAngle(BegOfSeg, EndOfSeg, Pos) -
                  GetAngle(PrevEnd, BegOfSeg, Pos);

/*Save prev, pivot, to, and name in case turn is
    not allowed*/
    SavPrev[N] = PrevEnd;
    SavPivot[N] = BegOfSeg;
    SavTo[N] = EndOfSeg;

/*Add this segment to the trip distance*/
    TripDist = TripDist + GetDis(BegOfSeg, EndOfSeg,
    Pos);

/*get name number of next segment*/
    ArcName[N+1] = Path[EndOfSeg].Nam;

/*If seg does not belong on this leg, i.e.,
    different*/
    name number...*/
    if (ArcName[N+1] != PrevArcName) then /*read in the new leg's root name*/
```

-97-

```
            GetGname (ArcName[N+1], (short *) &Gname[N+1];
            Gname[N+1].Root[20] = '\0';

endif

/*if name number or root is the same...*/
        if ((ArcName[N+1]==ArcName[N]) ||
            (strcmp(Gname[N+1].Root,   Gname[N].Root))==0)
            then /*Add this segment to the leg's distance*/
            CumDis[N]  =  CumDis[N]  +  GetDis(BegOfSeg,
                        EndOfSeg, Pos);

/*increment this leg's block*/
            BlkCnt[N]++;

/*else if different root...*/
        ELSE

/*Calculate the new leg's direction angle*/
            LegDir[N+1]  =  GetAngle(BegOfSeg,  EndOfSeg,
                        Pos);

/*Initialize distance and block count for new
            leg*/
            CumDis[N+1] = 0;
            BlkCnt[N+1] = 0;

/*Move index to next leg*/
            N++;
        endif
    endwhile
stop
```

```
/*---------------------------------------*/
/*---------------------------------------*/
/*speak summary of trip - time and distance*/
/*---------------------------------------*/
/*---------------------------------------*/
void SpeakSummary(short VocBuf[])
start /*local data*/
    unsigned short Offset, Nwords;
    short Flag;

/*pack YOUR TRIP FROM*/
    Nwords = DiskToKey(YOUR_TRIP_FROM, VocBuf);
    Offset = Nwords;

/*pack first street name*/
    Nwords = DiskToStreet (GnameArray[0].Sector,
            GnameArray[0].Nsec, &VocBuf[Offset]);
    Offset = Offset + Nwords;

/*pack TO */
    Nwords = DiskToKey(TO, &VocBuf[Offset]);
    Offset = Offset + Nwords;

/*pack last street name*/
    Nwords = DiskToStreet (GnameArray[N].Sector,
            GnameArray[N].Nsec, &VocBuf[Offset]);
    Offset = Offset + Nwords;

/*pack WILL TAKE */
    Nwords = DiskToKey(WILL_TAKE, &VocBuf[Offset]);
    Offset = Offset + Nwords;

/*pack time in minutes*/
    Flag = 0;
     Nwords    =    FloatToSpeech(TripTime,    Flag,
```

-99-
            &VocBuf[Offset]);
    Offset = Offset + Nwords;

/*buffer is big enough, say the sentence*/
    SpeakPacked (VocBuf, Offset / 160);
    Offset = 0;

/*pack YOUR TRIP DISTANCE WILL BE*/
    Nwords = DiskToKey(YOUR_TRIP_DISTANCE_WILL_BE,
            &VocBuf[Offset]);
    Offset = Offset + Nwords;

/*pack distance in miles*/
    Flag = 1;
     Nwords   =   FloatToSpeech(TripDist,   Flag,
            &VocBuf[Offset]);
    Offset = Offset + Nwords;

/*buffer is big enough, say the sentence*/
    SpeakPacked (VocBuf, Offset / 160);
    Offset = 0;

/*say "SAY NEXT REPEAT OR PREVIOUS FOR INSTRUCTION"*/
    Nwords    =    DiskToKey(SAY_NEXT_REPEAT_OR_PREVIOUS,
            VocBuf);
    SpeakPacked (VocBuf, Nwords / 160);
stop /*----------------------*/
/*----------------------*/
/*Speak first leg of trip */
/*----------------------*/
/*----------------------*/

-100-
```
void SpeakFirstLeg (short VocBuf[], short DeltaAddr)
start
    /*local data*/
    unsigned short Offset, Nwords;
    short Cluster, NextAns;

/*wait for user's first input*/
    Cluster = 5;
    NextAns = Listen(Cluster);

/*say the proceed sentence*/
    SpeakProceed (VocBuf, CumDist[0], BlkCnt[0], LegDir[0],
    0);

/*pack street numbers will be.....*/
    Nwords = DiskToKey(STREET_NUMBERS_WILL_BE, VocBuf);
    Offset = Nwords;

/*pack decreasing*/
    if (DeltaAddr < 0) then
        Nwords = DiskToKey(DECREASING, &VocBuf[Offset]);
        Offset = Offset + Nwords;

/*pack increasing*/
    elseif (DeltaAddr > 0) then
        Nwords = DiskToKey(INCREASING, &VocBuf[Offset]);
        Offset = Offset + Nwords;
    endif /*buffer is big enough, say the sentence*/
    SpeakPacked (VocBuf, Offset / 160);

/*speak the first turn sentence*/
    SpeakTurn (VocBuf, DelAngle[0], 1);
stop
```

-101-

```
/*------------------------------------*/
/*------------------------------------*/
/*speak first alternate leg of the trip  */
/*------------------------------------*/
/*------------------------------------*/
void SpeakAltFirstLeg (short VocBuf[])
start /*if not a u-turn...*/
    if (fabs(fabs(DelAngle[0]) - 180.0) > 2.0) then /*if turning onto same street name as when couldn't
        turn...*/
        if (strcmp(Gname[1].Root,SavRoot) == 0) then /*clear the del angle so it says to continue
            ahead*/
            DelAngle[0] = 0.0;
        endif
    endif /*speak the first turn instruction*/
    SpeakTurn (VocBuf, DelAngle[0], 1);
stop /*------------------------------*/
/*------------------------------*/
/*speak remaining legs of the trip*/
/*------------------------------*/
/*------------------------------*/
void SpeakRemainingLegs (short VocBuf[])
start /*local data*/
```

-102-

```
short N, Cluster, NextAns;
unsigned short Nwords;

/*init leg index*/
N = 0;

/*do until dest printed out*/
while (1) then

/*sound beep and wait for user to speak*/
    Beep();
    Cluster = 5;
    NextAns = Listen(Cluster);

/*if user says next, move to next street...*/
    if (NextAns == NEXT_ANS) then
        N++;

/*if user says repeat, stay at same index*/
    elseif (NextAns == REPEAT_ANS) then
        N = N;

/*if user says previous, move index backward*/
    elseif (NextAns == PREVIOUS_ANS) then
        N = N - 1;
        if (N < 0) then
            N = 0;
        endif /*if user says cant turn, store no turn record
    record and exit*/
    elseif ((NextAns==NO_LEFT_TURN_ANS) ||
            (NextAns==NO_RIGHT_TURN_ANS)) then
        if (Lost[RestrictNum].Code != 0) then
            RestrictNum++;
        endif
        Lost[RestrictNum].Code = 1;
```

-103-

```
    Lost[RestrictNum].Prev = SavPrev[N];
    Lost[RestrictNum].Pivot = SavPivot[N];
    Lost[RestrictNum].To = SavTo[N];
    strcpy(SavRoot, Gname[N].Root);
    break;

/*if user says one way, store one way record and
exit*/
elseif (NextAns == ONEWAY_ANS) then
    if (Lost[RestrictNum].Code != 0) then
        RestrictNum++;
    endif
    Lost[RestrictNum].Code = 2;
    Lost[RestrictNum].Prev = SavPrev[N];
    Lost[RestrictNum].Pivot = SavPivot[N];
    Lost[RestrictNum].To = SavTo[N];
    break;

/*if user says lost, same as found, clear lost code
and exit*/
elseif (NextAns == LOST_ANS) then
    Lost[RestrictNum].Code = 0;
    break;
endif /*if no turn restriction problem, say the next
proceed sentence*/
SpeakProceed (VocBuf, CumDis[N], BlkCnt[N],
            Legdir[N], N);

/*if this is not the last leg...*/
if (N < Last) then

/*say the turn sentence*/
    SpeakTurn (VocBuf, DelAngle[N], N+1);

/*if this is the last leg...*/
```

-104-

```
        ELSE

/* say "YOU WILL BE AT YOUR DESTINATION"*/
            Nwords = DiskToKey(YOU_WILL_BE_AT_DESTINATION,
                              VocBuf);
            SpeakPacked (VocBuf, Nwords / 160);

/*clear lost code*/
            Lost[RestrictNum].Code = 0;
            break;
        endif
    endwhile
stop /*----------------------------------------------------------*/
/*----------------------------------------------------------*/
/* This subroutine speaks the direction of travel and the*/
/* distance                                              */
/* Two examples:                                         */
/*     "Proceed North East on 1st street a block or less"*/
/*     "Proceed North East on 1st street 22 point 6      */
/*      miles"                                           */
/* Inputs:                                               */
/*    CumDis = Distance to go to next turn               */
/*    BlkCnt = Number of blocks in leg                   */
/*    LegDir  = Travel direction 0 - 360 degrees         */
/*    Slot = Buffer ID:  106=Nam1Buf, 107=Nam2Buf        */
/*----------------------------------------------------------*/
/*----------------------------------------------------------*/
Void SpeakProceed (short VocBuf[], float CumDis, short
                   BlkCnt, float LegDir, short N)
start /*Local data*/
    unsigned short Nwords, Offset;
    short Octant, Flag;
```

-105-

```
/*pack PROCEED*/
Nwords = DiskToKey (PROCEED, VocBuf);
Offset = Nwords;

/*Calculate octant*/
if (LegDir >= 0.0) then
    Octant = (LegDir + 22.5) / 45.0;
ELSE
    LegDir = LegDir + 360.0;
    Octant = (LegDir + 22.5) / 45.0;
endif /*Fan out on octant and pack the direction of travel*/
switch (Octant) then
case 0:
    Nwords = DiskToKey (NORTH_ON, &VocBuf[Offset]);
    Offset = Offset + Nwords;
    break;
case 1:
    Nwords = DiskToKey (NORTHEAST_ON, &VocBuf[Offset]);

Offset = Offset + Nwords;
    break;
case 2:
    Nwords = DiskToKey (EAST_ON, &VocBuf[Offset]);
    Offset = Offset + Nwords;
    break;
case 3:
    Nwords = DiskToKey (SOUTHEAST_ON, &VocBuf[Offset]);
    Offset = Offset + Nwords;
    break;
case 4:
    Nwords = DiskToKey (SOUTH_ON, &VocBuf[Offset]);
    Offset = Offset + Nwords;
    break;
case 5:
```

-106-

```
        Nwords = DiskToKey (SOUTHWEST_ON, &VocBuf[Offset]);
        Offset = Offset + Nwords;
        break;
    case 6:
        Nwords = DiskToKey (WEST_ON, &VocBuf[Offset]);
        Offset = Offset + Nwords;
        break;
    case 7:
        Nwords = DiskToKey (NORTHWEST_ON, &VocBuf[Offset]);
        Offset = Offset + Nwords;
        break;
    case 8:
        Nwords = DiskToKey (NORTH_ON, &VocBuf[Offset]);
        Offset = Offset + Nwords;
        break;
    default:
        break;
endswitch /*pack proceed street name to buffer*/
Nwords = DiskToStreet (Gname[N].Sector, Gname[N].Nsec,
                        &VocBuf[Offset]);
Offset = Offset + Nwords;

/*if the distance is small, pack A BLOCK OR LESS*/
if (BlkCnt < 2 && CumDis < 0.15) then
        Nwords   =   DiskToKey(A_BLOCK_OR_LESS,
                &VocBuf[Offset]);
    Offset = Offset + Nwords;

/*else pack distance in miles*/
ELSE
    Flag = 1;
     Nwords    =    FloatToSpeech(CumDis,    Flag,
            &VocBuf[Offset]);
    Offset = Offset + Nwords;
endif
```

-107-

```
 /*buffer is big engougn, say the sentence*/
    SpeakPacked (VocBuf, Offset / 160);
stop
```

```
/*-------------------------------------------------------*/
/*-------------------------------------------------------*/
/* This subroutine speaks the turn instruction           */
/* Two examples:                                         */
/*    "Turn right on Hamilton Place"                     */
/*    "Make a hard left onto Benton Way"                 */
/*                                                       */
/* Inputs:                                               */
/*    VocBuf = voice buffer                              */
/*    DeltaAngle = angle between the legs                */
/*    N    = index into save GnameArray[] array          */
/*                                                       */
/*-------------------------------------------------------*/
/*-------------------------------------------------------*/
Void SpeakTurn (short VocBuf[], float DeltaAngle,
                short N)

start

/*Local data*/
    float TempAngle;
    unsigned short Nwords, Offset;

/*if a u turn, pack the u-turn instruction*/
    TempAngle = fabs(DeltaAngle);
    if (fabs(TempAngle - 180.0) < 2.0) then
        Nwords = DiskToKey (IF_SAFE_AND_LEGAL, VocBuf);

/*else if not a u turn...*/
    ELSE
```

-108-

```
/*Limit the delta angle*/
if (DeltaAngle > 180.0) then
    DeltaAngle = DeltaAngle - 360.0;
elseif (DeltaAngle < -180.0) then
    DeltaAngle = DeltaAngle + 360.0;
endif /*If a right turn...*/
if (DeltaAngle >= 0.0) then
    if (DeltaAngle < 22.5) then
        Nwords  =  DiskToKey   (CONTINUE_AHEAD_ON,
                VocBuf);
    elseif (DeltaAngle < 45.0) then
        Nwords = DiskToKey (BEAR_RIGHT_ON, VocBuf);
    elseif (DeltaAngle < 112.5) then
        Nwords = DiskToKey (TURN_RIGHT_ON, VocBuf);
    ELSE
        Nwords = DiskToKey (MAKE_A_HARD_RIGHT_ONTO,
                VocBuf);
    endif /*If a left turn...*/
elseif (DeltaAngle < 0.0) then
    DeltaAngle = fabs(DeltaAngle);
    if (DeltaAngle < 22.5) then
        Nwords  =  DiskToKey   (CONTINUE_AHEAD_ON,
                VocBuf);
    elseif (DeltaAngle < 45.0) then
        Nwords = DiskToKey (BEAR_LEFT_ON, VocBuf);
    elseif (DeltaAngle < 112.5) then
        Nwords = DiskToKey (TURN_LEFT_ON, VocBuf);
    ELSE
        Nwords = DiskToKey (MAKE_A_HARD_LEFT_ONTO,
                VocBuf);
    endif
endif
```

-109-

```
    endif

/*move street name to buffer*/
    Offset = Nwords;
    Nwords = DiskToStreet (GnameArray[N].Sector,
                                  GnameArray[N].Nsec,
                            &VocBuf[Offset]);
    Offset = Offset + Nwords;

/*buffer is big enough, say the sentence*/
    SpeakPacked (VocBuf, Offset / 160);

stop

/*-------------------------------------------------*/
/*-------------------------------------------------*/
/* This function converts a floating point number to */
/* keywords and returns  the number of words.       */
/* Inputs:                                          */
/*    Variable = time or distance                   */
/*    Flag = 0 if time, 1 if dist                   */
/*-------------------------------------------------*/
/*-------------------------------------------------*/ unsigned short FloatToSpeech (float Variable, short Flag,
                                  short Buf[])

start

/*local variables*/
    unsigned short Nwords;
    unsigned short Offset;
    short Upper;
    short Integer;
    short Fraction;

/*if a minute or less, pack LESS THAN A MINUTE and
```

-110-
```
exit immediately*/
if (Flag == 0 && Variable <= 1.0) then
    Nwords = DiskToKey(3, VocBuf);
    return (Nwords);
endif /*init the offset*/
Offset = 0;

/*Limit the variable to 39 miles or 39 minutes*/
if (Variable >= 40.0) then
    Variable = 39.9;
endif /*calculate the integer and fraction portions*/
if (Variable >= 30.0) then
    Upper = 39;
    Integer = Variable - 30.0;
elseif (Variable >= 20.0) then
    Upper = 38;
    Integer = Variable - 20.0;
elseif (Variable >= 1.0) then
    Upper = 0;
    Integer = Variable;
ELSE
    Upper = 0;
    Integer = 0;
endif
if (Variable < 0.1) then
    Fraction = 1;
ELSE
    Fraction = 10 * (Variable - (short)(Variable));
endif /*pack 20 or 30*/
if (Upper > 0) then
    Nwords = DiskToKey(Upper, &VocBuf[Offset]);
```

```
                          -111-
    Offset = Offset + Nwords;
endif

/*pack the integer portion*/
if (Integer > 0) then
    Nwords = DiskToKey(Integer + 18, &Buf[Offset]);
    Offset = Offset + Nwords;
endif /*pack the POINT and the fraction portion*/
if (Fraction > 0) then
    Nwords = DiskToKey(40, &Buf[Offset]);
    Offset = Offset + Nwords;
    Nwords = DiskToKey(Fraction + 18, &Buf[Offset]);
    Offset = Offset + Nwords;
endif /*pack MILE */
if (Flag == 1 && Upper == 0 && Integer == 1 && Fraction
    == 0) then
    Nwords = DiskToKey(6, &VocBuf[Offset]);
    Offset = Offset + Nwords;

/*pack MILES*/
elseif (Flag == 1) then
    Nwords = DiskToKey(7, &Buf[Offset]);
    Offset = Offset + Nwords;

/*pack MINUTES*/
ELSE
    Nwords = DiskToKey(4, &Buf[Offset]);
    Offset = Offset + Nwords;
endif /*return the new offset*/
return(Offset);
``` stop

```
/*-----------------------------------------------------------*/
/*-----------------------------------------------------------*/
/* This subroutine computes the angle of the arc between     */
/* two nodes                                                 */
/*-----------------------------------------------------------*/
/*-----------------------------------------------------------*/
float GetAngle(short BegOfArc, short EndOfArc, struct POS
Pos[])

start

/*Local Data*/
    float Dx, Dy, Ang;

/*Calc the angle*/
    Dx = Pos[EndOfArc].X - Pos[BegOfArc].X;
    Dy = Pos[EndOfArc].Y - Pos[BegOfArc].Y;
    Ang = atan2 (Dy,Dx) * 180.0/3.1416;
    Ang = 90.0 - Ang;
    return(Ang);

stop

/*-----------------------------------------------------------*/
/*-----------------------------------------------------------*/
/* This subroutine computes distance in miles between two*/
/* nodes                                                     */
/*-----------------------------------------------------------*/
/*-----------------------------------------------------------*/
float GetDis(short FromNod, short ToNod, struct POS Pos[])

start
```

-113-

```
/*Local data*/
float Dx, Dy, Range;

/*Calc the angle*/
Dx = Pos[ToNod].X - Pos[FromNod].X;
Dy = Pos[ToNod].Y - Pos[FromNod].Y;
Range = sqrt (Dx*Dx + Dy*Dy)/528;
return(Range);
``` stop

-114-

MODULE A7

MODULE A7

```
/*-------------*/
/*   TRAIN.C   */
/*-------------*/

/*------------------------------------------------------------*/
copyright (C) by C. La Rue, September 1, 1988 all rights
reserved.
------------------------------------------------------------*/
#include <define.h>
include <struct.h>
#include <prototyp.h>
#include <stdlib.h>

/*module data */
extern short Templates[];   /*trained speech templates*/
short C1[47];               /*first cluster for templates*/
short C2[47];                      /*second cluster for
                            templates*/

/*-----------------------------*/
/*-----------------------------*/
/*perform the training function*/
/*-----------------------------*/
/*-----------------------------*/
void Train (void)

start

/*local variables*/
    short p
    short t;

/*ask him it he wants to train his voice*/
```

-115-

```
SpeakKeyWordPrompt (DO_YOU_WISH_TO_TRAIN);

/*exit if he replies with a "no" */
Ans = NoListen(3);
if (Ans == NO_ANS) then
    return;
endif /*for each pass...*/
for (p=0; p<=2; p++) then /*until he likes the alphabet..*/
    while (1) then /*ask him to say the alphabet*/
        SpeakKeyWordPrompt (PLEASE_SAY_THE_ALPHABET);

/*for each training letter of the alphabet...*/ for (t=0; t<=25; t++) then

/*extract features and echo*/
            FeaturesAndEcho();

/*upload the extracted features*/
            ReportFeaturs(p, t);

endfor

/*ask him if that's ok*/
        SpeakKeyWordPrompt (DID_THAT_SOUND_OK);

/*exit if he replies with a "yes" */
        if (Listen (3) == YES_ANS) then
            break;
        endif
    endwhile
```

-116-

```
/*until he likes the numbers...*/
while (1) then

/*ask him to say the numbers*/
    SpeakKeyWordPrompt (PLEASE_SAY_THE_NUMBERS);

/*for each number from 0 to 9...*/
    for (t=26; t<=35; t++) then

/*command feature extraction and echo the
        voice*/
        FeaturesAndEcho;

/*upload the extracted features*/
        ReportFeatures(p, t);
    endfor

/*ask him if that's ok*/
    SpeakKeyWordPrompt (DID_THAT_SOUND_OK);

/*exit if he replies with a "yes" */
    if (Listen (3) == YES_ANS) then
        break;
    endif
endwhile /*until he likes the control words...*/
while (1) then /*ask him to say these control words*/
    SpeakKeyWordPrompt (PLEASE_SAY_CONTROL_WORDS);

/*for each control word...**/
    for (t=36; t<=46; t++) then

/*prompt him for control word*/
```

-117-
```
            SpeakKeyWordPrompt (t);

/*command feature extraction*/
            FeaturesAndEcho();

/*upload the extracted features*/
            ReportFeatures(p, t);
        endfor /*ask him if that's ok*/
        SpeakKeyWordPrompt (DID_THAT_SOUND_OK);

/*exit if he replies with a "yes" */
        if (Listen (3) == YES_ANS) then
            break;
        endif
    endwhile
  endfor
stop /*------------------------------------------------------------*/
/*------------------------------------------------------------*/
/*Command 2 - Report features and save in template array */
/*------------------------------------------------------------*/
/*------------------------------------------------------------*/ void ReportFeatures (short Pass, short Word)

start

/*local variables*/
    short Offset, i, n, Number;

/*create an offset index into the training RAM*/
    Offset = (Pass * 47) + Word;
```

-118-

```
    /*sen the command to the DSP*/
    HostToDsp(2);

/*save the number of words in the template*/
    i = Offset;
    Number = DspToHost();
    Templates[i] = Number;

/*for each template word...*/
    for (n=1; n<=Number; n++) then
        i++;
        Templates[i] = DapToHost();
    endfor
stop /*------------------------------------------------*/
/*------------------------------------------------*/
/* Match against templates and return best score */
/*------------------------------------------------*/
/*------------------------------------------------*/
short Match (short Cluster, short Threshold)
start /*local variables*/
    short p, t, i, n;          /*indicies*/
    short Offset;              /*template location*/
    short TempSize;            /*template size*/
    short Score;               /*template score*/
    short BestScore;            /*best matching score so
                                 far*/ short BestWord;             /*best matching word so
                                 far*/

/*make clusters if not already done*/
    if (Cl[0] == 0) then
        MakeClusters();
```

-119-

```
endif

/*initialize high score*/
BestScore = 32000;

/*for each pass...*/
for (p=0; p<=2; p++) then

/*for each template in pass...*/
    for (t=0; t<=46; t++) then

/*if template belongs to the desired
        cluster...*/
        if (Cluster == C1[t] || Cluster == C2[t]) then /*calculate the template offset*/
            TempNumber = p * 47 + t;

/*send the command to the DSP*/
            HostToDsp(3);

/*read the number of words in the
            template*/
            TempSize = Templates[Offset];

/*send number of words to DSP*/
            HostToDsp(TempSize);

/*send remaining template words to DSP*/
            i = Offset;
            for (n=1; n<=TempSize; n++) then
                i++;
                HostToDsp(Templates[i]);
            endfor /*read score*/
            Score = DspToHost();
```

```
                        -120-
            if (Score < BestScore) then
                BestScore = Score;
                BestWord = t;
            endif
        endif
    endfor
endfor /*if the score is decent, return it - otherwise return
a -1*/
if (BestScore <= Threshold) then
    return(BestWord);
ELSE
    return (-1);
endif
end /*------------------------------------------------*/
/*------------------------------------------------*/
/*  make the C1 and C2 cluster arrays            */
/*------------------------------------------------*/
/*------------------------------------------------*/
void MakeClusters(void)
begin /*local variables*/
    short t;

/*alphabet belongs in cluster 1 only*/
    for (t=0; t<=25; t++) then
        C1[t] = 1;
        C2[t] = 0;
    endfor /*numbers belong in cluster 2 only*/
    for (t=26; t<=35; t++) then
```

```
                        -121-
        C1[t] = 2;
        C2[t] = 0;
    endfor /*backspace belongs in clusters 1 and 2*/
    C1[36] = 1;
    C2[36] = 2;

/*yes/no belong in cluster 3 only*/
    C1[37] = 3;
    C2[37] = 0;
    C1[38] = 3;
    C2[38] = 0;

/*navigator belongs in cluster 4 only*/
    C1[39] = 4;
    C2[39] = 0;

/*enter belongs in clusters 1 and 2*/
    C1[40] = 1;
    C2[40] = 2;

/*next, prev, repeat, one way, no left, no right
    belong in cluster 5*/
    for (t=40; t<=46; t++) then
        C1[t] = 5;
        C2[t] = 0;
    endfor
end /*-------------------------------------*/
/*-------------------------------------*/
/*Get a string of characters from user*/
/*-------------------------------------*/
/*-------------------------------------*/
short VoiceToString (short Cluster, char Ascii[])
```

-122-

```
begin

/*local variables*/
    short i, Alpha, Prompt;

/*accumulate characters until user says ENTER*/
    i = -1;
    while (1) then

/*get next utterance*/
        Alpha = Listen (Cluster);

/*if user says "ENTER"...*/
        if (Alpha == ENTER_ANS) then

/* if no characters, he wants cross street, */
            /*2 beeps and return 1*/
            if (i == -1) then
                Beep();Pause();Beep();Pause();
                return(1);
            endif /*if he says "ENTER", pack period, pack null */
            /* character, beep and exit*/
            i++;
            Ascii[i] = 46;
            i++;
            Ascii[i] = '\0';

/*two beeps after "ENTER"*/
            Beep();Pause();Beep();Pause();
            break;

/*if he says "CORRECTION", pack a null and decrement */
        /*the counter*/
        elseif (Alpha == BACKSPACE_ANS) then
```

-123-

```
    Ascii[i] = '\0';
    if (i >= 0) then
        i--;
    endif

/*three beeps after "CORRECTION"*/
    Beep();Pause();Beep();Pause();

/*if he says "LETTERS", toggle to cluster 1*/
elseif (Alpha == LETTERS_ANS) then
    Cluster = 1;

/*four beeps after "LETTERS"*/
    Beep();Pause();Beep();Pause();Beep();Pause();

/*if he says "NUMBERS", toggle to cluster 2*/
elseif (Alpha == NUMBERS_ANS) then
    Cluster = 2;

/*four beeps after "NUMBERS"*/
    Beep();Pause();Beep();Pause();Beep();Pause();

/*if he says "A-Z" pack ascii alpha character*/
elseif (Alpha <= 25) then
    i++;
    Ascii[i] = Alpha + 65;

/*if he says "0-9" pack ascii numeric character*/
elseif (Alpha <= 35) then
    i++;
    Ascii[i] = Alpha + 22;
    Prompt = Alpha - 8;

/*echo back what was recognized*/
    if (Prompt == 18) then
        Prompt = 40;
```

-124-

```
        endif
        SpeakKeyWordPrompt(Prompt);
    endif
endwhile

/*return 0 if normal ENTER*/
return(0);end
```

```
/*---------------------*/
/*---------------------*/
/*wait for user to speak*/
/*---------------------*/
/*---------------------*/
short Listen (short Cluster)
begin /*local variables*/
    short Threshold;        /*minimum acceptable score*/
    short BestTemplate;         /*best matching template
                                number*/

/*wait for user to say something which exceeds the
    threshold*/
    Beep();
    Threshold = 45;    while(1) then
        ExtractFeatures(NO_ECHO);
        BestTemplate = Match (Cluster, Threshold);
        if (BestTemplate >= 0) then
            break;
        ELSE
            Threshold = Threshold + 5;
        endif
    endwhile
```

-125-

```
    /*return the spoken letter or command*/
    return(BestTemplate);
end

/*-----------------------------------*/
/*-----------------------------------*/
/*wait for user to speak - no beep */
/*-----------------------------------*/
/*-----------------------------------*/
short NoListen (short Cluster)
begin /*local variables*/
    short Threshold;          /*minimum acceptable score*/
    short BestTemplate;         /*best matching template
                                number*/

/*wait for user to say something which exceeds
    threshold*/
    Threshold = 45;
    while(1) then
         ExtractFeatures(NO_ECHO);
         BestTemplate = Match (Cluster, Threshold);
         if (BestTemplate >= 0) then
              break;
         ELSE
              Threshold = Threshold + 5;
         endif
    endwhile /*return the spoken letter or command*/
    return(BestTemplate);
end
```

-126-

MODULE A8

MODULE A8

```
/*This file contains the trained speech templates*/
#pragma region("ram=eram")
short Templates[3*47*30*3];
```

-127-

MODULE A9

MODULE A9

```
/*------------------------*/
/*  Include file DEFINE   */
/*------------------------*/

/*--------------------*/
/*language definitions*/
/*--------------------*/
#define then {
#define ELSE } else {
#define elseif } else if
#define endif }
#define endswitch }
#define start {
#define stop }
#define endwhile }
#define endfor }

/*-----------*/
/*table sizes*/
/*-----------*/
#define NUM_POS_RCD 3683
#define NUM_AN_RCD 3683
#define NUM_AA_RCD 3683
#define NUM_ARC_RCD 4930
#define MAXHASH 28000
#define MAXCOL 2000

/*-------------------------*/
/*optical disk sector values*/
/*-------------------------*/
#define AdjNodesSec 32429
#define AdjArcsSec 32798
#define PosSec 33167
```

-128-

```
#define ArcsSec 33214
#define DirectorySec 33400
#define ColBufferSec 33410
#define SeekPtrSec 33461
#define ColLthSec 33462
#define DeyWordsSec 33463
#define GnamesSec 33465

/*--------------------------*/
/*keyword number definitions*/
/*--------------------------*/
#define YOUR_TRIP_FROM 0
#define TO 1
#define WILL_TAKE 2
#define LESS_THAN_A_MINUTE 3
#define MINUTES 4
#define YOUR_TRIP_DISTANCE_WILL_BE 5
#define MILE 6
#define MILES 7
#define SAY_NEXT_REPEAT_OR_PREVIOUS 8
#define A_BLOCK_OR_LESS 9
#define PROCEED 10
#define NORTH_ON 11
#define SOUTH_ON 12
#define EAST_ON 13
#define WEST_ON 14
#define NORTHEAST_ON 15
#define NORTHWEST_ON 16
#define SOUTHEAST_ON 17
#define SOUTHWEST_ON 18
#define POINT 40
#define TURN_RIGHT_ON 41
#define TURN_LEFT_ON 42
#define BEAR_RIGHT_ON 43
#define BEAR_LEFT_ON 44
#define MAKE_A_HARD_RIGHT_ONTO 45
```

```
-129-
#define MAKE_A_HARD_LEFT_ONTO 46
#define CONTINUE_AHEAD_ON 47
#define YOU_WILL_BE_AT_DESTINATION 48
#define PLEASE_SPELL_CURRENT_LOCATION 49
#define PLEASE_SAY_THE_STREET_NUMBER 50
#define PLEASE_SPELL_DESTINATION 51
#define YOUR_CURRENT_CANT_BE_FOUND 52
#define YOUR_DESTINATION_CANT_BE_FOUND 53
#define IS 54
#define THE_CORRECT_STREET 55
#define STREET_NUMBERS_WILL_BE 56
#define INCREASING 57
#define DECREASING 58
#define LOCATING_THE_ADDRESS 59
#define NAVIGATOR_IS_READY 60
#define A_ROUTE_CANNOT_BE_FOUND 61
#define COMPUTING_ALTERNATE_ROUTE 62
#define IF_SAFE_AND_LEGAL 63

/*-----------------------------*/
/*train word number definitions*/
/*-----------------------------*/
#define DO_YOU_WISH_TO_TRAIN 64
#define DID_THAT_SOUND_OK 65
#define PLEASE_SAY_THE_ALPHABET 66
#define PLEASE_SAY_THE_NUMBERS 67
#define PLEASE_SAY_CONTROL_WORDS 68
#define BACKSPACE 69
#define YES 70
#define NO 71
#define NAVIGATOR 72
#define ENTER 73
#define NEXT 74
#define PREVIOUS 75
#define REPEAT 76
#define ONEWAY 77
#define NO_LEFT_TURN 78
```

-130-
```
#define NO_RIGHT_TURN 79

/*----------------------------*/
/*template number definitions*/
/*----------------------------*/
#define BACKSPACE_ANS 36
#define NO_ANS 37
#define YES_ANS 38
#define NAVIGATOR_AND 39
#define ENTER_ANS 40
#define NEXT_ANS 41
#define PREVIOUS_ANS 42
#define REPEAT_ANS 43
#define ONEWAY_ANS 44
#define NO_LEFT_TURN_ANS 45
#define NO_RIGHT_TURN_ANS 46
#define LOST_ANS 47

/* DSP to HOST block identifiers*/
#define C_END_OF_FILE 11
#define C_FRAME_NUMBER 10
#define C_ECHO_1

/* Communication port definitions*/
#define HOST_TO_DSP_PORT 0x362;
#define DSP_TO_HOST_DATA_PORT 0x362;
#define HOST_TO_DSP_STATUS_PORT 0x362;
#define DSP_TO_HOST_STATUS_PORT 0x362;

/*----------------------------------*/
            /*   include file <prototyp.h>     */
            /*----------------------------------*/

/* EXEC funtion prototypes*/
short CalcDeltaAddr(short Nodes[], struct PATH Path[]);
short AskDup (struct WIN Winners[], short PromptNum);
```

-131-

```
/* ASTAR function prototypes*/
short Astar (short Nodes[]);
short DoAstar (short Nodes[], struct AN AdjNodes[], struct
              AA AdjArcs[], struct POS Pos[], struct ARC
              Arcs[], struct PATH Path[], struct QUE
              Que[]);
void DownloadMapData (void);
void FormQueue(struct PATH Path[], struct QUE Que[],
     struct POS Pos[]);
void RemoveFirst(struct QUE Que[]);
void Extend(struct AN AdjNodes[], struct AA AdjArcs[],
     struct POS Pos[], struct ARC Arcs[],
     struct PATH Path[], struct QUE Que[]);
void SortPath (short Node, short ArcWithDir, unsigned short
              Time, struct QUE Que[]);
void Unlink(short Node, struct QUE Que[]);
unsigned short AsCrowFlys (short SNode, short ENode, struct
                           POS Pos[]);
long root2 (long X);
void BreakPtr (struct AN AdjNodes[], struct AA AdjArcs[],
              struct ARC Arcs[]);

/* DSPIO funtion prototypes*/
void DownloadKeyPointers(void);
void SpeakKeyWordPrompt (short Num);
unsigned short DiskToKey (short Num, short Buf[]);
unsigned short DiskToGnameToStreet (short Nam, short
                                    Buf[]);
unsigned short DiskToStreet (long Sector, short Nsec, short
                             Buf[]);
void GetGname (short Nam, struct GNAME Gname[]);
unsigned short Oread(long SeekDist, short Buf[], unsigned
                    short Nwords);
short DspToHost (void);
void FeaturesAndEcho(void);
void Features(void);
```

-132-
```c
short Listen (short Cluster);
void VoiceToString (short Cluster, char Ascii[]);
void SpeakPacked(short Buf[], short Nsec);
void ConstantsToDsp(void);
void Beep(void);
void MakeSinewave (void);

/*TRAIN function prototypes*/
void Train (void);
void DownloadTrainPointers(void);
void ReportFeatures (short Pass, short Word);
short Match (short Cluster, short Threshold);
void MakeClusters(void);
void SpeakTrainingPrompt (short Num);
short DiskToTrain (short Num);

/* SPELLING function prototypes*/
void GetCandidates (char InpRoot[], short Winners[]);
void DownloadSpellPointers(void);
void AccumulateScores (struct HASH Hash[], struct HASH2
                Hash2[], short ColBuf[], char
                InpRoot[]);
void PullOutWinners (struct HASH Hash[], short Winners[]);

/* FINDNODE function prototypes*/
short  FindNode  (short  Candidates[], unsigned  short
            StreetNum, struct WIN Winners[]);
short SrchArcDef (short Nam, unsigned short StreetNum,
            struct ARC Arcs[]);
short SrchAdjArc (short ArcNum, struct WIN Winners[], short
            w, struct AA AdjArcs[], struct ARC Arcs[]);
void DownLoadArcs (void);

/* TELLPATH function prototypes*/
void TellPath (short Nods[], short DeltaAddr);
void DoTellPath (short Nods[], short DeltaAddr, struct PATH
            Path[], struct POS Pos[]);
```

-133-

```
void MakeNewStartNode (struct POS Pos[], struct PATH
                    Path[]);
void ReverseNodes(struct PATH Path[]);
void CondensePath(struct PATH Path[], struct POS Pos[]);
void SpeakSummary(short VocBuf[]);
void SpeakFirstLeg (short VocBuf[], short DeltaAddr);
void SpeakAltFirstLeg (short VocBuf[]);
void SpeakRemainingLegs (short VocBuf[]);
void SpeakProceed (short VocBuf[], float CumDis, short
            BlkCnt, float LegDir, short N);
void SpeakTurn (short VocBuf[], float DeltaAngle, short N);
unsigned short FloatToSpeech (float Variable, short Flag,
                            short Buf[]);
float GetAngle(short BegOfArc, short EndOfArc, struct POS
            Pos[]);
float GetDis(short FromNod, short ToNod, struct POS Pos[]);

/*----------------------*/
                    /* include file STRUCT  */
                    /*----------------------*/

/*This include file defines global structures, externals
and constants.  It can be safely included in all modules*/

/*----------*/
/*structures*/
/*----------*/
struct AN {         /*network structure for 3683 nodes and
                    arcs*/
    int Nod[8];};   /*eight adjacent nodes*/ struct AA {
    int Arc[8];};           /*eight adjacent arcs*/ struct POS {                /*positions structure for 3683
                            nodes*/
```

-134-

```
    short X;              /*node's x coord*/
    short Y;};            /*node's y coord*/ struct ARC {              /*arcs structure for 4937 arcs/*
    int Nam;              /*arc name*/
    int Tim;              /*arc time*/
    short Wt;             /*arc dist 12 bits, arc weight 4
                          bits*/
    unsigned int Addr1;   /*block addr at one end of
                          arc*/
    unsigned int Addr2;   /*block addr at other end of
                          arc*/
    unsigned char Flg[2];}; /*flags for node to left of
                          arc*/ struct PATH {             /*back linked partial path
                          list*/
    short Bac;            /*back poshorter to parent*/
    unsigned Cum;         /*cumulative time along path*/
    short Nam;            /*path name*/
    short Dis;};          /*arc distance to parent node*/ struct QUE {              /*doubly linked partial path
                          queue*/
    short Fwd;            /*poshorter to next in queue*/
    short Bac;            /*poshorter to previous in
                          queue*/
    unsigned short Tim;   /*total travel time to this
                          node*/
    short Arc;};          /*arc along path, includes
                          direction flag in lsb*/ struct WIN {              /*winners list structure*/
    short Nam;            /*name of arc*/
    short Node1;          /*node number of one end of
                          arc*/
    short Node2;          /*node number of other end of
```

```
                           arc*/
    unsigned short Addr1;    /*address at one end of arc*/
    unsigned short Addr2;}; /*address at other end of arc*/ struct LOST {              /*lost record structure*/
    short Code;            /*0=OK or Lost, 1=No turn, 2=One
                             way*/
    short Prev;            /*Previous node*/
    short Pivot;           /*Pivot node*/
    short To;};            /*To node*/ struct HASH {              /*hash table structure for the
                             spelling checker*/
    unsigned Score  : 11;
    unsigned LetNum : 5;
};

struct HASH2 {             /*hash table structure for the
                             spelling checker*/
    unsigned ColNum : 5;
    unsigned Place  : 5;
    unsigned Flags  : 6;
};
struct KEY {               /*keyword record structure*/
    long Sector;
    int Nsec;
};

struct TRAIN {             /*keyword record structure*/
    long Sector;
    int Nsec;
};

struct GNAME {             /*Gname split record structure*/
    char Prefix[2];
    char Root[20];
    char Type[4];
```

-136-

```
    char Suffix[2];
    long Sector;
    int Nsec;
};

struct AGNAME {        /*Gname record structure - short
                        version*/
    char Ascii[28];
    long Asector;
    int Ansec;
};
```

-137-

MODULE A10

MODULE A10

```
DECLARE SUB Unlink ()
DECLARE SUB Restrict ()
DECLARE SUB NewPicture ()
DECLARE SUB FormQueue (FromArc%, ToArc%)
DECLARE SUB SortQueue (Arc%, Estimate%)
DECLARE SUB MakePointers (i%)
```

---
---

```
'Copyright (C) 9/1/88 in Los Angeles County by C. La Rue,
'all rights reserved.
'
'This is a test program for a modified A* algorithm
'implementation.  It performs the following functions:
'
'    1. creates an arc definition array of 49 test arcs -
'       Arc()
'    2. from the arc definitions, creates an array of 49 arc
'       pointers - Ptr()
'    3. displays a drawing of a graph and asks the user for
'       the starting and ending arcs and any turn and one way
'       street restrictions
'       4.  finds  the  best  path  using  a  modified  A*
'       implementation
'
'The program can be compiled and executed using MicroSoft
'QuickBasic 4.0 or later.
'
'The A* modification is this:
'    Instead of eliminating all paths which get to a common
'    node except the shortest path, we allow a limited
'    number of paths, say one or two, to get to the common
'    node.  This allows A* to find a path even in a severly
```

-138-

```
'   restricted network.  This is done in the SortQue
'   ·routine.
'
'   This modification is moving us toward branch and bound
'   with a good guess.

'-----------------------------------------------------------
'-----------------------------------------------------------

'force arrays to begin with index 1
OPTION BASE 1

'declare all variables as integer
DEFINT A-Z

'array of arcs definitions
TYPE ArcType
    Nam AS STRING * 1    'arc name - single letter name
    X1 AS INTEGER        'arc from X coordinate
    Y1 AS INTEGER        'arc from Y coordinate
    X2 AS INTEGER        'arc to X coordinate
    Y2 AS INTEGER        'arc to Y coordinate
    X AS INTEGER         'arc center X coordinate
    Y AS INTEGER         'arc center Y coordinate
    Lth AS INTEGER       'length of the arc
    Wt AS INTEGER        'arc weight
    OneWay AS INTEGER    '1=cant enter node 1, 2=cant enter
                         node 2
END TYPE
DIM SHARED Arc(49) AS ArcType 'array of pointers to adjacent arcs
DIM SHARED Ptr(49, 6)

'partial paths list
TYPE PathType
    Arc AS INTEGER              'arc number
```

-139-

```
    Bac AS INTEGER          'back pointer to previous arc
                             in path
    Cum AS INTEGER          'cumulative time along path
    EnterNode AS INTEGER    'node by which path was ent, 1
                             or 2
END TYPE
DIM SHARED Path(2000) AS PathType 'array of sorted partial paths
TYPE QueueType
    Pat AS INTEGER          'pointer to path
    Fwd AS INTEGER          'pointer to next in queue
    Bac AS INTEGER          'pointer to previous in queu
    Total AS INTEGER        'path cost so far
END TYPE
DIM SHARED Que(2000) AS QueueType 'pointer to first in queue
DIM SHARED First 'pointer to first free slot
DIM SHARED FreeQue, FreePath 'from the drawing, assign xy coordinates to horizontal arcs
i = 0
FOR r = 0 TO 4
    FOR c = 0 TO 4
        i = i + 1
        Arc(i).Nam = CHR$(r + 65)
        Arc(i).X1 = c * 5
        Arc(i).X2 = c * 5 + 5
        Arc(i).Y1 = r * 4
        Arc(i).Y2 = r * 4
        Arc(i).Wt = 0
    NEXT c
NEXT r
```

-140-

```
'from the drawing, assign xy coordinates to veritcal arcs
FOR r = 0 TO 3
    FOR c = 0 TO 5
        i = i + 1
        Arc(i).Nam = CHR$(c + 70)
        Arc(i).X1 = c * 5
        Arc(i).X2 = c * 5
        Arc(i).Y1 = r * 4
        Arc(i).Y2 = r * 4 + 4
        Arc(i).Wt = 0     NEXT c
NEXT r 'for each arc...
FOR i = 1 TO 49

'calc the center coord of the arc
    Arc(i).X = (Arc(i).X1 + Arc(i).X2) \ 2
    Arc(i).Y = (Arc(i).Y1 + Arc(i).Y2) \ 2

'calc the half length of the arc
    Delx = Arc(i).X1 - Arc(i).X2
    Dely = Arc(i).Y1 - Arc(i).Y2
    Arc(i).Lth = .5 * SQR(Delx ^ 2 + Dely ^ 2)

'clear the oneway flags
    Arc(i).OneWay = 0
NEXT i

'make the pointers for the arcs
FOR i = 1 TO 49
    CALL MakePointers(i)
NEXT i

DO
```

-141-
------------------------------------------------------------
------------------------------------------------------------

```
'display graph
                                  1         2
                        0123456789012345678901 2345
PRINT "                   F    G    H    J    K    L "
PRINT "                 A|--1-|--2-|--3-|--4-|--5-|  "
PRINT "                  |    |    |    |    |    |  "
PRINT "                  26   27   28   29   30   31"
PRINT "                  |    |    |    |    |    |  "
PRINT "                 B|--6-|--7-|--8-|--9-|-10-|  "
PRINT "                  |    |    |    |    |    |  "
PRINT "                  32   33   34   35   36   37"
PRINT "                  |    |    |    |    |    |  "
PRINT "                 C|-11-|-12-|-13-|-14-|-15-|  "
PRINT "                  |    |    |    |    |    |  "
PRINT "                  38   39   40   41   42   43"
PRINT "                  |    |    |    |    |    |  "
PRINT "                 D|-16-|-17-|-18-|-19-|-20-|  "
PRINT "                  |    |    |    |    |    |  "
PRINT "                  44   45   46   47   48   49"
PRINT "                  |    |    |    |    |    |  "
PRINT "                 E|-21-|-22-|-23-|-24-|-25-|  "

'pick a starting and ending arc
LOCATE 19, 1
INPUT "Enter starting and ending arcs (1-49) "; StartArc,
      GoalArc 'ask for turn restrictions
DO
    LOCATE 19, 1
    PRINT "
"
    LOCATE 19, 1
    INPUT "Enter turn restriction (from arc/to arc) ";
          FromArc, ToArc
```

-142-

```
    IF FromArc = 0 THEN EXIT DO

'make turn restriction by killing the pointer
    FOR i = 1 TO 6
        IF Ptr(FromArc, i) \ 4 = ToArc THEN 'kill the pointer
            Ptr(FromArc, i) = 0
        END IF
    NEXT i
LOOP 'ask for one way arcs
DO
    LOCATE 20, 1
    PRINT "                                                    "
    LOCATE 20, 1
    INPUT "Enter one way street (arc number)"; ArcNum
    IF ArcNum = 0 THEN EXIT DO LOCATE 21, 1
    PRINT "                                                    "
    LOCATE 21, 1
    INPUT "Specify node which cant be entered
           (1=top/left,2=bot/right) "; CantEnterNode
    Arc(ArcNum).OneWay = CantEnterNode

LOOP

'form a queue of partial paths
CALL FormQueue(StartArc, GoalArc)
PRINT TIME$
'do until goal found
DO 'if the first path in the queue reaches the goal,
    announce success
```

-143-

```
IF First = -1 THEN
    GoalFound = 0
    EXIT DO
ELSE
    ExpPath = Que(First).Pat
    IF Path(ExpPath).Arc = GoalArc THEN
        GoalFound = 1
        EXIT DO
    END IF
END IF 'remove the first path from the queue
ExpArc = Path(ExpPath).Arc
CALL Unlink 'form new paths from the removed path by extending one
step
'PRINT USING "<**>"; ExpArc;
FOR i = 1 TO 6

'extract adjacent arc
    AdjArc = Ptr(ExpArc, i) \ 4

'if arc exists...
    IF (AdjArc <> 0) THEN

'extract expanding arc's leaving node (1 or 2)
        LeaveNode = (Ptr(ExpArc, i) AND 2) \ 2 + 1

'extract the adj arcs entering node (1 or 2)
        EnterNode = (Ptr(ExpArc, i) AND 1) + 1

'clear the wrong way flag
        WrongWay = 0
        Cum = 0

'cant go from local to freeway or vice versa
```

-144-

```
IF ABS(Arc(ExpArc).Wt - Arc(AdjArc).Wt) = 5
THEN
    WrongWay = 1
END IF

'if the adj arc is one way...
IF Arc(AdjArc).OneWay <> 0 THEN

'set wrong way if trying to enter the wrong
    node
    IF Arc(AdjArc).OneWay = EnterNode THEN
        WrongWay = 1
    END IF
END IF 'if expanding arc is one way...
IF Arc(ExpArc).OneWay <> 0 THEN 'set wrong way if trying to leave at wrong
    node
    IF Arc(ExpArc).OneWay <> LeaveNode THEN
        WrongWay = 1
    END IF
END IF 'set wrong way if doing u-turn
IF Path(ExpPath).EnterNode = LeaveNode THEN
    WrongWay = 1
END IF 'if not the wrong way...
IF WrongWay <> 1 THEN 'allocate a path slot
    AdjPath = FreePath
    FreePath = FreePath + 1
```

-145-

```
'add the cost so far along the path
Cum = Cum + Path(ExpPath).Cum

'add the cost of travel to center of the
adj arc
Cum   =   Cum   +   Arc(ExpArc).Lth   +
    Arc(AdjArc).Lth 'if the street name changes...
IF Arc(ExpArc).Nam <> Arc(AdjArc).Nam THEN 'add 2 unit penelty for changing street
    names
    Cum = Cum + 2
END IF 'calculate the undereste dist from arc to
goal
DeltaX = Arc(AdjArc).X - Arc(GoalArc).X
DeltaY = Arc(AdjArc).Y - Arc(GoalArc).Y
'Dist = SQR(DeltaX ^ 2 + DeltaY ^ 2)
Dist = ABS(DeltaX) + ABS(DeltaY)

'add   underestimate   to   accumulated   path
distance
Estimate = Cum + Dist

'store the cumulative path distance
Path(AdjPath).Cum = Cum

'place the adjacent arc in the path
Path(AdjPath).Bac = ExpPath
Path(AdjPath).Arc = AdjArc PRINT USING "(**)"; AdjArc;

'remember node extended path was entered
```

```
                    -146-
            Path(AdjPath).EnterNode = EnterNode

'place extended path into the sorted path
            queue
            CALL SortQueue(AdjPath, Estimate)

'if duplicate, remove it from the path list
            IF AdjPath = -1 THEN
                FreePath = FreePath - 1
            END IF
          END IF
        END IF
    NEXT i
LOOP
FOR i = 1 TO 49
    PRINT i; Hash(i); "  ";
NEXT i
PRINT TIME$
'print out the path found, this will be in reverse order
IF GoalFound = 1 THEN
    PRINT
    PRINT "Found ";
    PRINT Path(ExpPath).Arc;
    DO
        ExpPath = Path(ExpPath).Bac
        IF ExpPath <= 0 THEN EXIT DO
        PRINT Path(ExpPath).Arc;
    LOOP
ELSE
    PRINT "Failure"
END IF 'wait for any key
WHILE INKEY$ = ""
WEND
```

-147-

```
LOOP
STOP

DEFINT A-Z
SUB FormQueue (StartArc, GoalArc)

'create the free list
FOR i = 1 TO 1999
    Que(i).Fwd = i + 1
NEXT i

'init free pointers
FreeQue = 1
FreePath = 1

'allocate a free queue slot and a free path slot
QueSlot = FreeQue
FreeQue = Que(FreeQue).Fwd
PathSlot = FreePath
FreePath = FreePath + 1

'insert starting arc in the path list
Path(PathSlot).Arc = StartArc
Path(PathSlot).Bac = -1

'insert the starting arc in the path queue
Que(QueSlot).Pat = PathSlot
Que(QueSlot).Total    =    SQR(Arc(StartArc).X ^
                  2+Arc(GoalArc).Y^2)
Que(QueSlot).Fwd = -1
Que(QueSlot).Bac = -1

'init first in queue
First = QueSlot

END SUB
```

-148-

```
DEFINT A-Z
SUB MakePointers (i)

'This routine locates adjacent arcs by determining that the
'coordinates at the ends of the adjacent arc match the
'coordinates of the input arc.  The pointer is multiplied
'by four to leave room for two flag bits.  The flag bits
'have the following meaning:
'
'    00 - Node 1 of Arc(i) connects to node 1 of Arc(j)
'    10 - Node 2 of Arc(i) connects to node 1 of Arc(j)
'    01 - Node 1 of Arc(i) connects to node 2 of Arc(j)
'    11 - Node 2 of Arc(i) connects to node 2 of Arc(j)
'
'These bits are used by the search algorithm to aid with
'one way street restrictions and to prevent the path from
'backtracking, i.e., leaving an arc the same way we entered
'it.  If we fail to take care of this, the algorithm can
'avoid a turn restriction by going to the next arc and then
'backing up to approach the intersection from the opposite
'     d    i    r    e    c    t    i    o    n     .
'-------------------------------------------------------
'-------------------------------------------------------

'init the second index (1 to 6)
k = 0
SaveK = 0

'for each adjacent arc...
FOR J = 1 TO 49

'skip if looking at the primary arc
    IF J <> i THEN

'create pointer to node 1 of Arc(j), adding the two
        flag bits
        IF (Arc(i).X1 = Arc(J).X1) AND (Arc(i).Y1 = Arc(J).Y1)
```

-149-
```
    THEN
      k = k + 1
      Ptr(i, k) = J * 4
    ELSEIF  (Arc(i).X1  =  Arc(J).X2)  AND  (Arc(i).Y1  =
          Arc(J).Y2) THEN
      k = k + 1
      Ptr(i, k) = J * 4 + 1
    ELSEIF  (Arc(i).X2  =  Arc(J).X1)  AND  (Arc(i).Y2  =
          Arc(J).Y1) THEN
      k = k + 1
      Ptr(i, k) = J * 4 + 2
    ELSEIF  (Arc(i).X2  =  Arc(J).X2)  AND  (Arc(i).Y2  =
          Arc(J).Y2) THEN
      k = k + 1
      Ptr(i, k) = J * 4 + 3
    END IF
  END IF
  IF SaveK <> k THEN
    PRINT i; "=>"; J; " ";
    SaveK = k
  END IF
NEXT J
END SUB DEFINT A-Z
SUB SortQueue (AdjPath, Estimate)

'This subroutine adjusts the queue pointers to keep the
'queue sorted

'if queue is currently empty...
IF First = -1 THEN

'put the partial path at the top of the queue
    GOSUB GetSlot
    First = Slot
```

```
                    -150-
    Que(Slot).Fwd = -1    Que(Slot).Bac = -1

'if queue not empty...
ELSE

'search the queue for dist greater than the total dist
    Nxt = First
    DupCount = 0
    DO
        'allow a few duplicate paths to the same common
        node
        Qpath = Que(Nxt).Pat
        IF Path(Qpath).Arc = Path(AdjPath).Arc THEN
            IF Path(Qpath).Cum < Path(AdjPath).Cum THEN '------------------------------------------
                'DupCount  >  infinity  finds  a  very
                restricted route in 22 sec
                'DupDount > 2 finds a very restricted path
                in 16 seconds
                'DupCount > 1 finds the same path in 11
                seconds
                'DupCount > 0 finds a poorer path in 16
                seconds
                'choose DupCount > 1 for this test
                '------------------------------------------
                IF DupCount > 1 THEN
                    AdjPath = -1
                    EXIT DO
                ELSE
                    DupCount = DupCount + 1
                END IF
            END IF
        END IF 'if input distance is greater than the next
        entry...
```

-151-

```
IF Estimate > Que(Nxt).Total THEN

'if not at the end of the queue...
    IF Que(Nxt).Fwd <> -1 THEN

'keep searching
        Nxt = Que(Nxt).Fwd

'else if at the end of the queue...
    ELSE add to bottom
        GOSUB GetSlot
        Que(Nxt).Fwd = Slot
        Que(Slot).Bac = Nxt
        Que(Slot).Fwd = -1
        EXIT DO
    END IF 'if distance is smaller than next entry...
ELSE 'if not at the top of the queue...
    Back = Que(Nxt).Bac
    IF Back > 0 THEN 'insert into queue
        GOSUB GetSlot
        Que(Slot).Bac = Back
        Que(Back).Fwd = Slot
        Que(Slot).Fwd = Nxt
        Que(Nxt).Bac = Slot
        EXIT DO 'if at the top of the queue...
    ELSE
```

-152-
```
                'add to top of queue
                GOSUB GetSlot
                Que(Slot).Fwd = Nxt
                Que(Nxt).Bac = Slot
                Que(Slot).Bac = -1
                First = Slot
                EXIT DO
            END IF
        END IF
    LOOP
END IF 'PRINT
Nxt = First
FOR k = 1 TO 20
    ArcPath = Que(Nxt).Pat
    Arc = Path(ArcPath).Arc
    'PRINT Arc;
    Nxt = Que(Nxt).Fwd
    IF Nxt = -1 THEN
        'PRINT Nxt;
        EXIT FOR
    END IF
NEXT k
EXIT SUB '-----
'GetSlot:
'-----
'allocate a free slot in the que
Slot = FreeQue
FreeQue = Que(FreeQue).Fwd 'put the total distance into the slot
Que(Slot).Total = Estimate
```

-153-

```
'put path into the slot
Que(Slot).Pat = AdjPath
RETURN
END SUB

DEFINT A-Z
SUB Unlink

'extract queue pointers
Foward = Que(First).Fwd

'remove first entry in queue and add the slot to the free
list
Que(First).Bac = -1
Que(First).Fwd = FreeQue
FreeQue = First 'get the new first slot
First = Foward 'if not at the end of the list, point back around unliked
arc
IF Foward <> -1 THEN
    Que(Foward).Bac = Back
END IF

END SUB
```

What is claimed is:

1. In a navigation system which includes data storage means for storing a database containing map data and navigation information, means for storing software for controlling the system and effecting route selection in cooperation with the database, and a navigator processor connected to the means for storing software for operating the navigation system under control of the software, the improvement wherein said data storage means comprise:
   a) an audio CD player having a read head and means for positioning said read head in response to positioning signals from said navigator processor; and
   b) a CD storing the database in an audio format, said CD being playable by said player.

2. A system as defined in claim 1 wherein said means for positioning said read head comprise a CD player processor and a serial bus connected between said CD player processor and said navigator processor for conducting positioning signals from said navigator processor to said CD player processor.

3. A system as defined in claim 2 wherein said CD player processor is programmed to permit said read head to be positioned by signals from said navigator processor.

4. A system as defined in claim 3 wherein said CD further constitutes said means for storing the software.

5. A system as defined in claim 4 further comprising means for producing audible spoken statements under control of speech signals, and wherein said CD further stores the speech signals.

6. A system as defined in claim 5 wherein said audio CD player includes at least one speaker and said system further comprises: digital signal processor means connected for converting speech signals from said CD into speech output data; and switching means connected between said CD player, said digital signal processor and said at least one speaker for selectively conducting to said at least one speaker one of audio signals from an audio CD in said player and speech output data from said digital signal processor.

7. A system as defined in claim 1 wherein said CD further constitutes said means for storing the software.

8. A system as defined in claim 1 further comprising means for producing audible spoken statements under control of speech signals, and wherein said CD further stores the speech signals.

9. A system as defined in claim 8 wherein said audio CD player includes at least one speaker and said system further comprises: digital signal processor means connected for converting speech signals from said CD into speech output data; and switching means connected between said CD player, said digital signal processor and said at least one speaker for selectively conducting to said at least one speaker one of audio signals from an audio CD in said player and speech output data from said digital signal processor.

10. A system as defined in claim 9 wherein said CD player includes a controller for providing positioning signals for positioning said read head during playing of a music CD, and said system further comprises second switching means connected between said read head and said controller and switchable between a first state for supplying positioning signals from said controller for playing a music CD and a second state for supplying positioning signals from said navigator processor for playing said CD storing the database.

11. A system as defined in claim 1 wherein said CD player includes a controller for providing positioning signals for positioning said read head during playing of a music CD, and said system further comprises switch means connected between said read head and said controller and switchable between a first state for supplying positioning signals from said controller for playing a music CD and a second state for supplying positioning signals from said navigator processor for playing said CD storing the database.

12. In a navigation system which includes a data storage device for storing a database containing map data and navigation information, a storage medium for storing software for controlling the system and effecting route selection in cooperation with the database, and a navigator processor connected to the means for storing software for operating the navigation system under control of the software, the improvement wherein said data storage device comprises:
   a) an audio CD player having a read head and means for positioning said read head in response to positioning signals from said navigator processor; and
   b) a CD storing the database in an audio format, said CD being playable by said player.

* * * * *